United States Patent
Sun et al.

(10) Patent No.: US 11,916,705 B2
(45) Date of Patent: *Feb. 27, 2024

(54) REFERENCE SIGNAL TRANSMISSION METHOD, APPARATUS, AND SYSTEM

(71) Applicant: Huawei Technologies Co., Ltd., Shenzhen (CN)

(72) Inventors: Yu Sun, Shanghai (CN); Yi Qin, Shanghai (CN); Zhongfeng Li, Shanghai (CN); Leiming Zhang, Beijing (CN); Shengyue Dou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 151 days.

This patent is subject to a terminal disclaimer.

(21) Appl. No.: 17/408,009

(22) Filed: Aug. 20, 2021

(65) Prior Publication Data
US 2021/0385113 A1 Dec. 9, 2021

Related U.S. Application Data

(63) Continuation of application No. 16/580,651, filed on Sep. 24, 2019, now Pat. No. 11,153,134, which is a (Continued)

(30) Foreign Application Priority Data

Mar. 24, 2017 (CN) .................. 201710184763.X
May 31, 2017 (CN) .................. 201710400977.6
Jun. 13, 2017 (CN) .................. 201710444726.8

(51) Int. Cl.
*H04L 25/03* (2006.01)
*H04L 5/00* (2006.01)
(Continued)

(52) U.S. Cl.
CPC ...... *H04L 25/03821* (2013.01); *H04L 1/0003* (2013.01); *H04L 5/0051* (2013.01);
(Continued)

(58) Field of Classification Search
None
See application file for complete search history.

(56) References Cited

U.S. PATENT DOCUMENTS

| 6,721,366 B1 | 4/2004 | Van Stralen |
| 8,848,599 B2 * | 9/2014 | Montojo ............... H04W 48/16 370/350 |

(Continued)

FOREIGN PATENT DOCUMENTS

| CN | 103650368 A | 3/2014 |
| CN | 103685098 A | 3/2014 |

(Continued)

OTHER PUBLICATIONS

"Discussion on phase tracking RS design," 3GPP TSG RAN WG1 Meeting #88, Athens, Greece, R1-1702345, Total 6 pages, 3rd Generation Partnership Project, Valbonne, France (Feb. 13-17, 2017).

(Continued)

*Primary Examiner* — Eunsook Choi
(74) *Attorney, Agent, or Firm* — Leydig, Voit & Mayer, Ltd.

(57) ABSTRACT

Embodiments of the present invention disclose a reference signal transmission method, including: sending, by a terminal, a first reference signal and a second reference signal; and correspondingly, receiving, by a network device, the first reference signal and the second reference signal, where the first reference signal is mapped to a plurality of symbols and is used for estimation of channel state information, the second reference signal is mapped to at least two of the (Continued)

plurality of symbols and is used for phase tracking, and a subcarrier to which the second reference signal is mapped on one of the at least two symbols has a same frequency-domain location as a subcarrier to which the second reference signal is mapped on the rest of the at least two symbols. With the foregoing solution, accuracy of channel state information estimation can be improved.

20 Claims, 39 Drawing Sheets

Related U.S. Application Data continuation of application No. PCT/CN2018/080397, filed on Mar. 24, 2018.

(51) Int. Cl.
*H04L 1/00* (2006.01)
*H04L 25/02* (2006.01)
*H04L 27/26* (2006.01)
*H04W 72/1273* (2023.01)

(52) U.S. Cl.
CPC ........ *H04L 5/0092* (2013.01); *H04L 25/0226* (2013.01); *H04L 27/261* (2013.01); *H04W 72/1273* (2013.01)

(56) References Cited

U.S. PATENT DOCUMENTS

| | | | |
|---|---|---|---|
| 10,084,578 B2* | 9/2018 | Azarian Yazdi ...... H04L 5/0055 |
| 10,212,648 B2* | 2/2019 | Montojo ............... H04W 48/16 |
| 10,499,395 B2* | 12/2019 | Sahara ...................... H04L 1/00 |
| 2012/0329503 A1 | 12/2012 | Jöngren et al. |
| 2013/0259009 A1 | 10/2013 | Berggren et al. |
| 2013/0315326 A1 | 11/2013 | Shi et al. |
| 2013/0336282 A1 | 12/2013 | Nakano et al. |
| 2014/0192750 A1 | 7/2014 | Noh et al. |
| 2014/0321406 A1 | 10/2014 | Marinier et al. |
| 2015/0016339 A1 | 1/2015 | You et al. |
| 2015/0016369 A1 | 1/2015 | Park et al. |
| 2015/0180640 A1 | 6/2015 | Liu |
| 2015/0305059 A1 | 10/2015 | Li et al. |
| 2015/0311986 A1 | 10/2015 | Thomas et al. |
| 2015/0381331 A1 | 12/2015 | Kim et al. |
| 2016/0056936 A1 | 2/2016 | Sun et al. |
| 2016/0157235 A1 | 6/2016 | Xue et al. |
| 2016/0212746 A1 | 7/2016 | Wang et al. |
| 2018/0091350 A1* | 3/2018 | Akkarakaran .... H04L 27/26134 |
| 2018/0145854 A1 | 5/2018 | Akkarakaran et al. |
| 2018/0167237 A1 | 6/2018 | Gudovskiy et al. |
| 2018/0351719 A1* | 12/2018 | Lee ....................... H04L 5/0053 |
| 2019/0081844 A1 | 3/2019 | Lee et al. |
| 2019/0140801 A1 | 5/2019 | Ko et al. |
| 2020/0008228 A1* | 1/2020 | Lee ......................... H04W 72/21 |
| 2020/0022175 A1 | 1/2020 | Xiong et al. |
| 2020/0067669 A1 | 2/2020 | Tang |
| 2020/0244503 A1* | 7/2020 | Bala ................... H04L 27/2613 |
| 2020/0328768 A1 | 10/2020 | Hessler et al. |

FOREIGN PATENT DOCUMENTS

| | | |
|---|---|---|
| CN | 103685118 A | 3/2014 |
| CN | 103891166 A | 6/2014 |
| CN | 104170275 A | 11/2014 |
| CN | 104349460 A | 2/2015 |
| CN | 105052227 A | 11/2015 |
| CN | 105356907 A | 2/2016 |
| CN | 105357160 A | 2/2016 |
| CN | 105791179 A | 7/2016 |
| CN | 105846976 A | 8/2016 |
| CN | 106537964 A | 3/2017 |
| CN | 108632005 A | 10/2018 |
| CN | 108632006 A | 10/2018 |
| CN | 104429116 B | 1/2019 |
| WO | 2013123881 A1 | 8/2013 |
| WO | 2016106753 A1 | 7/2016 |
| WO | 2016131326 A1 | 8/2016 |
| WO | 2017045176 A1 | 3/2017 |

OTHER PUBLICATIONS

"WF on DL DMRS design for data channel," 3GPP TSG RAN WG1 Meeting #88, Athens, Greece, R1-1703883, Total 3 pages, 3rd Generation Partnership Project, Valbonne, France (Feb. 13-17, 2017).
"On phase tracking in DFT-S-OFDM waveform," 3GPP TSG-RAN WG1#87, Reno, USA, R1-1612338, pp. 1-2, 3rd Generation Partnership Project, Valbonne, France (Nov. 14-18, 2016).
"Further details for PT-RS design," 3GPP TSG RAN WG1 Meeting #88, Athens, Greece, R1-1701698, pp. 1-3, 3rd Generation Partnership Project, Valbonne, France (Feb. 13-17, 2017).
"Discussion on downlink DMRS design," 3GPP TSG RAN WG1 NR Ad-Hoc Meeting, Spokane, USA, R1-1700135, pp. 1-10, 3rd Generation Partnership Project, Valbonne, France (Jan. 16-20, 2017).
"On PT-RS Design for NR," 3GPP TSG RAN WG1#88, Athens, Greece, R1-1703182, pp. 1-7, 3rd Generation Partnership Project, Valbonne, France (Feb. 13-17, 2017).
"Simulation results for downlink DMRS," 3GPP TSG RAN WG1 NR Ad-Hoc Meeting, Spokane, USA, R1-1700137, pp. 1-13, 3rd Generation Partnership Project, Valbonne, France (Jan. 16-20, 2017).
"Phase-Tracking Reference Signal Design for High-Frequency Systems," 3GPP TSG RAN WG1 Meeting #88, Athens, Greece, R1-1703406, pp. 1-11, 3rd Generation Partnership Project, Valbonne, France (Feb. 13-17, 2017).
"Further discussion on phase tracking for UL," 3GPP TSG RAN WG1 AH_NR Meeting, Spokane, USA, R1-1700233, pp. 1-3, 3rd Generation Partnership Project, Valbonne, France (Jan. 16-20, 2017).
"On PT-RS for CP-OFDM," 3GPP TSG RAN WG1 Meeting #90, Prague, P.R. Czechia, R1-1712561, pp. 1-8, 3rd Generation Partnership Project, Valbonne, France (Aug. 21-25, 2017).
"Further details of PTRS," 3GPP TSG RAN WG1 Meeting #90bis, Prague, Czech Republic, R1-1717306, pp. 1-13, 3rd Generation Partnership Project, Valbonne, France (Oct. 9-13, 2017).
ZTE, ZTE Microelectronics, "Discussion on downlink DMRS design," 3GPP TSG RAN WG1 Meeting #88, Athens, Greece, R1-1701815, total 12 pages, 3rd Generation Partnership Project, Valbonne, France (Feb. 13-17, 2017).
Huawei, HiSilicon, "Further details for PT-RS design," 3GPP TSG RAN WG1 Meeting Ad Hoc for NR, Spokane, USA, R1-1700073, total 5 pages, 3rd Generation Partnership Project, Valbonne, France (Jan. 16-20, 2017).
CATT, "Further discussion on RS for phase tracking," 3GPP TSG RAN WG1 Meeting #88, Athens, Greece, R1-1702088, total 5 pages, 3rd Generation Partnership Project, Valbonne, France (Feb. 13-17, 2017).
ZTE et al., "Resource sharing between PDCCH and PDSCH," 3GPP TSG RAN WG1 Meeting #88, Athens, Greece, R1-1701587, XP051208754, total 4 pages, 3rd Generation Partnership Project, Valbonne, France (Feb. 13-17, 2017).
CN/201710400977, Office Action, dated Apr. 26, 2023.
U.S. Appl. No. 16/580,651, filed Sep. 24, 2019.

* cited by examiner

Terminal 1: cyclic shift value 1, comb 1

Terminal 2: cyclic shift value 2, comb 2

REFERENCE SIGNAL TRANSMISSION METHOD, APPARATUS, AND SYSTEM

CROSS-REFERENCE TO RELATED APPLICATIONS

This application is a continuation of U.S. patent application Ser. No. 16/580,651, filed on Sep. 24, 2019, which a continuation of International Application No. PCT/CN2018/080397, filed on Mar. 24, 2018, which claims priority to Chinese Patent Application No. 201710444726.8, filed on Jun. 13, 2017, and Chinese Patent Application No. 201710400977.6, filed on May 31, 2017, and Chinese Patent Application No. 201710184763.X, filed on Mar. 24, 2017. All of the aforementioned patent applications are hereby incorporated by reference in their entireties.

TECHNICAL FIELD

This application relates to the field of wireless communications technologies, and in particular, to a reference signal transmission method, apparatus, and system.

BACKGROUND

With the development of mobile internet technologies, requirements for communication rate and communication capacity increasingly grow, and existing low-spectrum resources are subject to increasing shortage and cannot meet the requirements. Therefore, high-frequency radio resources with rich spectrum resources have become a research focus of wireless communications. In a wireless communications system, a frequency device, namely, a local oscillator, is non-ideal. Random jitter of the local oscillator causes phase noise in an output carrier signal. The magnitude of the phase noise is directly related to a carrier frequency: The phase noise power changes according to 20 log(n), where n is a quantity of times of frequency increase, meaning that the phase noise power increases by 6 dB each time the carrier frequency is doubled. Therefore, the impact of the phase noise cannot be ignored in high-frequency wireless communications. For a future evolved wireless system, new radio (NR), the 3rd generation partnership project (3GPP) has incorporated high frequencies into an adopted spectrum range. Therefore, the related impact of the phase noise also needs to be considered during design.

Phase noise is a physical quantity that changes randomly in time, as indicated by a wavy line in FIG. 1. The impact of phase noise on an orthogonal frequency division multiplexing (OFDM) system includes two parts: common phase error (CPE) and inter-carrier interference (ICI). The CPE is an average phase noise in a duration of one OFDM symbol, as indicated by a horizontal line segment in a symbol in FIG. 1. For a specific OFDM symbol, the CPE exerts the same impact, namely, the impact indicated by block A in FIG. 2, on different subcarriers in the symbol. A manifestation is that all modulation constellation symbol points in the OFDM symbol rotate by one common phase. The ICI is caused by the phase noise by damaging subcarrier orthogonality of an OFDM symbol, and exerts different impact, namely, the impact indicated by circle B in FIG. 2, on different subcarriers of one OFDM, thereby causing a cloudlike dispersion of modulation constellation symbol points. When a subcarrier spacing is greater than 15 kHz, the impact of the ICI on system performance can normally be ignored, and CPE impact caused by the phase noise is mainly considered during system design.

Currently, in a high-frequency system, the following two reference signals may be used for estimation of channel state information (CSI):

1. Sounding Reference Signal (SRS)

The SRS is used for estimation of uplink channel quality. A network-side scheduler needs to perform scheduling based on the uplink channel quality, to allocate resource blocks (RB) in a good transient channel state for transmission of physical uplink shared channels (PUSCH) of terminals. In addition, the network-side scheduler also needs to select, depending on whether a transient channel state is good or bad, different transmission parameters, for example, a coding rate, a modulation order, and different parameters related to multi-antenna transmission.

In the frequency domain, SRS transmission should cover a frequency band in which the scheduler is interested. This may be implemented in two ways, as shown in FIG. 3A: a. One "wideband SRS" with a sufficient frequency-domain span is sent to cover the entire frequency band of interest. b. A plurality of "narrowband SRSs" are sent on a plurality of symbols to implement frequency hopping, and then a series of sent SRSs are combined. In this way, the entire frequency band of interest can be covered, and "narrowband SRSs" on various symbols have no overlapping subcarrier in the frequency domain.

Different terminals may send SRSs on a same resource block set, and these SRSs may be differentiated by different "combs". As shown in FIG. 3B, a subcarrier in a solid-line part is used for SRS transmission of one terminal, and a subcarrier in a dashed-line part may be used for SRS transmission of another terminal. Further, to implement resource multiplexing, different cyclic shifts may be further used for a plurality of terminals to ensure orthogonality of SRSs transmitted by different terminals. Through cyclic shifts, a plurality of terminals may send SRSs by using a same time-frequency resource, that is, a same "comb", to ensure orthogonality of the SRSs. As shown in FIG. 3C, a terminal 1 and a terminal 2 share a time-frequency resource by using different cyclic shifts, thereby retaining orthogonality of the SRSs.

However, a coherence time of high-frequency phase noise is short, and a phase error caused by phase noise on each OFDM symbol varies. In the existing SRS frequency hopping, subband SRSs on a plurality of OFDM symbols need to be used together to estimate CSI, and CSI estimated by using SRSs on different symbols have different phase deviations, causing inaccurate CSI estimation. In addition, to estimate a relative phase deviation between different symbols, a common channel needs to be used as a reference. However, narrowband SRSs for frequency hopping are distributed on non-overlapping subbands, and channels of the subbands are different from one another. Therefore, a relative phase deviation between symbols cannot be estimated by using the narrowband SRSs in non-overlapping frequency band locations.

2. Channel State Information Reference Signal (CSI-RS)

The CSI-RS is mainly used for channel quality feedback. The CSI-RS is sent on a plurality of OFDM symbols. For example, as shown in FIG. 4, in LTE, CSI-RSs of different antenna ports (for example, a port 17 and a port 18) are all transmitted on symbols 7 and 8, and are differentiated by using time-domain OCCs (Orthogonal Cover Code). OCCs are applied to a code division multiplexing (CDM) mode. Alternatively, a plurality of antenna ports for CSI-RSs are subject to code division in the frequency domain. However, a plurality of OFDM symbols still need to be used together during CSI estimation. In this case, phase noise results in different phase deflection on different symbols, causing inaccurate CSI estimation.

If CSI-RSs are subject to code division in the time domain, CSI-RSs of at least two antenna ports are sent on one time-frequency resource element (RE), and a CSI-RS signal received on a receive end is a result of superposition of the signals sent by the at least two antenna ports that have gone through channels. Because of orthogonal cover codes, channels on different symbols are superposition values obtained by multiplying the orthogonal cover codes and the channels over which symbols on the at least two antenna ports are transmitted, and the channels on the different symbols are completely different. Therefore, a relative phase error value cannot be estimated by using the CSI-RSs subject to code division in the time domain. If antenna ports for a plurality of CSI-RSs are subject to frequency division in the frequency domain, and CSI-RSs on a plurality of symbols need to be used together to estimate CSI, because different antenna ports are used for CSI-RSs on different symbols, it is normally considered that symbols on different antenna ports are transmitted over different channels. Therefore, there is no common channel serving as a reference for phase noise estimation, and in turn a phase deviation caused by phase noise cannot be estimated either.

SUMMARY

This application provides a reference signal transmission method, apparatus, and system, to improve accuracy of channel state estimation.

According to a first aspect, this application provides a reference signal transmission method. The method may include: sending, by a terminal, a first reference signal and a second reference signal to a network device; and correspondingly, receiving, by the network device, the first reference signal and the second reference signal that are sent by the terminal.

Specifically, the first reference signal is mapped to a plurality of symbols and is used for estimation of channel state information. The second reference signal may be mapped to at least two of the plurality of symbols and is used for phase tracking. A subcarrier to which the second reference signal is mapped on one of the at least two symbols has a same frequency-domain location as a subcarrier to which the second reference signal is mapped on the rest of the at least two symbols.

It can be understood that, with implementation of the method described in the first aspect, a relative phase error between symbols in the plurality of symbols can be calculated on a subcarrier corresponding to the same frequency-domain location by exploiting the second reference signal, thereby improving accuracy of CSI estimation.

In the first aspect, the first reference signal may be a sounding reference signal (SRS), and the second reference signal may be an uplink reference signal used for phase tracking (PT-RS).

With reference to the first aspect, the second reference signal may correspond to the following several resource mapping manners.

In a first resource mapping manner, a subcarrier to which the second reference signal is mapped is adjacent to a subband of the first reference signal in the frequency domain. To be specific, the PT-RS may be mapped to one end or two ends of an SRS subband.

Specifically, the PT-RS may be mapped to the first m (m is a positive integer) subcarriers of the SRS subband, or may be mapped to the last n (n is a positive integer) subcarriers of the SRS subband, or may be mapped to the first m subcarriers and the last n subcarriers of the SRS subband. Herein, m and n may be equal or not equal.

Specifically, a resource mapping rule for the PT-RS may be summarized into, but is not limited to, the following: If the SRS subband is in a lowest frequency-domain location in a processing bandwidth of the terminal, the PT-RS may be mapped to the last n subcarriers of the SRS subband; if the SRS subband is in a highest frequency-domain location in a processing bandwidth of the terminal, the PT-RS may be mapped to the first m subcarriers of the SRS subband; and if the SRS subband is in a middle frequency-domain location in a processing bandwidth of the terminal, the PT-RS may be mapped to the first m subcarriers of the SRS subband, or may be mapped to the last n subcarriers of the SRS subband. Herein, the processing bandwidth of the terminal is a total sounding reference signal frequency hopping bandwidth allocated by the network device to the terminal, that is, a total bandwidth of channels for which the network device requires that the terminal implement sounding.

To be specific, a resource location of the second reference signal may be determined by a resource location of the first reference signal. This determining policy may be predefined by a protocol, or may be configured by the network device by delivering higher layer signaling (for example, radio resource control (RRC) signaling) or physical downlink control channel (PDCCH) signaling.

In some embodiments, if a plurality of terminals need to simultaneously send SRSs, the plurality of terminals may use different cyclic shift values to ensure orthogonality of the SRSs transmitted by the terminals. Likewise, to ensure orthogonality of PT-RSs transmitted by the plurality of terminals, the same cyclic shift values may be used for the PT-RSs as for the SRSs. In addition, a same "comb" pattern may be used for the PT-RSs and the SRSs, that is, the PT-RSs and the SRSs correspond to a same comb spacing.

It can be understood that, with implementation of the first resource mapping manner, because a subcarrier to which the PT-RS is mapped is adjacent to the SRS subband in the frequency domain, and a subcarrier to which the PT-RS is mapped on one of the at least two symbols has a same frequency-domain location as a subcarrier to which the PT-RS is mapped on the rest of the at least two symbols, a relative phase error between symbols in an SRS frequency hopping period can be calculated in this same frequency-domain location by exploiting the PT-RS, thereby improving accuracy of CSI estimation.

In a second resource mapping manner, a subcarrier location to which the second reference signal is mapped is the same on every symbol to which the second reference signal is mapped. That is, on every symbol to which the PT-RS is mapped, the PT-RS is mapped to same one or more subcarriers. Specifically, the same one or more subcarriers may be concentrated in the frequency domain, or may be discretely distributed.

Specifically, a cyclic shift value of the SRS may be used to determine a frequency-domain location of the PT-RS. Specifically, a mapping rule between the cyclic shift value of the SRS and the subcarrier location to which the PT-RS is mapped may be predefined by a protocol, or may be configured by the network device by delivering instructing higher layer signaling (for example, RRC signaling) or PDCCH signaling. Different cyclic shift values correspond to different subcarrier locations.

In some possible embodiments, if a subcarrier to which the PT-RS is mapped has a same frequency-domain location as a subcarrier to which the SRS is mapped on one or more symbols, the PT-RS is not mapped to the one or more symbols.

It can be understood that, with implementation of the second resource mapping manner, because the subcarrier location to which the PT-RS is mapped is the same on every symbol to which the PT-RS is mapped, a relative phase error between symbols in an SRS frequency hopping period can be calculated in this same frequency-domain location, thereby improving accuracy of CSI estimation.

With reference to the first aspect, in some embodiments, the network device may further send resource configuration information to the terminal, to indicate time-frequency resources on which the terminal sends the first reference signal and the second reference signal.

With reference to the first aspect, in some embodiments, respective resource locations corresponding to the first reference signal and the second reference signal may be predefined by a protocol. Therefore, the network device does not need to send the resource configuration information to the terminal.

With reference to the first aspect, in some embodiments, a resource location corresponding to the first reference signal may be predefined by a protocol. The resource configuration information may include a resource mapping rule between the second reference signal and the first reference signal. In this way, the terminal can determine a resource location of the second reference signal based on the resource mapping rule between the second reference signal and the first reference signal in this application. Specifically, the resource mapping rule between the second reference signal and the first reference signal may be predefined by a protocol, or may be configured by the network device by using higher layer signaling or a PDCCH. When the resource mapping rule is predefined by a protocol, the network device does not need to send the resource configuration information to the terminal.

With reference to the first aspect, in some embodiments, the resource configuration information may include resource configuration information of the first reference signal and the resource mapping rule between the second reference signal and the first reference signal. In this way, the terminal can determine a resource location of the second reference signal based on a resource location of the first reference signal and the resource mapping rule between the second reference signal and the first reference signal in this application. Specifically, the resource mapping rule between the second reference signal and the first reference signal may be predefined by a protocol, or may be configured by the network device by using higher layer signaling or a PDCCH. When the resource mapping rule is predefined by a protocol, the resource configuration information may include only resource location information of the first reference signal.

According to a second aspect, this application provides a reference signal transmission method. The method may include: sending, by a network device, a first reference signal and a second reference signal to a terminal; and correspondingly, receiving, by the terminal, the first reference signal and the second reference signal that are sent by the network device.

Specifically, the first reference signal is mapped to a plurality of symbols and is used for estimation of channel state information. The second reference signal may be mapped to at least two of the plurality of symbols and is used for phase tracking. A subcarrier to which the second reference signal is mapped on one of the at least two symbols has a same frequency-domain location as a subcarrier to which the second reference signal is mapped on the rest of the at least two symbols.

It can be understood that, with implementation of the method described in the second aspect, a relative phase error between symbols in the plurality of symbols can be calculated on a subcarrier corresponding to the same frequency-domain location by exploiting the second reference signal, thereby improving accuracy of CSI estimation.

In the second aspect, the first reference signal may be a channel state information reference signal CSI-RS, and the second reference signal may be a downlink reference signal for phase tracking (PT-RS).

With reference to the second aspect, in some embodiments, the CSI-RS is mapped to a plurality of symbols, and the PT-RS may be mapped to the same symbols as the CSI-RS. A subcarrier to which the PT-RS is mapped on one of the symbols to which the CSI-RS is mapped may correspond to a same frequency-domain location as a subcarrier to which the PT-RS is mapped on the rest of these symbols. Specifically, in the frequency domain, the subcarrier to which the PT-RS is mapped may be adjacent to or not adjacent to a subcarrier to which the CSI-RS is mapped.

With reference to the second aspect, in some embodiments, a resource location of the PT-RS may be predefined by a protocol, or may be configured by the network device by delivering higher layer signaling (for example, RRC signaling) or PDCCH signaling.

With reference to the second aspect, in some embodiments, an antenna port sending the PT-RS may be one or more of antenna ports sending the CSI-RS, or an antenna port sending the PT-RS and an antenna port sending the CSI-RS are quasi-co-located.

With reference to the second aspect, in some embodiments, the network device may further send resource configuration information to the terminal, to indicate time-frequency resources on which the terminal sends the first reference signal and the second reference signal.

With reference to the second aspect, in some embodiments, respective resource locations corresponding to the first reference signal and the second reference signal may be predefined by a protocol. Therefore, the network device does not need to send the resource configuration information to the terminal.

With reference to the second aspect, in some embodiments, a resource location corresponding to the first reference signal may be predefined by a protocol. The resource configuration information may include a resource mapping rule between the second reference signal and the first reference signal. In this way, the terminal can determine a resource location of the second reference signal based on the resource mapping rule between the second reference signal and the first reference signal in this application. Specifically, the resource mapping rule between the second reference signal and the first reference signal may be predefined by a protocol, or may be configured by the network device by using higher layer signaling or a PDCCH. When the resource mapping rule is predefined by a protocol, the network device does not need to send the resource configuration information to the terminal.

With reference to the second aspect, in some embodiments, the resource configuration information may include resource configuration information of the first reference signal and a resource mapping rule between the second reference signal and the first reference signal. In this way, the terminal can determine a resource location of the second reference signal based on a resource location of the first reference signal and the resource mapping rule between the second reference signal and the first reference signal in this application. Specifically, the resource mapping rule between the second reference signal and the first reference signal may be predefined by a protocol, or may be configured by the network device by using higher layer signaling or a PDCCH. When the resource mapping rule is predefined by a protocol, the resource configuration information may include only resource location information of the first reference signal.

According to a third aspect, this application provides a reference signal transmission method. The method may include: configuring, by a network device based on a time-domain density and a frequency-domain density of a second reference signal, a time-frequency resource for the second reference signal within a user scheduled bandwidth, and sending the second reference signal and/or resource location information of the second reference signal to a terminal; and correspondingly, receiving, by the terminal, the resource location information sent by the network device, and receiving, based on the resource location information, the second reference signal on a resource indicated by the resource location information.

According to a fourth aspect, this application provides a reference signal transmission method. The method may include: configuring, by a network device based on a time-domain density and a frequency-domain density of a second reference signal, a time-frequency resource for the second reference signal within a user scheduled bandwidth, and optionally, sending, by the network device, resource location information of the second reference signal to a terminal; correspondingly, receiving, by the terminal, the resource location information sent by the network device, and sending the second reference signal to the network device on a resource indicated by the resource location information; and receiving, by the network device, the second reference signal sent by the terminal.

It can be understood that, with implementation of the method described in the third aspect or the fourth aspect, in a case of data transmission, configuring the second reference signal for use in phase tracking during the data transmission can improve reliability of the data transmission.

With reference to the third aspect or the fourth aspect, a subcarrier or subcarriers to which the second reference signal is mapped is/are evenly distributed within the user scheduled bandwidth at a granularity of a resource block. Specifically, a subcarrier location to which the second reference signal is mapped may be represented by using the following two types of indexes: an index of a resource block to which the second reference signal is mapped, and a subcarrier index of the second reference signal in the resource block to which the second reference signal is mapped.

With reference to the third aspect or the fourth aspect, in some embodiments, implementations of determining the subcarrier index of the second reference signal in the resource block to which the second reference signal is mapped may include the following:

In a first implementation, the subcarrier index of the second reference signal in the resource block to which the second reference signal is mapped may be determined based on a subcarrier location to which a demodulation reference signal (DMRS) is mapped. Specifically, the second reference signal may be mapped to one or more subcarriers to which the DMRS is mapped.

If DMRSs transmitted by antenna ports of a plurality of users are subject to code division in the frequency domain, the second reference signal is mapped to one or more subcarriers to which a DMRS transmitted by a DMRS antenna port corresponding to an antenna port sending the second reference signal is mapped. Herein, the second reference signal and the DMRS that are respectively sent by the antenna port sending the second reference signal and the DMRS antenna port that correspond to each other have a same subcarrier location.

The antenna port sending the second reference signal and the DMRS antenna port that correspond to each other satisfy the following relationship: The DMRS antenna port is the same as the antenna port sending the second reference signal, or the DMRS antenna port and the antenna port sending the second reference signal are quasi-co-located (QCL), or the DMRS antenna port and the antenna port sending the second reference signal have same precoding. In this way, a receive end can determine, based on a relationship between DMRS antenna ports and PT-RS antenna ports, which PT-RS antenna port is used by a DMRS antenna port for phase tracking and by which DMRS antenna port channel estimation required by a PT-RS antenna port for phase estimation is obtained.

In a second implementation, the subcarrier index of the second reference signal in the resource block to which the second reference signal is mapped may be determined based on a cell ID. The cell ID may be expressed as $N_{ID}^{cell}$.

Optionally, there may be a mapping relationship between the $N_{ID}^{cell}$ and the subcarrier index of the second reference signal in the resource block to which the second reference signal is mapped, that is, different $N_{ID}^{cell}$-s correspond to different subcarrier indexes. This mapping relationship may be predefined by a protocol, or may be configured by the network device by using higher layer signaling (for example, RRC signaling) or a PDCCH.

Optionally, the subcarrier index of the second reference signal in the resource block to which the second reference signal is mapped may be expressed as $N_{ID}^{cell} \bmod a$, where a is a positive integer greater than 1, and a may be predefined by a protocol, for example, a=6 is stipulated in LTE.

With reference to the third aspect or the fourth aspect, in some embodiments, in the time domain, the second reference signal may be distributed on some or all symbols of a physical uplink shared channel (PUSCH) or a physical downlink shared channel (PDSCH) scheduled for a user. Optionally, the time-domain density of the second reference signal may include the following: The second reference signal is continuously mapped to every symbol of the PUSCH (or the PDSCH), or is mapped to every $2^{nd}$ symbol of the PUSCH (or the PDSCH), or is mapped to every $4^{th}$ symbol of the PUSCH (or the PDSCH).

Further, an index of a start symbol to which the second reference signal is mapped may be determined based on the time-domain density of the second reference signal as follows:

If the time-domain density is that the second reference signal is continuously mapped to every symbol, a location of the start symbol of the second reference signal is the $1^{st}$ symbol of the physical uplink shared channel or the physical downlink shared channel scheduled for the user; if the time-domain density is that the second reference signal is mapped to every $2^{nd}$ symbol, a location of the start symbol of the second reference signal is the $2^{nd}$ symbol of the physical uplink shared channel or the physical downlink shared channel scheduled for the user; or if the time-domain density is that the second reference signal is mapped to every $4^{th}$ symbol, a location of the start symbol of the second reference signal is the $1^{st}$ symbol of the physical uplink shared channel or the physical downlink shared channel scheduled for the user.

With reference to the third aspect or the fourth aspect, in some possible scenarios, in addition to the second reference signal, another reference signal, for example, a CSI-RS, an SRS, or a DMRS, may also be mapped to the user scheduled bandwidth, and resource collision may occur between the second reference signal and the other reference signal. On a resource in collision, the other reference signal may be muted, that is, may have zero power. To avoid resource collision, mapping rules for the second reference signal may further include the following several types:

In a first type, the second reference signal is not mapped to a resource element to which another reference signal is mapped, or the second reference signal has zero power on the resource element, or the second reference signal is punctured by the other reference signal.

In a second type, on a symbol to which another reference signal is mapped, the second reference signal is not mapped to a subcarrier to which the other reference signal is mapped. Specifically, on the symbol to which the other reference signal is mapped, a subcarrier of the second reference signal is mapped to a subcarrier other than the subcarrier to which the other reference signal is mapped.

In a third type, on a subcarrier to which the other reference signal is mapped, the second reference signal is mapped to none of the symbols of a PUSCH (or a PDSCH) scheduled for a user. Specifically, on each symbol in a resource block (RB) to which the other reference signal is mapped, a subcarrier of the second reference signal is mapped to a subcarrier other than the subcarrier to which the other reference signal is mapped.

In a fourth type, the second reference signal is mapped to an adjacent symbol of a symbol to which the other reference signal is mapped. To be specific, the PT-RS is also mapped to one symbol preceding and/or one symbol following the symbol to which the other reference signal is mapped. Optionally, the mapping of the second reference signal to the adjacent symbol of the symbol to which the other reference signal is mapped is determined based on a location of the symbol to which the other reference signal is mapped. Optionally, mapping of the second reference signal to a slot is determined based on the symbol to which the other reference signal is mapped.

In a fifth type, the second reference signal is mapped to an adjacent symbol of a symbol to which the other reference signal is mapped, the adjacent symbol of the symbol to which the other reference signal is mapped is used as a time-domain reference, and the second reference signal is mapped based on the time-domain density of the second reference signal. Optionally, the mapping of the second reference signal to the adjacent symbol of the symbol to which the other reference signal is mapped is determined based on a location of the symbol to which the other reference signal is mapped, that is, the time-domain reference is determined based on the symbol to which the other reference signal is mapped. Optionally, mapping of the second reference signal to a slot is determined based on the symbol to which the other reference signal is mapped.

In a sixth type, a mapping rule for the second reference signal is determined depending on whether a physical downlink/uplink shared channel is mapped to a symbol to which the other reference signal is mapped. Specifically, if a physical downlink/uplink shared channel is also mapped to the symbol to which the other reference signal is mapped, the second or third type of mapping rule is used for the second reference signal; or if no physical downlink/uplink shared channel is mapped to the symbol to which the other reference signal is mapped, the first, fourth, or fifth type of mapping rule is used.

With reference to the third aspect or the fourth aspect, in some embodiments, on the symbol to which the other reference signal is mapped, a quantity of subcarriers to which the second reference signal is actually mapped may be less than or equal to the calculated quantity of subcarriers. The following specifically describes several manners of mapping the second reference signal to the symbol to which the other reference signal is mapped.

In a first manner, within the bandwidth that can be used for PUSCH (or PDSCH) transmission, a subcarrier location to which the second reference signal is mapped on the symbol to which the other reference signal is mapped may be the same as a subcarrier location to which the second reference signal is mapped on a symbol to which the other reference signal is not mapped.

In a second manner, if the second reference signal is mapped in the first mapping manner to the symbol to which the other reference signal is mapped, and a quantity of subcarriers, within the bandwidth that can be used for PUSCH (or PDSCH) transmission, to which the second reference signal is actually mapped is less than a required quantity of subcarriers, within the bandwidth that can be used for PUSCH (or PDSCH) transmission, to which the second reference signal is mapped, the second reference signal may be additionally mapped to another subcarrier within the bandwidth that can be used for PUSCH (or PDSCH) transmission.

In a third manner, on the symbol to which the other reference signal is mapped, the second reference signal is evenly distributed within the bandwidth that can be used for PUSCH (or PDSCH) transmission. A subcarrier location to which the second reference signal is mapped on the symbol does not need to be the same as a subcarrier location to which the second reference signal is mapped on a symbol to which the other reference signal is not mapped.

With reference to the third aspect or the fourth aspect, in some embodiments, on a symbol i to which the second reference signal is mapped, a quantity of subcarriers to which the second reference signal is mapped is determined based on the frequency-domain density of the second reference signal and a bandwidth, on the symbol i, that can be used for physical uplink shared channel transmission or physical downlink shared channel transmission, where i≥0, and i is a positive integer. A manner of determining the frequency-domain density of the second reference signal is described further below in the present application.

With reference to the third aspect or the fourth aspect, the time-domain density may be related to at least one of a bandwidth part (BP), a cyclic prefix (CP) type, a subcarrier spacing, and a modulation and coding scheme (MCS). A correspondence between the time-domain density and the at least one of the bandwidth part (BP), the CP type, the subcarrier spacing, and the MCS may be predefined, or may be configured by using higher layer signaling.

Specifically, each subcarrier spacing may correspond to one or more MCS thresholds. MCSs between two adjacent MCS thresholds correspond to a same time-domain density. The one or more MCS thresholds may be predefined, or may be configured by using higher layer signaling.

Specifically, different subcarrier spacings may correspond to different modulation order thresholds. To be specific, different tables of correspondence between modulation order thresholds and time-domain densities may be configured for different subcarrier spacings. Specifically, modulation order thresholds corresponding to different subcarrier spacings may be predefined by a protocol, or may be configured by the network device by using higher layer signaling (for example, RRC signaling).

With reference to the third aspect or the fourth aspect, the time-domain density may be related to at least one of a bandwidth part (BP) and an MCS. A correspondence between the time-domain density and the at least one of the BP and the MCS may be predefined by a protocol, or may be configured by using higher layer signaling.

The BP may be a consecutive segment of resource in the frequency domain. For example, one BP includes K consecutive subcarriers, where K is an integer greater than 0. For another example, one BP is a frequency-domain resource in which N non-overlapping consecutive physical resource blocks (PRBs) are located, where N is an integer greater than 0, and a subcarrier spacing of the PRB may be 15 k, 30 k, 60 k, or other subcarrier spacing values. For another example, one BP is a frequency-domain resource in which N non-overlapping consecutive physical resource block (PRB) groups are located, and one PRB group includes M consecutive PRBs, where both M and N are integers greater than 0, and a subcarrier spacing of the PRB may be 15 k, 30 k, 60 k, or other subcarrier spacing values. For another example, for a terminal, a BP length is less than or equal to a maximum bandwidth supported by the terminal. For another example, one BP corresponds to one or more subcarrier spacings.

Specifically, each BP may correspond to one group of MCS thresholds, and different MCS thresholds correspond to different PT-RS time-domain densities. The MCS thresholds may be predefined, or may be configured by using higher layer signaling.

Specifically, different tables of correspondence between modulation order thresholds and time-domain densities may be configured for different BPs. Specifically, modulation order thresholds corresponding to different BPs may be predefined by a protocol, or may be configured by the network device by using higher layer signaling (for example, RRC signaling).

With reference to the third aspect or the fourth aspect, the frequency-domain density may be related to at least one of a bandwidth part (BP), a CP type, the user scheduled bandwidth, a subcarrier spacing, and an MCS. A correspondence between the frequency-domain density and the at least one of the CP type, the user scheduled bandwidth, the subcarrier spacing, the MCS, and the bandwidth part (BP) is predefined, or is configured by using higher layer signaling.

Specifically, each subcarrier spacing may correspond to one or more scheduled bandwidth BW thresholds, and scheduled bandwidths between two adjacent BW thresholds correspond to a same frequency-domain density. The one or more BW thresholds may be predefined, or may be configured by using higher layer signaling.

Specifically, different subcarrier spacings may correspond to different scheduled bandwidth thresholds. To be specific, different tables of correspondence between scheduled bandwidth thresholds and time-domain densities may be configured for different subcarrier spacings. Specifically, scheduled bandwidth thresholds corresponding to different subcarrier spacings may be predefined by a protocol, or may be configured by the network device by using higher layer signaling (for example, RRC signaling).

Specifically, each BP may correspond to one group of scheduled bandwidth thresholds, and different scheduled bandwidth thresholds correspond to different PT-RS frequency-domain densities. The scheduled bandwidth thresholds may be predefined, or may be configured by using higher layer signaling.

Specifically, different tables of correspondence between scheduled bandwidth thresholds and frequency-domain densities may be configured for different BPs. Specifically, scheduled bandwidth thresholds corresponding to different BPs may be predefined by a protocol, or may be configured by the network device by using higher layer signaling (for example, RRC signaling).

According to a fifth aspect, this application provides a data transmission method. The method may include: performing, by the terminal, rate matching on a coded hybrid automatic repeat request-acknowledgement (HARQ-ACK), rank indication (RI), or channel quality indication (CQI) based on a time-domain density and a frequency-domain density of a PT-RS for uplink HARQ-ACK, RI, or CQI transmission, and sending coded data resulting from the matching to a network device; and correspondingly, receiving, by the network device, the coded data sent by the terminal.

In the fifth aspect, the second reference signal is used for phase tracking. The coded data is obtained by performing rate matching on coded data based on the time-domain density and the frequency-domain density of the second reference signal mapped to a user scheduled bandwidth. A quantity of resources occupied by the second reference signal within the user scheduled bandwidth may be determined based on the time-domain density and the frequency-domain density of the PT-RS.

Specifically, for calculation of a quantity of coded modulation symbols used to transmit the HARQ-ACK, the RI, or the CQI, a time-frequency resource occupied by the second reference signal needs to be excluded, and the quantity Q' of coded modulation symbols may be expressed as follows:

$$Q' = \min\left(\left\lceil \frac{O \cdot \left(M_{sc}^{PUSCH-initial} \cdot N_{symb}^{PUSCH-initial} - N_{RE}^{PT-RS}\right) \cdot \beta_{offset}^{PUSCH}}{\sum_{r=0}^{C-1} K_r} \right\rceil, 4 \cdot M_{sc}^{PUSCH}\right)$$

where $N_{RE}^{PT-RS}$ represents a quantity of resource elements used to transmit a PT-RS that are within an uplink scheduled bandwidth of the user, O represents a quantity of coded bits used to transmit the HARQ-ACK, the RI, or the CQI, $M_{sc}^{PUSCH}$ represents a quantity of subcarriers within the uplink scheduled bandwidth of the user, $N_{symb}^{PUSCH-initial}$ represents a quantity of symbols used for initial uplink shared channel transmission, $M_{sc}^{PUSCH-initial}$ represents a quantity of subcarriers used for initial uplink shared channel transmission within the scheduled bandwidth, $\beta_{offset}^{PUSCH}$ represents an offset of a physical uplink shared channel, and $\Sigma_{r=0}^{C-1} K_r$ represents a total quantity of coded bits of C code blocks.

For a manner of determining the time-domain density and the frequency-domain density of the PT-RS, refer to the content described in the third aspect or the fourth aspect. Details are not repeated here.

According to a sixth aspect, a network device is provided, including a plurality of function modules, configured to correspondingly perform the method provided in the first aspect or the method provided in any one of the possible implementations of the first aspect.

According to a seventh aspect, a terminal is provided, including a plurality of function modules, configured to correspondingly perform the method provided in the first aspect or the method provided in any one of the possible implementations of the first aspect.

According to an eighth aspect, a network device is provided, configured to perform the reference signal transmission method described in the first aspect. The wireless network device may include a memory, and a processor, a transmitter, and a receiver that are coupled to the memory. The transmitter is configured to send a signal to another wireless network device, for example, a terminal. The receiver is configured to receive a signal sent by the other wireless network device, for example, the terminal. The memory is configured to store implementation code of the reference signal transmission method described in the first aspect. The processor is configured to execute the program code stored in the memory, that is, perform the method provided in the first aspect or the method provided in any one of the possible implementations of the first aspect.

According to a ninth aspect, a terminal is provided, configured to perform the reference signal transmission method described in the first aspect. The terminal may include a memory, and a processor, a transmitter, and a receiver that are coupled with to the memory. The transmitter is configured to send a signal to another wireless network device, for example, a network device. The receiver is configured to receive a signal sent by the other wireless network device, for example, the network device. The memory is configured to store implementation code of the reference signal transmission method described in the first aspect. The processor is configured to execute the program code stored in the memory, that is, perform the method provided in the first aspect or the method provided in any one of the possible implementations of the first aspect.

According to a tenth aspect, a network device is provided, including a plurality of function modules, configured to correspondingly perform the method provided in the second aspect or the method provided in any one of the possible implementations of the second aspect.

According to an eleventh aspect, a terminal is provided, including a plurality of function modules, configured to correspondingly perform the method provided in the second aspect or the method provided in any one of the possible implementations of the second aspect.

According to a twelfth aspect, a network device is provided, configured to perform the reference signal transmission method described in the second aspect. The wireless network device may include a memory, and a processor, a transmitter, and a receiver that are coupled to the memory. The transmitter is configured to send a signal to another wireless network device, for example, a terminal. The receiver is configured to receive a signal sent by the other wireless network device, for example, the terminal. The memory is configured to store implementation code of the reference signal transmission method described in the second aspect. The processor is configured to execute the program code stored in the memory, that is, perform the method provided in the second aspect or the method provided in any one of the possible implementations of the second aspect.

According to a thirteenth aspect, a terminal is provided, configured to perform the reference signal transmission method described in the second aspect. The terminal may include a memory, and a processor, a transmitter, and a receiver that are coupled to the memory. The transmitter is configured to send a signal to another wireless network device, for example, a network device. The receiver is configured to receive a signal sent by the other wireless network device, for example, the network device. The memory is configured to store implementation code of the reference signal transmission method described in the second aspect. The processor is configured to execute the program code stored in the memory, that is, perform the method provided in the second aspect or the method provided in any one of the possible implementations of the second aspect.

According to a fourteenth aspect, a network device is provided, including a plurality of function modules, configured to correspondingly perform the method provided in the third aspect or the method provided in any one of the possible implementations of the third aspect.

According to a fifteenth aspect, a terminal is provided, including a plurality of function modules, configured to correspondingly perform the method provided in the third aspect or the method provided in any one of the possible implementations of the third aspect.

According to a sixteenth aspect, a network device is provided, configured to perform the reference signal transmission method described in the third aspect. The wireless network device may include a memory, and a processor, a transmitter, and a receiver that are coupled to the memory. The transmitter is configured to send a signal to another wireless network device, for example, a terminal. The receiver is configured to receive a signal sent by the other wireless network device, for example, the terminal. The memory is configured to store implementation code of the reference signal transmission method described in the third aspect. The processor is configured to execute the program code stored in the memory, that is, perform the method provided in the third aspect or the method provided in any one of the possible implementations of the third aspect.

According to a seventeenth aspect, a terminal is provided, configured to perform the reference signal transmission method described in the third aspect. The terminal may include a memory, and a processor, a transmitter, and a receiver that are coupled to the memory. The transmitter is configured to send a signal to another wireless network device, for example, a network device. The receiver is configured to receive a signal sent by the other wireless network device, for example, the network device. The memory is configured to store implementation code of the reference signal transmission method described in the third aspect. The processor is configured to execute the program code stored in the memory, that is, perform the method provided in the third aspect or the method provided in any one of the possible implementations of the third aspect.

According to an eighteenth aspect, a network device is provided, including a plurality of function modules, configured to correspondingly perform the method provided in the fourth aspect or the method provided in any one of the possible implementations of the fourth aspect.

According to a nineteenth aspect, a terminal is provided, including a plurality of function modules, configured to correspondingly perform the method provided in the fourth aspect or the method provided in any one of the possible implementations of the fourth aspect.

According to a twentieth aspect, a network device is provided, configured to perform the reference signal transmission method described in the fourth aspect. The wireless network device may include a memory, and a processor, a transmitter, and a receiver that are coupled to the memory. The transmitter is configured to send a signal to another wireless network device, for example, a terminal. The receiver is configured to receive a signal sent by the other wireless network device, for example, the terminal. The memory is configured to store implementation code of the reference signal transmission method described in the fourth aspect. The processor is configured to execute program code stored in the memory, that is, perform the method provided in the fourth aspect or the method provided in any one of the possible implementations of the fourth aspect.

According to a twenty-first aspect, a terminal is provided, configured to perform the reference signal transmission method described in the fourth aspect. The terminal may include a memory, and a processor, a transmitter, and a receiver that are coupled to the memory. The transmitter is configured to send a signal to another wireless network device, for example, a network device. The receiver is configured to receive a signal sent by the other wireless network device, for example, the network device. The memory is configured to store implementation code of the reference signal transmission method described in the fourth aspect. The processor is configured to execute program code stored in the memory, that is, perform the method provided in the fourth aspect or the method provided in any one of the possible implementations of the fourth aspect.

According to a twenty-second aspect, a network device is provided, including a plurality of function modules, configured to correspondingly perform the method provided in any one of the fifth aspect or the possible implementations of the fifth aspect.

According to a twenty-third aspect, a terminal is provided, including a plurality of function modules, configured to correspondingly perform the method provided in any one of the fifth aspect or the possible implementations of the fifth aspect.

According to a twenty-fourth aspect, a network device is provided, configured to perform the reference signal transmission method described in the fifth aspect. The network device may include a memory, and a processor, a transmitter, and a receiver that are coupled to the memory. The transmitter is configured to send a signal to another wireless network device, for example, a terminal. The receiver is configured to receive a signal sent by the other wireless network device, for example, the terminal. The memory is configured to store implementation code of the data transmission method described in the fifth aspect. The processor is configured to execute program code stored in the memory, that is, perform the method provided in any one of the fifth aspect or the possible implementations of the fifth aspect.

According to a twenty-fifth aspect, a terminal is provided, configured to perform the reference signal transmission method described in the fifth aspect. The terminal may include a memory, and a processor, a transmitter, and a receiver that are coupled to the memory. The transmitter is configured to send a signal to another wireless network device, for example, a network device. The receiver is configured to receive a signal sent by the other wireless network device, for example, the network device. The memory is configured to store implementation code of the data transmission method described in the fifth aspect. The processor is configured to execute program code stored in the memory, that is, perform the method provided in any one of the fifth aspect or the possible implementations of the fifth aspect.

According to a twenty-sixth aspect, a communications system is provided. The communications system includes a network device and a terminal.

In an implementation, the network device may be the network device described in the sixth aspect or the eighth aspect, and the terminal may be the network device described in the seventh aspect or the ninth aspect.

In an implementation, the network device may be the network device described in the tenth aspect or the twelfth aspect, and the terminal may be the network device described in the eleventh aspect or the thirteenth aspect.

In an implementation, the network device may be the network device described in the fourteenth aspect or the sixteenth aspect, and the terminal may be the network device described in the fifteenth aspect or the seventeenth aspect.

In an implementation, the network device may be the network device described in the eighteenth aspect or the twentieth aspect, and the terminal may be the network device described in the nineteenth aspect or the twenty-first aspect.

In an implementation, the network device may be the network device described in the twenty-second aspect or the twenty-fourth aspect, and the terminal may be the network device described in the twenty-third aspect or the twenty-fifth aspect.

According to a twenty-seventh aspect, a computer readable storage medium is provided. The readable storage medium stores program code for implementing the method described in the first aspect, the second aspect, the third aspect, the fourth aspect, or the fifth aspect. The program code includes an executable instruction for performing the method described in the first aspect, the second aspect, the third aspect, the fourth aspect, or the fifth aspect.

According to a twenty-eighth aspect, a communication method is provided, including:

determining a time-domain density of a phase tracking reference signal (PT-RS) based on a currently active bandwidth part BP and a modulation and coding scheme (MCS);

determining a frequency-domain density of the PT-RS based on the currently active bandwidth part BP and a scheduled bandwidth BW; and mapping the PT-RS to one or more symbols or mapping the PT-RS to a plurality of subcarriers based on the time-domain density and the frequency-domain density.

In a possible design, one or more BP values are included. One or more groups of MCS thresholds are configured for some or all BPs, or one or more groups of MCS thresholds are configured for some or all BP groups. Configuration information of one or more groups of MCS thresholds corresponding to one or more BPs or one or more BP groups may be sent by using higher layer signaling, for example, RRC signaling, a media access control control element (MAC CE), a broadcast message, a system message, or a combination of at least two thereof.

In a possible design, one or more BP values are included. One or more groups of MCS thresholds corresponding to one or more BPs, or one or more groups of MCS thresholds corresponding to one or more BP groups are obtained based on prestored information.

In another possible design, one BP group includes one or more BPs, and the BPs in the BP group have a same subcarrier spacing, or the BPs in the BP group have a same numerology. Optionally, the BPs in the BP group, or the BP group is determined based on the subcarrier spacing. Optionally, the BPs in the BP group, or the BP group is determined based on the numerology.

In another possible design, the base station configures one or more pieces of BP group information, and may send the one or more pieces of BP group information by using higher layer signaling, for example, RRC signaling, a MAC CE, a broadcast message, a system message, or a combination of at least two thereof. The BP group information may be used to indicate one or more BPs in a BP group.

In another possible design, the base station configures BP grouping rule information, and may send the BP grouping rule information by using higher layer signaling, for example, RRC signaling, a MAC CE, a broadcast message, a system message, or a combination of at least two thereof. The BP grouping rule information may be used to indicate a BP grouping rule. Optionally, the grouping rule is that BPs with a same subcarrier spacing form one group. Optionally, the grouping rule may be alternatively that BPs with a same numerology form one group.

In another possible design, correspondence information between MCS thresholds and time-domain densities is configured for the BP, or correspondence information between MCS thresholds and time-domain densities is configured for the BP group. Configuration information of one or more correspondences, corresponding to one or more BPs or one or more BP groups, between MCS thresholds and time-domain densities may be sent by using higher layer signaling, for example, RRC signaling, a MAC CE, a broadcast message, a system message, or a combination of at least two thereof.

In another possible design, correspondence information between time-domain densities and MCS thresholds corresponding to the BP, or correspondence information between time-domain densities and MCS thresholds corresponding to the BP group is obtained based on prestored information.

In another possible design, one or more BP values are included. One or more groups of scheduled bandwidth thresholds are configured for some or all BPs, or one or more groups of scheduled bandwidth thresholds are configured for some or all BP groups. Configuration information of one or more groups of scheduled bandwidth thresholds corresponding to one or more BPs or one or more BP groups may be sent by using higher layer signaling, for example, RRC signaling, a MAC CE, a broadcast message, a system message, or a combination of at least two thereof.

In a possible design, one or more BP values are included. One or more groups of scheduled bandwidth thresholds corresponding to one or more BPs, or one or more groups of scheduled bandwidth thresholds corresponding to the one or more BP groups are obtained based on prestored information.

In another possible design, correspondence information between scheduled bandwidth thresholds and frequency-domain densities is configured for the BP, or correspondence information between scheduled bandwidth thresholds and frequency-domain densities is configured for the BP group. Configuration information of information about one or more correspondences, corresponding to one or more BPs or one or more BP groups, between scheduled bandwidth thresholds and frequency-domain densities may be sent by using higher layer signaling, for example, RRC signaling, a MAC CE, a broadcast message, a system message, or a combination of at least two thereof.

In another possible design, correspondence information between frequency-domain densities and scheduled bandwidth thresholds corresponding to the BP, or correspondence information between frequency-domain densities and scheduled bandwidth thresholds corresponding to the BP group is obtained based on prestored information.

In another possible design, a plurality of BPs are configured for a peer device by using higher layer signaling. The peer device may be a terminal.

In another possible design, indication information is sent by using a MAC CE or a downlink control indicator (DCI), to indicate the currently active BP. The indication information may be number or index information of the BP.

In another possible design, a group of MCS thresholds corresponding to a BP currently active for a peer device, or correspondence information, corresponding to the BP currently active for the peer device, between MCS thresholds and time-domain densities is determined based on the BP currently active for the peer device.

In another possible design, a group of MCS thresholds corresponding to a BP currently active for a peer device, or correspondence information, corresponding to the BP currently active for the peer device, between MCS thresholds and time-domain densities is determined based on a BP group to which the BP currently active for the peer device belongs; and the time-domain density of the PT-RS is determined based on a currently scheduled MCS and the correspondence information.

In another possible design, a group of scheduled bandwidth thresholds corresponding to a BP currently active for a peer device, or correspondence information, corresponding to the BP currently active for the peer device, between scheduled bandwidth thresholds and frequency-domain densities is determined based on the BP currently active for the peer device.

In another possible design, a group of scheduled bandwidth thresholds corresponding to a BP currently active for a peer device, or correspondence information, corresponding to the BP currently active for the peer device, between scheduled bandwidth thresholds and frequency-domain densities is determined based on a BP group to which the BP currently active for the peer device belongs; and the frequency-domain density of the PT-RS is determined based on a currently scheduled scheduled bandwidth and the correspondence information.

It should be understood that the method provided in the twenty-eighth aspect may be performed by a base station or a terminal.

When the method is performed by a terminal, there are special designs. Details are as follows:

In a possible design, a plurality of candidate BPs configured by a base station are received by using higher layer signaling. The higher layer signaling may be RRC signaling, a MAC CE, a broadcast message, a system message, or a combination of at least two thereof.

In another possible design, signaling is received from a base station. The signaling is used to indicate a currently active BP. The signaling may be a MAC CE or a DCI.

In another possible design, higher layer signaling is received from a base station. The signaling is used to indicate BP grouping rule information, or is used to indicate a BP group to which a currently active BP belongs, or is used to indicate BP group information. The higher layer signaling may be RRC signaling, a MAC CE, a broadcast message, a system message, or a combination of at least two thereof. The BP group information may be used to indicate one or more BPs in a BP group.

In another possible design, a BP group is determined according to a predefined or prestored rule. Optionally, the BP group is determined based on a subcarrier spacing, and BPs in the BP group have a same subcarrier spacing. Optionally, the BP group is determined based on a numerology, and BPs in the BP group have a same numerology.

In another possible design, correspondence information between MCS thresholds and time-domain densities is prestored. One or more BPs correspond to information about one or more correspondences between MCS thresholds and time-domain densities, or one or more BP groups correspond to one or more correspondences between MCS thresholds and time-domain densities.

In another possible design, correspondence information between scheduled bandwidth thresholds and frequency-domain densities is prestored. One or more BPs correspond to information about one or more correspondences between scheduled bandwidth thresholds and frequency-domain densities, or one or more BP groups correspond to information about one or more correspondences between scheduled bandwidth thresholds and frequency-domain densities.

In another possible design, configuration information is received from a base station by using higher layer signaling. The configuration information is used to indicate one or more groups of scheduled bandwidth thresholds corresponding to one or more BPs, or one or more groups of scheduled bandwidth thresholds corresponding to one or more BP groups. The higher layer signaling may be RRC signaling, a MAC CE, a broadcast message, a system message, or a combination of at least two thereof.

In another possible design, configuration information is received from a base station by using higher layer signaling. The configuration information is used to indicate one or more groups of MCS thresholds corresponding to one or more BPs, or one or more groups of MCS thresholds corresponding to one or more BP groups. The higher layer signaling may be RRC signaling, a MAC CE, a broadcast message, a system message, or a combination of at least two thereof.

In another possible design, configuration information is received from a base station by using higher layer signaling. The configuration information is used to indicate information about one or more correspondences, corresponding to one or more BPs, between MCS thresholds and time-domain densities, or information about one or more correspondences, corresponding to one or more BP groups, between MCS thresholds and time-domain densities. The higher layer signaling may be RRC signaling, a MAC CE, a broadcast message, a system message, or a combination of at least two thereof.

In another possible design, configuration information is received from a base station by using higher layer signaling. The configuration information is used to indicate information about one or more correspondences, corresponding to one or more BPs, between scheduled bandwidth thresholds and frequency-domain densities, or information about one or more correspondences, corresponding to one or more BP groups, between scheduled bandwidth thresholds and frequency-domain densities.

In another possible design, the terminal prestores at least one of the following information:
correspondence information, corresponding to a BP, between MCS thresholds and time-domain densities;
correspondence information, corresponding to a BP group, between MCS thresholds and time-domain densities;
correspondence information, corresponding to a BP, between scheduled bandwidth thresholds and frequency-domain densities; and
correspondence information, corresponding to a BP group, between scheduled bandwidth thresholds and frequency-domain densities.

In another possible design, a group of MCS thresholds corresponding to the currently active BP, or correspondence information, corresponding to the currently active BP, between MCS thresholds and time-domain densities is determined based on the currently active BP.

In another possible design, based on a BP group to which the currently active BP belongs, a group of MCS thresholds corresponding to the BP group, or correspondence information, corresponding to the BP group, between MCS thresholds and time-domain densities is determined; and
the time-domain density of the PT-RS is determined based on a currently scheduled MCS and the correspondence information.

In another possible design, a group of scheduled bandwidth thresholds corresponding to the currently active BP, or correspondence information, corresponding to the currently active BP, between scheduled bandwidth thresholds and frequency-domain densities is determined based on the currently active BP.

In another possible design, based on a BP group to which the currently active BP belongs, a group of scheduled bandwidth thresholds corresponding to the BP group, or correspondence information, corresponding to the BP group, between scheduled bandwidth thresholds and frequency-domain densities is determined; and
the frequency-domain density of the PT-RS is determined based on a current scheduled bandwidth and the correspondence information.

According to a twenty-ninth aspect, a communication method is provided, including:
receiving one or more symbols, where a phase tracking reference signal PT-RS is mapped to the one or more symbols;
obtaining a time-domain density of the PT-RS based on a currently active bandwidth part BP and a modulation order MCS;
obtaining a frequency-domain density of the PT-RS based on the currently active bandwidth part BP and a scheduled bandwidth BW; and
obtaining the PT-RS from the one or more symbols based on the time-domain density and the frequency-domain density.

In a possible design, signaling is received from a peer device. The signaling carries information used to indicate one or more BPs. The signaling may be RRC signaling.

In another possible design, signaling is received from a peer device. The signaling carries information used to indicate the currently active BP. The signaling may be MAC CE or DCI signaling.

In another possible design, signaling is received from the peer device. The signaling is used to indicate BP grouping rule information, or is used to indicate a BP group to which the currently active BP belongs, or is used to indicate BP group information.

In another possible design, the BP group to which the currently active BP belongs is determined according to a predefined or prestored rule. Optionally, the BP group to which the currently active BP belongs is determined based on a subcarrier spacing, and BPs in the BP group have a same subcarrier spacing. Optionally, the BP group to which the currently active BP belongs is determined based on a numerology, and BPs in the BP group have a same numerology.

In another possible design, correspondence information between MCS thresholds and time-domain densities is prestored. One or more BPs correspond to information about one or more correspondences between MCS thresholds and time-domain densities, or one or more BP groups correspond to information about one or more correspondences between MCS thresholds and time-domain densities.

In another possible design, correspondence information between scheduled bandwidth thresholds and frequency-domain densities is prestored. One or more BPs correspond to information about one or more correspondences between scheduled bandwidth thresholds and frequency-domain densities, or one or more BP groups correspond to information about one or more correspondences between scheduled bandwidth thresholds and frequency-domain densities.

In another possible design, configuration information is received from a base station by using higher layer signaling. The configuration information is used to indicate one or more groups of scheduled bandwidth thresholds corresponding to one or more BPs, or one or more groups of scheduled bandwidth thresholds corresponding to one or more BP groups. The higher layer signaling may be RRC signaling, a MAC CE, a broadcast message, a system message, or a combination of at least two thereof.

In another possible design, configuration information is received from a base station by using higher layer signaling. The configuration information is used to indicate one or more groups of MCS thresholds corresponding to one or more BPs, or one or more groups of MCS thresholds corresponding to one or more BP groups. The higher layer signaling may be RRC signaling, a MAC CE, a broadcast message, a system message, or a combination of at least two thereof.

In another possible design, configuration information is received from a base station by using higher layer signaling. The configuration information is used to indicate information about one or more correspondences, corresponding to one or more BPs, between MCS thresholds and time-domain densities, or information about one or more correspondences, corresponding to one or more BP groups, between MCS thresholds and time-domain densities. The higher layer signaling may be RRC signaling, a MAC CE, a broadcast message, a system message, or a combination of at least two thereof.

In another possible design, configuration information is received from a base station by using higher layer signaling. The configuration information is used to indicate information about one or more correspondences, corresponding to one or more BPs, between scheduled bandwidth thresholds and frequency-domain densities, or information about one or more correspondences, corresponding to one or more BP groups, between scheduled bandwidth thresholds and frequency-domain densities.

In another possible design, the terminal prestores at least one of the following information:
correspondence information, corresponding to a BP, between MCS thresholds and time-domain densities;
correspondence information, corresponding to a BP group, between MCS thresholds and time-domain densities;
correspondence information, corresponding to a BP, between scheduled bandwidth thresholds and frequency-domain densities; and
correspondence information, corresponding to a BP group, between scheduled bandwidth thresholds and frequency-domain densities.

In another possible design, a group of MCS thresholds corresponding to the currently active BP, or correspondence information, corresponding to the currently active BP, between MCS thresholds and time-domain densities is determined based on the currently active BP.

In another possible design, based on a BP group to which the currently active BP belongs, a group of MCS thresholds corresponding to the BP group, or correspondence information, corresponding to the BP group, between MCS thresholds and time-domain densities is determined; and the time-domain density of the PT-RS is determined based on a currently scheduled MCS and the correspondence information.

In another possible design, a group of scheduled bandwidth thresholds corresponding to the currently active BP, or correspondence information, corresponding to the currently active BP, between scheduled bandwidth thresholds and frequency-domain densities is determined based on the currently active BP.

In another possible design, based on a BP group to which the currently active BP belongs, a group of scheduled bandwidth thresholds corresponding to the BP group, or correspondence information, corresponding to the BP group, between scheduled bandwidth thresholds and frequency-domain densities is determined;
the frequency-domain density of the PT-RS is determined based on a current scheduled bandwidth and the correspondence information; and
the frequency-domain density of the PT-RS is determined based on a current scheduled bandwidth and the correspondence information.

In another possible design, correspondence information between one or more BPs and scheduled bandwidths, and correspondence information between the one or more BPs and frequency-domain densities are received.

In another possible design, correspondence information between one or more BP groups and scheduled bandwidths, and correspondence information between the one or more BP groups and frequency-domain densities are received.

In another possible design, correspondence information between one or more BPs and MCSs and correspondence information between the one or more BPs and time-domain densities are received.

In another possible design, correspondence information between one or more BP groups and MCSs and correspondence information between the one or more BP groups and time-domain densities are received.

It should be understood that the twenty-ninth aspect may be performed by a terminal or a base station. When the twenty-ninth aspect is performed by a base station, there are special designs. Details are as follows:

In a possible design, one or more BP values are included. One or more groups of MCS thresholds are configured for some or all BPs, or one or more groups of MCS thresholds are configured for some or all BP groups. Configuration information of one or more groups of MCS thresholds corresponding to one or more BPs or one or more BP groups may be sent by using higher layer signaling, for example, RRC signaling, a MAC CE, a broadcast message, a system message, or a combination of at least two thereof.

In a possible design, one or more BP values are included. One or more groups of MCS thresholds corresponding to one or more BPs, or one or more groups of MCS thresholds corresponding to one or more BP groups are obtained based on prestored information.

In another possible design, one BP group includes one or more BPs, and the BPs in the BP group have a same subcarrier spacing, or the BPs in the BP group have a same numerology. Optionally, the BPs in the BP group, or the BP group is determined based on the subcarrier spacing. Optionally, the BPs in the BP group, or the BP group is determined based on the numerology.

In another possible design, the base station configures one or more pieces of BP group information, and may send the one or more pieces of BP group information by using higher layer signaling, for example, RRC signaling, a MAC CE, a broadcast message, a system message, or a combination of at least two thereof. The BP group information may be used to indicate one or more BPs in a BP group.

In another possible design, the base station configures BP grouping rule information, and may send the BP grouping rule information by using higher layer signaling, for example, RRC signaling, a MAC CE, a broadcast message, a system message, or a combination of at least two thereof. The BP grouping rule information may be used to indicate a BP grouping rule. Optionally, the grouping rule is that BPs with a same subcarrier spacing form one group. Optionally, the grouping rule may be alternatively that BPs with a same numerology form one group.

In another possible design, correspondence information between MCS thresholds and time-domain densities is configured for the BP, or correspondence information between MCS thresholds and time-domain densities is configured for the BP group. Configuration information of one or more correspondences, corresponding to one or more BPs or one or more BP groups, between MCS thresholds and time-domain densities may be sent by using higher layer signaling, for example, RRC signaling, a MAC CE, a broadcast message, a system message, or a combination of at least two thereof.

In another possible design, one or more BP values are included. One or more groups of scheduled bandwidth thresholds are configured for some or all BPs, or one or more groups of scheduled bandwidth thresholds are configured for some or all BP groups. Configuration information of one or more groups of scheduled bandwidth thresholds corresponding to one or more BPs or one or more BP groups may be sent by using higher layer signaling, for example, RRC signaling, a MAC CE, a broadcast message, a system message, or a combination of at least two thereof.

In a possible design, one or more BP values are included. One or more groups of scheduled bandwidth thresholds corresponding to one or more BPs, or one or more groups of scheduled bandwidth thresholds corresponding to the one or more BP groups are obtained based on prestored information.

In another possible design, correspondence information between scheduled bandwidth thresholds and frequency-domain densities is configured for the BP, or correspondence information between scheduled bandwidth thresholds and frequency-domain densities is configured for the BP group. Configuration information of information about one or more correspondences, corresponding to one or more BPs or one or more BP groups, between scheduled bandwidth thresholds and frequency-domain densities may be sent by using higher layer signaling, for example, RRC signaling, a MAC CE, a broadcast message, a system message, or a combination of at least two thereof.

In another possible design, a plurality of BPs are configured for a terminal device by using higher layer signaling.

In another possible design, indication information is sent by using a MAC CE or a DCI, to indicate the currently active BP. The indication information may be number or index information of the BP.

In another possible design, a group of MCS thresholds corresponding to a BP currently active for a peer device, or correspondence information, corresponding to the BP currently active for the peer device, between MCS thresholds and time-domain densities is determined based on the BP currently active for the peer device.

In another possible design, a group of MCS thresholds corresponding to a BP currently active for a peer device, or correspondence information, corresponding to the BP currently active for the peer device, between MCS thresholds and time-domain densities is determined based on a BP group to which the BP currently active for the peer device belongs; and the time-domain density of the PT-RS is determined based on a currently scheduled MCS and the correspondence information.

In another possible design, a group of scheduled bandwidth thresholds corresponding to a BP currently active for a peer device, or correspondence information, corresponding to the BP currently active for the peer device, between scheduled bandwidth thresholds and frequency-domain densities is determined based on the BP currently active for the peer device.

In another possible design, a group of scheduled bandwidth thresholds corresponding to a BP currently active for a peer device, or correspondence information, corresponding to the BP currently active for the peer device, between scheduled bandwidth thresholds and frequency-domain densities is determined based on a BP group to which the BP currently active for the peer device belongs; and the frequency-domain density of the PT-RS is determined based on a currently scheduled scheduled bandwidth and the correspondence information.

According to a thirtieth aspect, an apparatus is provided, including a processing unit and a communications unit.

The processing unit is configured to determine a time-domain density of a phase tracking reference signal PT-RS based on a currently active bandwidth part BP and a modulation order MCS, and determine a frequency-domain density of the PT-RS based on the currently active bandwidth part BP and a scheduled bandwidth.

The communications unit is configured to map the PT-RS to one or more symbols or map the PT-RS to a plurality of subcarriers based on the time-domain density and the frequency-domain density.

In a possible design, the processing unit is further configured to configure one or more groups of MCS thresholds for one or more BPs, or configure one group of MCS thresholds for one or more BP groups. The communications unit is further configured to send, by using higher layer signaling, for example, RRC signaling, a MAC CE, a broadcast message, a system message, or a combination of at least two thereof, configuration information of the one or more groups of MCS thresholds corresponding to the one or more BPs or the one or more BP groups.

In another possible design, the processing unit is further configured to determine a BP group based on a subcarrier spacing, or determine a BP group based on a numerology.

In another possible design, the processing unit is further configured to configure BP group information. The BP group information may be used to indicate one or more BPs in a BP group. The group information may be sent by using higher layer signaling. The higher layer signaling may be RRC signaling, a MAC CE, a broadcast message, a system message, or a combination of at least two thereof.

In another possible design, the processing unit is further configured to configure BP grouping rule information. The BP grouping rule information may be sent by using higher layer signaling, for example, RRC signaling, a MAC CE, a broadcast message, a system message, or a combination of at least two thereof. The BP grouping rule information may be used to indicate a BP grouping rule.

In another possible design, the apparatus further includes a storage unit, configured to store a rule for grouping a plurality of BPs into a BP group. The processing unit is further configured to determine, according to the prestored rule, a BP group to which the current BP belongs.

In another possible design, the processing unit is further configured to configure BP grouping rule information.

In another possible design, the processing unit is further configured to configure, for the BP, correspondence information between MCS thresholds and time-domain densities, or configure, for the BP group, correspondence information between MCS thresholds and time-domain densities. The communications unit is further configured to send, by using higher layer signaling, for example, RRC signaling, a MAC CE, a broadcast message, a system message, or a combination of at least two thereof, configuration information of the correspondence information, corresponding to the BP or the BP group, between MCS thresholds and time-domain densities.

In another possible design, the apparatus further includes the storage unit, configured to store the correspondence information, corresponding to the BP, between MCS thresholds and time-domain densities, or the correspondence information, corresponding to the BP group, between MCS thresholds and time-domain densities.

In another possible design, the processing unit is further configured to configure one or more groups of scheduled bandwidth thresholds for one or more BPs, or configure one or more groups of scheduled bandwidth thresholds for one or more BP groups. The communications unit is further configured to send, by using higher layer signaling, for example, RRC signaling, a MAC CE, a broadcast message, a system message, or a combination of at least two thereof, configuration information of the one or more groups of scheduled bandwidth thresholds corresponding to the one or more BPs or the one or more BP groups.

In another possible design, the processing unit is further configured to configure, for the BP, correspondence information between scheduled bandwidth thresholds and frequency-domain densities, or configure, for the BP group, correspondence information between scheduled bandwidth thresholds and frequency-domain densities. The communications unit is further configured to send, by using higher layer signaling, for example, RRC signaling, a MAC CE, a broadcast message, a system message, or a combination of at least two thereof, configuration information of a correspondence, corresponding to the BP or the BP group, between scheduled bandwidth thresholds and frequency-domain densities.

In another possible design, the apparatus further includes the storage unit, configured to store the correspondence information, corresponding to the BP, between MCS thresholds and time-domain densities, or the correspondence information, corresponding to the BP group, between MCS thresholds and time-domain densities.

In another possible design, the communications unit is further configured to send a plurality of BPs to a peer device by using higher layer signaling, for example, RRC signaling.

In another possible design, the communications unit is further configured to send indication information to a peer device, to indicate the currently active BP. The indication information may be MAC CE signaling or a DCI.

In another possible design, the processing unit is further configured to determine, based on a BP currently active for a peer device, a group of MCS thresholds corresponding to the BP currently active for the peer device, or correspondence information, corresponding to the BP currently active for the peer device, between MCS thresholds and time-domain densities.

In another possible design, the processing unit is further configured to determine, based on a BP group to which a BP currently active for a peer device belongs, a group of MCS thresholds corresponding to the BP currently active for the peer device, or correspondence information, corresponding to the BP currently active for the peer device, between MCS thresholds and time-domain densities.

In another possible design, the processing unit is further configured to determine the time-domain density of the PT-RS based on a currently scheduled MCS and the correspondence information.

In another possible design, the processing unit is further configured to determine, based on a BP currently active for a peer device, a group of scheduled bandwidth thresholds corresponding to the BP currently active for the peer device, or correspondence information, corresponding to the BP currently active for the peer device, between scheduled bandwidth thresholds and frequency-domain densities.

In another possible design, the processing unit is further configured to determine, based on a BP group to which a BP currently active for a peer device belongs, a group of scheduled bandwidth thresholds corresponding to the BP currently active for the peer device, or correspondence information, corresponding to the BP currently active for the peer device, between scheduled bandwidth thresholds and frequency-domain densities.

In another possible design, the processing unit is further configured to determine the frequency-domain density of the PT-RS based on a currently scheduled scheduled bandwidth and the correspondence information.

In another possible design, the apparatus is a terminal or a network device.

It should be understood that the apparatus provided in the thirtieth aspect may be a base station or a terminal.

When the apparatus is a terminal, there are special designs. Details are as follows:

In a possible design, the communications unit is further configured to receive, by using higher layer signaling, a plurality of candidate BPs configured by a base station. For example, the higher layer signaling is RRC signaling, a MAC CE, a broadcast message, a system message, or a combination of at least two thereof.

In another possible design, the communications unit is further configured to receive signaling from a base station. The signaling is used to indicate a currently active BP. The signaling may be a MAC CE or a DCI.

In another possible design, the communications unit receives higher layer signaling from a base station. The signaling is used to indicate BP grouping rule information, or is used to indicate a BP group to which the currently active BP belongs, or is used to indicate BP group information. The higher layer signaling may be RRC signaling, a MAC CE, a broadcast message, a system message, or a combination of at least two thereof. The BP group information may be used to indicate one or more BPs in a BP group.

In another possible design, the apparatus further includes a storage unit, configured to store a rule for grouping a plurality of BPs into a BP group. A BP group to which a current BP belongs is determined according to the prestored rule.

In another possible design, the apparatus further includes a storage unit, configured to store correspondence information between MCS thresholds and time-domain densities. One or more BPs correspond to information about one or more correspondences between MCS thresholds and time-domain densities, or one or more BP groups correspond to information about one or more correspondences between MCS thresholds and time-domain densities.

In another possible design, the apparatus further includes a storage unit, configured to store correspondence information between scheduled bandwidth thresholds and frequency-domain densities. One or more BPs correspond to information about one or more correspondences between scheduled bandwidth thresholds and frequency-domain densities, or one or more BP groups correspond to information about one or more correspondences between scheduled bandwidth thresholds and frequency-domain densities.

In another possible design, the communications unit is further configured to receive configuration information from a base station by using higher layer signaling. The configuration information is used to indicate one or more groups of scheduled bandwidth thresholds corresponding to one or more BPs, or one or more groups of scheduled bandwidth thresholds corresponding to one or more BP groups. The higher layer signaling may be RRC signaling, a MAC CE, a broadcast message, a system message, or a combination of at least two thereof.

In another possible design, the communications unit is further configured to receive configuration information from a base station by using higher layer signaling. The configuration information is used to indicate one or more groups of MCS thresholds corresponding to one or more BPs, or one or more groups of MCS thresholds corresponding to one or more BP groups. The higher layer signaling may be RRC signaling, a MAC CE, a broadcast message, a system message, or a combination of at least two thereof.

In another possible design, the communications unit is further configured to receive configuration information from a base station by using higher layer signaling. The configuration information is used to indicate information about one or more correspondences, corresponding to one or more BPs, between MCS thresholds and time-domain densities, or information about one or more correspondences, corresponding to one or more BP groups, between MCS thresholds and time-domain densities. The higher layer signaling may be RRC signaling, a MAC CE, a broadcast message, a system message, or a combination of at least two thereof.

In another possible design, the communications unit is further configured to receive configuration information from a base station by using higher layer signaling. The configuration information is used to indicate information about one or more correspondences, corresponding to one or more BPs, between scheduled bandwidth thresholds and frequency-domain densities, or information about one or more correspondences, corresponding to one or more BP groups, between scheduled bandwidth thresholds and frequency-domain densities.

In another possible design, the storage unit is further configured to store at least one of the following information:
correspondence information, corresponding to a BP, between MCS thresholds and time-domain densities;
correspondence information, corresponding to a BP group, between MCS thresholds and time-domain densities;
correspondence information, corresponding to a BP, between scheduled bandwidth thresholds and frequency-domain densities; and
correspondence information, corresponding to the BP group, between scheduled bandwidth thresholds and frequency-domain densities.

In another possible design, the processing unit is further configured to determine, based on the currently active BP, a group of MCS thresholds corresponding to the currently active BP, or correspondence information, corresponding to the currently active BP, between MCS thresholds and time-domain densities.

In another possible design, the processing unit is further configured to determine, based on a BP group to which the currently active BP belongs, a group of MCS thresholds corresponding to the BP group, or correspondence information, corresponding to the BP group, between MCS thresholds and time-domain densities; and
the processing unit is further configured to determine the time-domain density of the PT-RS based on a currently scheduled MCS and the correspondence information.

In another possible design, the processing unit is further configured to determine, based on the currently active BP, a group of scheduled bandwidth thresholds corresponding to the currently active BP, or correspondence information, corresponding to the currently active BP, between scheduled bandwidth thresholds and frequency-domain densities.

In another possible design, the processing unit is further configured to determine, based on a BP group to which the currently active BP belongs, a group of scheduled bandwidth thresholds corresponding to the BP group, or correspondence information, corresponding to the BP group, between scheduled bandwidth thresholds and frequency-domain densities; and the processing unit is further configured to determine the frequency-domain density of the PT-RS based on a current scheduled bandwidth and the correspondence information.

According to a thirty-first aspect, an apparatus is provided, including a processing unit and a communications unit.

The communications unit is configured to receive one or more symbols, where a phase tracking reference signal PT-RS is mapped to the one or more symbols.

The processing unit is configured to: obtain a time-domain density of the PT-RS based on a current bandwidth part BP and a modulation order MCS;
obtain a frequency-domain density of the PT-RS based on the current bandwidth part BP and a scheduled bandwidth; and
obtain the PT-RS from the one or more symbols based on the time-domain density and the frequency-domain density.

In a possible design, the apparatus further includes a storage unit, configured to store a correspondence information table of an MCS and a time-domain density. Each BP corresponds to one correspondence information table, or each BP group corresponds to one correspondence information table.

In another possible design, the communications unit is further configured to receive signaling from a peer device. The signaling carries information used to indicate one or more BPs.

In another possible design, the communications unit is further configured to receive signaling from the peer device. The signaling carries information used to indicate the currently active BP.

In another possible design, the communications unit is further configured to receive signaling from the peer device. The signaling is used to indicate BP grouping rule information, or is used to indicate a BP group to which the currently active BP belongs, or is used to indicate BP group information.

In another possible design, the storage unit is configured to store a rule for grouping a plurality of BPs into a BP group, and the processing unit is configured to determine, according to the prestored rule, a BP group to which the current BP belongs.

In another possible design, the storage unit is configured to store correspondence information between MCS thresholds and time-domain densities. One or more BPs correspond to information about one or more correspondences between MCS thresholds and time-domain densities, or one or more BP groups correspond to information about one or more correspondences between MCS thresholds and time-domain densities.

In another possible design, the storage unit is configured to store correspondence information between scheduled bandwidth thresholds and frequency-domain densities. One or more BPs correspond to information about one or more correspondences between scheduled bandwidth thresholds and frequency-domain densities, or one or more BP groups correspond to information about one or more correspondences between scheduled bandwidth thresholds and frequency-domain densities.

In another possible design, the communications unit is further configured to receive configuration information from a base station by using higher layer signaling. The configuration information is used to indicate one or more groups of scheduled bandwidth thresholds corresponding to one or more BPs, or one or more groups of scheduled bandwidth thresholds corresponding to one or more BP groups. The higher layer signaling may be RRC signaling, a MAC CE, a broadcast message, a system message, or a combination of at least two thereof.

In another possible design, the communications unit is further configured to receive configuration information from a base station by using higher layer signaling. The configuration information is used to indicate one or more groups of MCS thresholds corresponding to one or more BPs, or one or more groups of MCS thresholds corresponding to one or more BP groups. The higher layer signaling may be RRC signaling, a MAC CE, a broadcast message, a system message, or a combination of at least two thereof.

In another possible design, the communications unit is further configured to receive configuration information from a base station by using higher layer signaling. The configuration information is used to indicate information about one or more correspondences, corresponding to one or more BPs, between MCS thresholds and time-domain densities, or information about one or more correspondences, corresponding to one or more BP groups, between MCS thresholds and time-domain densities. The higher layer signaling may be RRC signaling, a MAC CE, a broadcast message, a system message, or a combination of at least two thereof.

In another possible design, the communications unit is further configured to receive configuration information from a base station by using higher layer signaling. The configuration information is used to indicate information about one or more correspondences, corresponding to one or more BPs, between scheduled bandwidth thresholds and frequency-domain densities, or information about one or more correspondences, corresponding to one or more BP groups, between scheduled bandwidth thresholds and frequency-domain densities.

In another possible design, the storage unit is configured to store at least one of the following information:

correspondence information, corresponding to a BP, between MCS thresholds and time-domain densities;

correspondence information, corresponding to a BP group, between MCS thresholds and time-domain densities;

correspondence information, corresponding to a BP, between scheduled bandwidth thresholds and frequency-domain densities; and correspondence information, corresponding to a BP group, between scheduled bandwidth thresholds and frequency-domain densities.

In another possible design, the processing unit is further configured to determine, based on the currently active BP, a group of MCS thresholds corresponding to the currently active BP, or correspondence information, corresponding to the currently active BP, between MCS thresholds and time-domain densities.

In another possible design, the processing unit is further configured to determine, based on a BP group to which the currently active BP belongs, a group of MCS thresholds corresponding to the BP group, or correspondence information, corresponding to the BP group, between MCS thresholds and time-domain densities; and the processing unit is further configured to determine the time-domain density of the PT-RS based on a currently scheduled MCS and the correspondence information.

In another possible design, the processing unit is further configured to determine, based on the currently active BP, a group of scheduled bandwidth thresholds corresponding to the currently active BP, or correspondence information, corresponding to the currently active BP, between scheduled bandwidth thresholds and frequency-domain densities.

In another possible design, the processing unit is further configured to determine, based on a BP group to which the currently active BP belongs, a group of scheduled bandwidth thresholds corresponding to the BP group, or correspondence information, corresponding to the BP group, between scheduled bandwidth thresholds and frequency-domain densities; and the processing unit is further configured to determine the frequency-domain density of the PT-RS based on a current scheduled bandwidth and the correspondence information.

In another possible design, the communications unit is further configured to receive correspondence information between one or more BPs and scheduled bandwidths, and correspondence information between the one or more BPs and frequency-domain densities.

In another possible design, the communications unit is further configured to receive correspondence information between one or more BP groups and scheduled bandwidths, and correspondence information between the one or more BP groups and frequency-domain densities.

In another possible design, the communications unit is further configured to receive correspondence information between one or more BPs and MCSs, and correspondence information between the one or more BPs and time-domain densities.

In another possible design, the communications unit is further configured to receive correspondence information between one or more BP groups and MCSs, and correspondence information between the one or more BP groups and time-domain densities.

In another possible design, the apparatus is a terminal or a network device.

It should be understood that the apparatus provided in the thirty-first aspect may be a terminal or a base station. When the apparatus is a base station, there are special designs. Details are as follows:

In a possible design, the processing unit is further configured to configure one or more groups of MCS thresholds for some or all BPs, or configure one or more groups of MCS thresholds for some or all BP groups. The communications unit is further configured to send, by using higher layer signaling, for example, RRC signaling, a MAC CE, a broadcast message, a system message, or a combination of at least two thereof, configuration information of one or more groups of MCS thresholds corresponding to one or more BPs or one or more BP groups.

In a possible design, the processing unit is further configured to obtain, based on prestored information, one or more groups of MCS thresholds corresponding to one or more BPs, or one or more groups of MCS thresholds corresponding to one or more BP groups.

In another possible design, the apparatus further includes a storage unit, configured to store a rule for grouping a plurality of BPs into a BP group. The processing unit is further configured to determine, according to the prestored rule, a BP group to which the current BP belongs.

In another possible design, the processing unit is further configured for the base station to configure one or more pieces of BP group information, and the communications unit is further configured to send the one or more pieces of BP group information by using higher layer signaling, for example, RRC signaling, a MAC CE, a broadcast message, a system message, or a combination of at least two thereof. The BP group information may be used to indicate one or more BPs in a BP group.

In another possible design, the processing unit is further configured for the base station to configure BP grouping rule information, and the communications unit is further configured to send the BP grouping rule information by using higher layer signaling, for example, RRC signaling, a MAC CE, a broadcast message, a system message, or a combination of at least two thereof.

In another possible design, the processing unit is further configured to configure, for the BP, correspondence information between MCS thresholds and time-domain densities, or configure, for the BP group, correspondence information between MCS thresholds and time-domain densities. The communications unit is further configured to send, by using higher layer signaling, for example, RRC signaling, a MAC CE, a broadcast message, a system message, or a combination of at least two thereof, configuration information of one or more correspondences, corresponding to one or more BPs or one or more BP groups, between MCS thresholds and time-domain densities.

In another possible design, the processing unit is further configured to configure one or more groups of scheduled bandwidth thresholds for some or all BPs, or configure one or more groups of scheduled bandwidth thresholds for some or all BP groups. The communications unit is further configured to send, by using higher layer signaling, for example, RRC signaling, a MAC CE, a broadcast message, a system message, or a combination of at least two thereof, configuration information of one or more scheduled bandwidth thresholds corresponding to one or more BPs or one or more BP groups.

In another possible design, the processing unit is further configured to obtain, based on prestored information, one or more groups of scheduled bandwidth thresholds corresponding to one or more BPs, or one or more groups of scheduled bandwidth thresholds corresponding to one or more BP groups.

In another possible design, the processing unit is further configured to configure, for the BP, correspondence information between scheduled bandwidth thresholds and frequency-domain densities, or configure, for the BP group, correspondence information between scheduled bandwidth thresholds and frequency-domain densities. The communications unit is further configured to send, by using higher layer signaling, for example, RRC signaling, a MAC CE, a broadcast message, a system message, or a combination of at least two thereof, configuration information of information about one or more correspondences, corresponding to one or more BPs or one or more BP groups, between scheduled bandwidth thresholds and frequency-domain densities.

In another possible design, the base station prestores at least one of the following information:
 correspondence information, corresponding to a BP, between MCS thresholds and time-domain densities;
 correspondence information, corresponding to a BP group, between MCS thresholds and time-domain densities;
 correspondence information, corresponding to a BP, between scheduled bandwidth thresholds and frequency-domain densities; and
 correspondence information, corresponding to a BP group, between scheduled bandwidth thresholds and frequency-domain densities.

In another possible design, the communications unit is further configured to configure a plurality of BPs for a terminal device by using higher layer signaling.

In another possible design, the communications unit is further configured to send indication information by using a MAC CE or a DCI, to indicate the currently active BP. The indication information may be number or index information of the BP.

In another possible design, the processing unit is further configured to determine, based on a BP currently active for a peer device, a group of MCS thresholds corresponding to the BP currently active for the peer device, or correspondence information, corresponding to the BP currently active for the peer device, between MCS thresholds and time-domain densities.

In another possible design, the processing unit is further configured to determine, based on a BP group to which a BP currently active for a peer device belongs, a group of MCS thresholds corresponding to the BP currently active for the peer device, or correspondence information, corresponding to the BP currently active for the peer device, between MCS thresholds and time-domain densities; and
 the processing unit is further configured to determine the time-domain density of the PT-RS based on a currently scheduled MCS and the correspondence information.

In another possible design, the processing unit is further configured to determine, based on a BP currently active for a peer device, a group of scheduled bandwidth thresholds corresponding to the BP currently active for the peer device, or correspondence information, corresponding to the BP currently active for the peer device, between scheduled bandwidth thresholds and frequency-domain densities.

In another possible design, the processing unit is further configured to determine, based on a BP group to which a BP currently active for a peer device belongs, a group of scheduled bandwidth thresholds corresponding to the BP currently active for the peer device, or correspondence information, corresponding to the BP currently active for the peer device, between scheduled bandwidth thresholds and frequency-domain densities; and
 the processing unit is further configured to determine the frequency-domain density of the PT-RS based on a currently scheduled scheduled bandwidth and the correspondence information.

With reference to any one of the twenty-eighth aspect to the thirty-first aspect, the frequency-domain density is any value of 0, ½, ¼, ⅛, and 1/16.

With reference to any one of the twenty-eighth aspect to the thirty-first aspect, the time-domain density is any value of 0, ½, ¼, and 1.

BRIEF DESCRIPTION OF DRAWINGS

To describe technical solutions in embodiments of the present application more clearly, the following briefly describes the accompanying drawings.

DESCRIPTION OF EMBODIMENTS

Terms used to describe exemplary embodiments of this application are merely used to explain exemplary embodiments of this application, and are not intended to limit this application.

Figure 1:
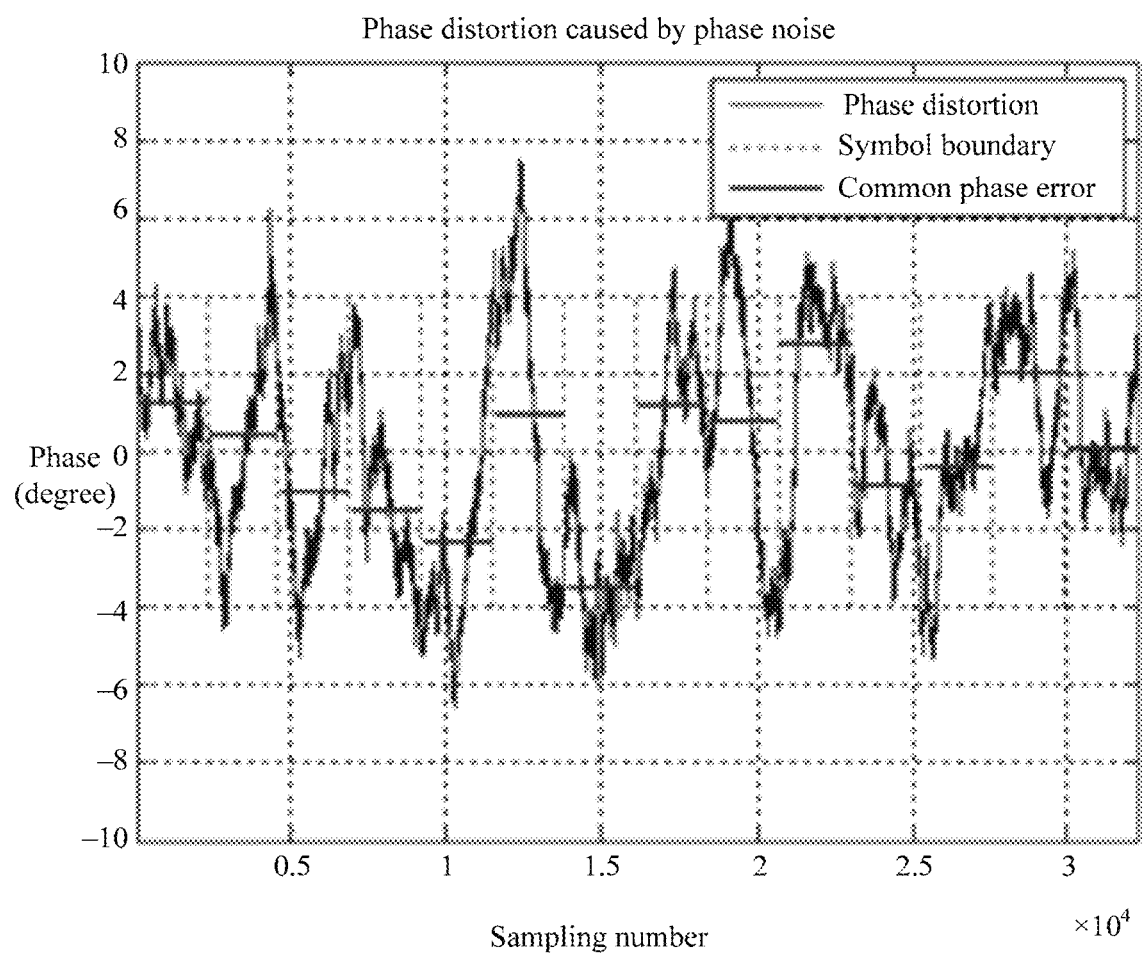
FIG. 1 is a schematic diagram of phase noise related to this application.
Figure 2:
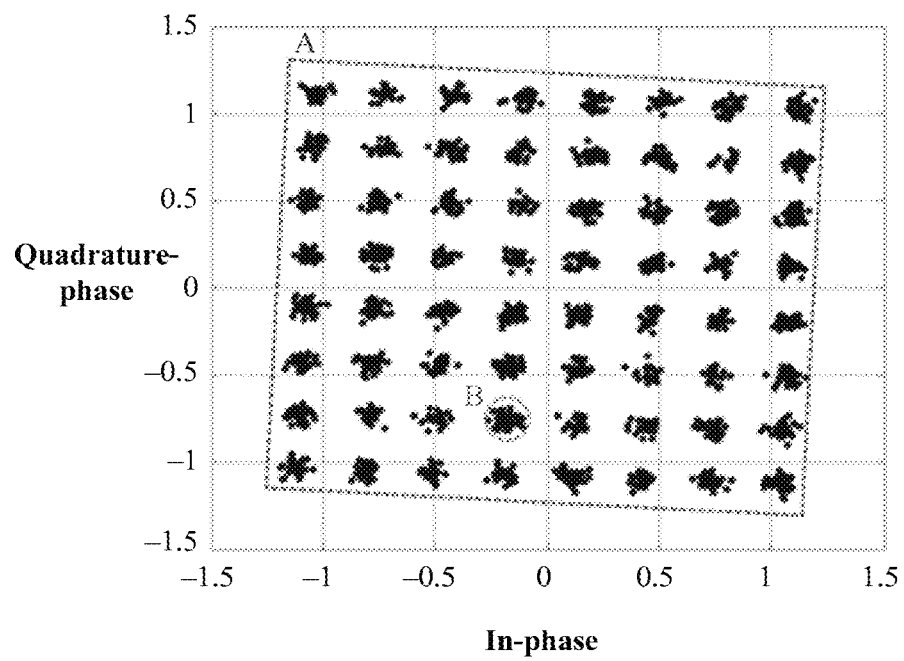
FIG. 2 is a schematic diagram of phase error caused by phase noise, related to this application.
Figure 3A:
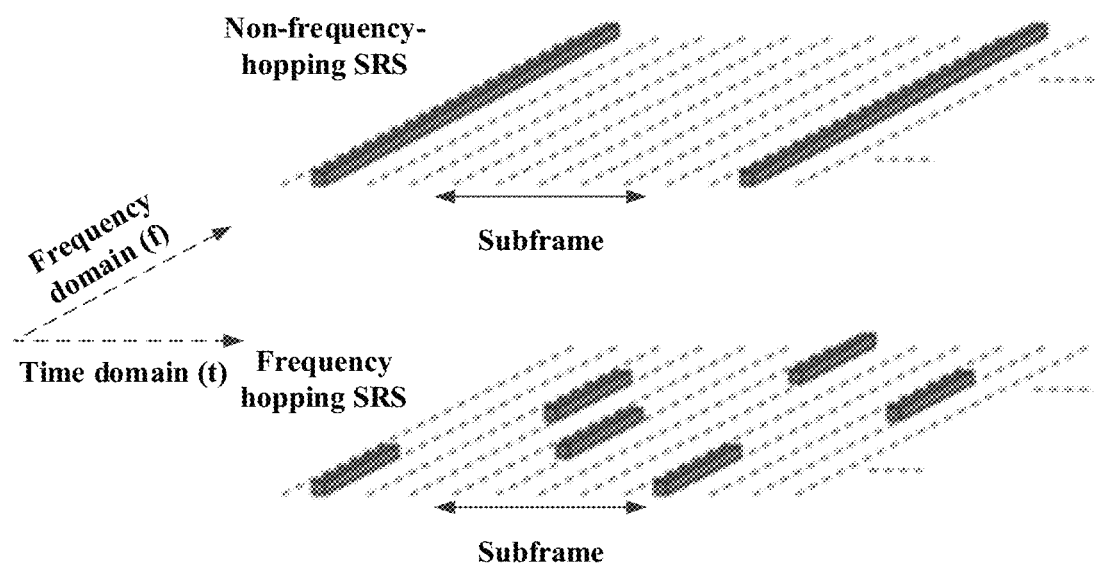
FIG. 3A to FIG. 3C are schematic diagrams of resource configuration manners for a sounding reference signal, related to this application.
Figure 3B:
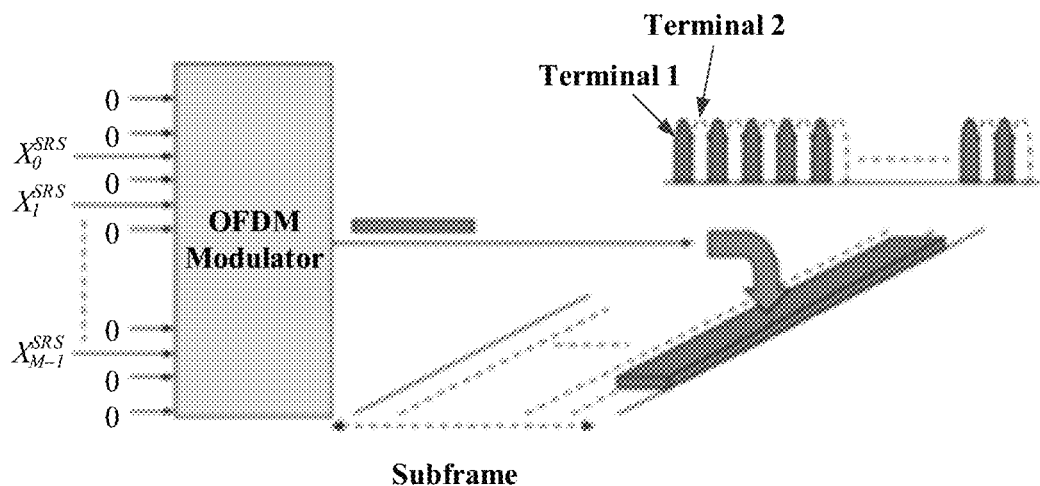
Figure 3C:
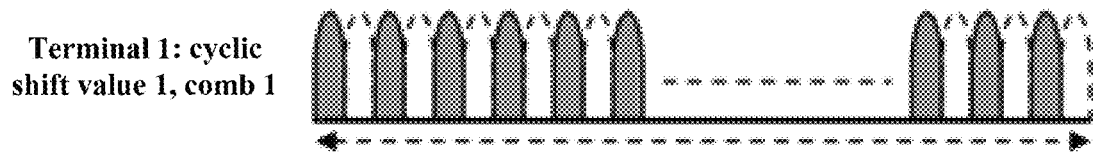
Figure 3C:
Figure 4:
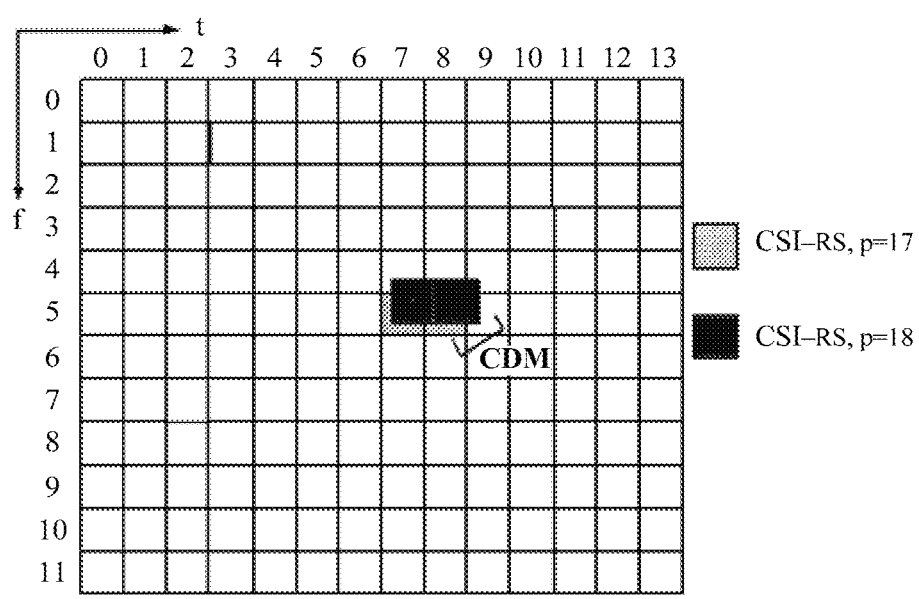
FIG. 4 is a schematic diagram of a resource configuration manner for a channel state information reference signal, related to this application.
Figure 5:
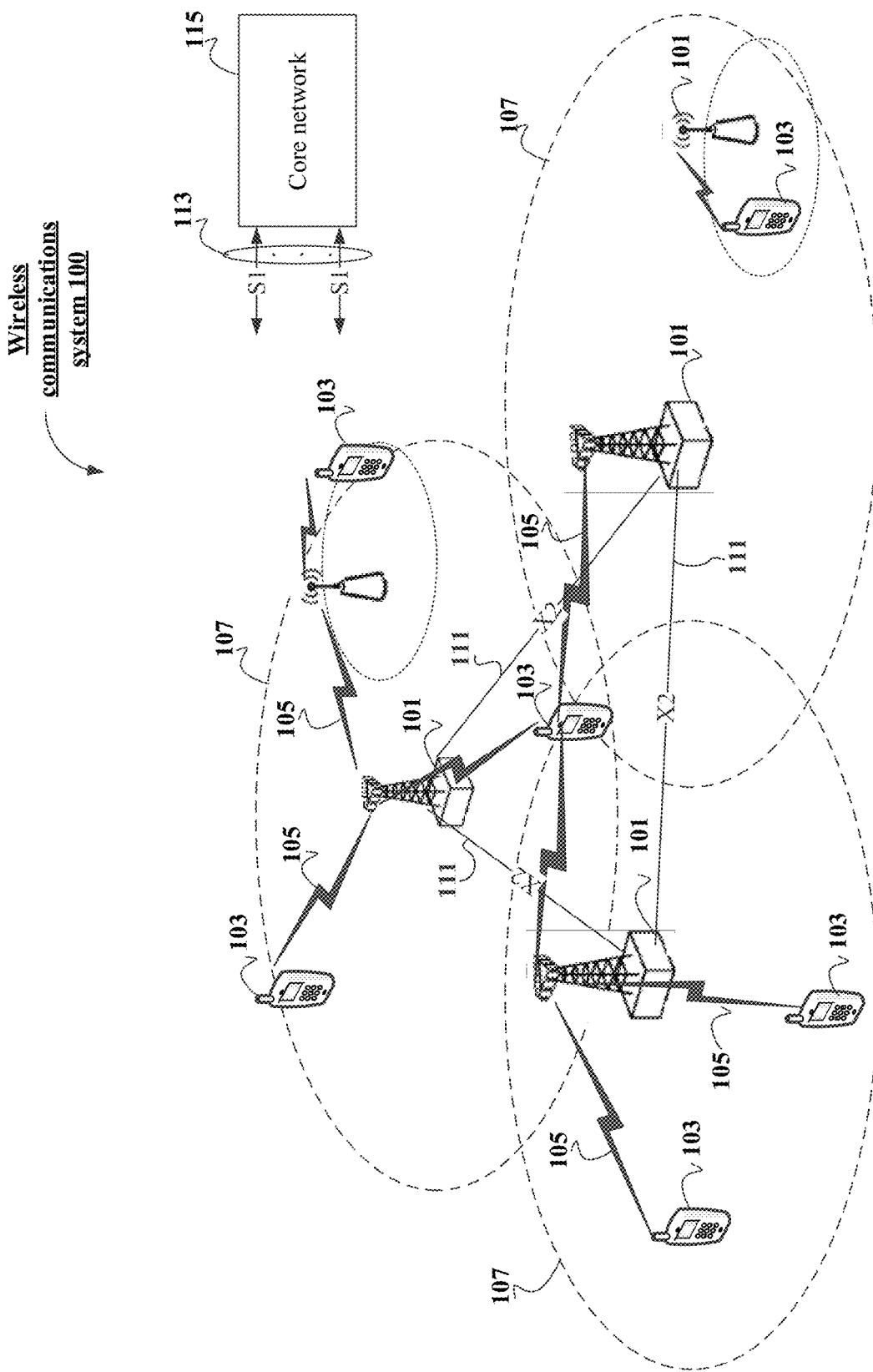
FIG. 5 is a schematic architectural diagram of a wireless communications system according to this application.

FIG. 5 shows a wireless communications system related to this application. The wireless communications system may work at a high frequency band, and is not limited to a long term evolution (LTE) system, but may be alternatively a future evolved $5^{th}$ generation (5G) mobile communications system, a new radio (NR) system, a machine-to-machine (M2M) communications system, or the like. As shown in FIG. 5, the wireless communications system 10 may include: one or more network devices 101, one or more terminals 103, and a core network 115.

The network device 101 may be a base station. The base station may be configured to communicate with one or more terminals, or may be configured to communicate with one or more base stations provided with some terminal functions (for example, communication between a macro base station and a micro base station such as an access point). The base station may be a base transceiver station (BTS) in a time division synchronous code division multiple access (TD-SCDMA) system; or may be an evolved NodeB (eNB) in an LTE system, or a base station in a 5G system or a new radio (NR) system. Alternatively, the base station may be an access point (AP), a transmission node (Trans TRP), a central unit (CU), or another network entity, and may include some or all of functions of these network entities.

The terminal 103 may be distributed in the entire wireless communications system 100, and may be stationary or moving. In some embodiments of this application, the terminal 103 may be a mobile device, a mobile station, a mobile unit, an M2M terminal, a radio unit, a remote unit, a user agent, a mobile client, or the like.

Specifically, the network device 101 may be configured to communicate with the terminal 103 through one or more antennas under control of a network device controller (not shown). In some embodiments, the network device controller may be a part of the core network 115, or may be integrated in the network device 101. Specifically, the network device 101 may be configured to transmit control information or user data to the core network 115 through a backhaul interface 113 (for example, an SI interface). Specifically, network devices 101 may also directly or indirectly communicate with each other through a backhaul interface 111 (for example, an X2 interface).

The wireless communications system shown in FIG. 5 is merely intended to describe technical solutions in this application more clearly, but not to limit this application. A person of ordinary skill in the art may know that with evolution of network architectures and emergence of new service scenarios, technical solutions provided in embodiments of the present application are also applicable to similar technical problems.

Figure 6:
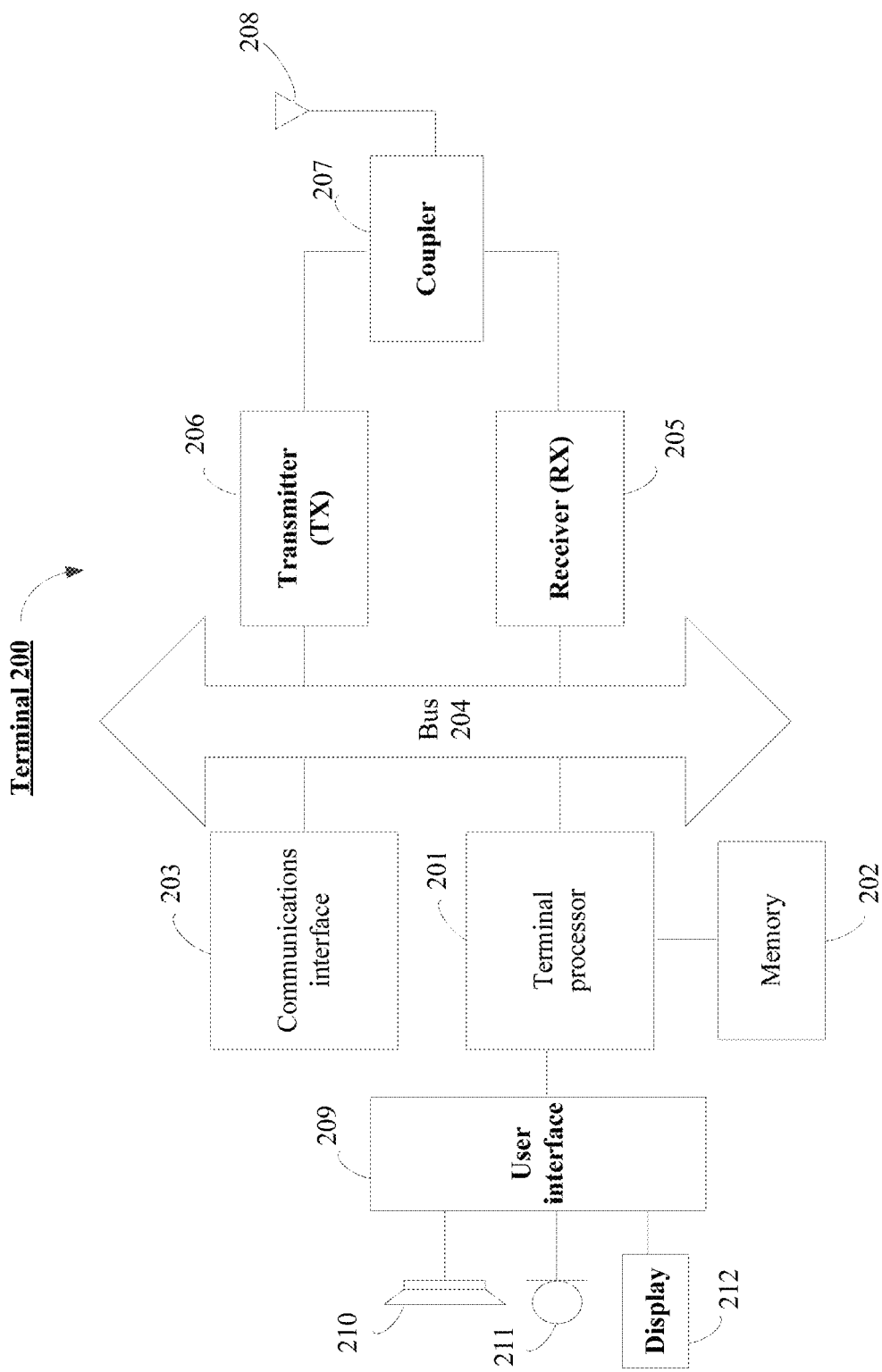
FIG. 6 is a schematic structural diagram of a terminal according to this application.

FIG. 6 shows a terminal 200 provided in some embodiments of this application. As shown in FIG. 6, the terminal 200 may include: one or more terminal processors 201, a memory 202, a communications interface 203, a receiver 205, a transmitter 206, a coupler 207, an antenna 208, a user interface 202, and input/output modules (including an audio input/output module 210, a key input module 211, a display 212, and the like). These components may be connected by using a bus 204 or in other manners. FIG. 6 shows an example in which these components are connected by using a bus.

The communications interface 203 may be used by the terminal 200 to communicate with another communications device, for example, a network device. Specifically, the network device may be a network device 300 shown in FIG. 8. Specifically, the communications interface 203 may be a long term evolution (LTE) (4G) communications interface, or may be a 5G communications interface or a future new radio communications interface. In addition to a wireless communications interface, the terminal 200 may be further configured with a wired communications interface 203, for example, a local access network (LAN) interface.

The transmitter 206 may be configured to perform transmission processing, for example, signal modulation, on a signal output by the terminal processor 201. The receiver 205 may be configured to perform reception processing, for example, signal demodulation, on a mobile communication signal received by the antenna 208. In some embodiments of this application, the transmitter 206 and the receiver 205 may be regarded as a wireless modem. In the terminal 200, there may be one or more transmitters 206 and receivers 205. The antenna 208 may be configured to convert electromagnetic energy in a transmission line into an electromagnetic wave in free space, or convert an electromagnetic wave in free space into electromagnetic energy in a transmission line. The coupler 207 is configured to divide a mobile communication signal received by the antenna 208 into a plurality of signals, and distribute the signals to a plurality of receivers 205.

In addition to the transmitter 206 and the receiver 205 shown in FIG. 6, the terminal 200 may further include other communications components, for example, a Global Positioning System (GPS) module, a Bluetooth module, and a wireless fidelity (Wi-Fi) module. In addition to the foregoing wireless communication signals, the terminal 200 may further support other wireless communication signals, for example, a satellite signal and a short-wave signal. In addition to wireless communications, the terminal 200 may be further configured with a wired network interface (for example, a LAN interface) to support wired communications.

The input/output modules may be configured to implement interaction between the terminal 200 and a user or an external environment, and may mainly include the audio input/output module 210, the key input module 211, the display 212, and the like. Specifically, the input/output modules may further include a camera, a touchscreen, a sensor, and the like. All the input/output modules communicate with the terminal processor 201 through the user interface 209.

The memory 202 is coupled to the terminal processor 201, and is configured to store various software programs and/or a plurality of instructions. Specifically, the memory 202 may include a high-speed random access memory, and may also include a nonvolatile memory, for example, one or more magnetic disk storage devices, a flash memory device, or other nonvolatile solid-state storage devices. The memory 202 may store an operating system (hereinafter referred to as system), for example, an embedded operating system such as Android, iOS, Windows, or Linux. The memory 202 may further store a network communication program. The network communication program may be used to communicate with one or more auxiliary devices, one or more terminal devices, and one or more network devices. The memory 202 may further store a user interface program. The user interface program may vividly display content of an application program by using a graphical operation interface, and receive control operations of a user for the application program by using input controls such as menus, dialog boxes, and keys.

In some embodiments of this application, the memory 202 may be configured to store an implementation program, on a side of the terminal 200, of a resource allocation method provided in one or more embodiments of this application. For implementations of a resource mapping method provided in one or more embodiments of this application, refer to subsequent embodiments.

The terminal processor 201 may be configured to read and execute a computer readable instruction. Specifically, the terminal processor 201 may be configured to invoke a program stored in the memory 212, for example, the implementation program, on the side of the terminal 200, of the resource mapping method provided in the one or more embodiments of this application; and execute an instruction included in the program.

It can be understood that the terminal 200 may be the terminal 103 in the wireless communications system 100 shown in FIG. 5, and may be implemented as a mobile device, a mobile station, a mobile unit, a radio unit, a remote unit, a user agent, a mobile client, or the like.

It should be noted that the terminal 200 shown in FIG. 6 is merely an implementation of this embodiment of this application. In actual applications, the terminal 200 may alternatively include more or fewer components. This is not limited herein.

Figure 7:
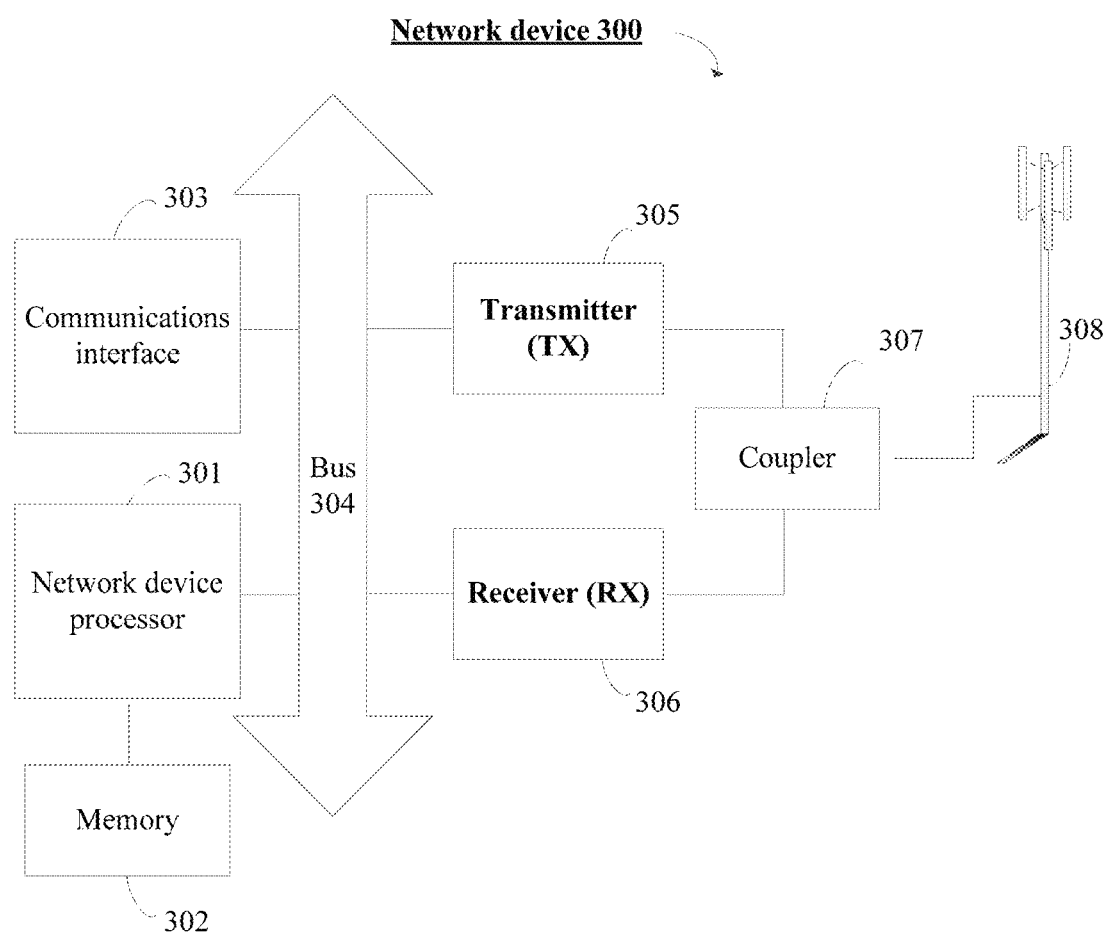
FIG. 7 is a schematic structural diagram of a network device according to this application.

FIG. 7 shows a network device 300 provided in some embodiments of this application. As shown in FIG. 7, the network device 300 may include: one or more network device processors 301, a memory 302, a communications interface 303, a transmitter 305, a receiver 306, a coupler 307, and an antenna 308. These components may be connected by using a bus 304 or in other manners. FIG. 7 shows an example in which these components are connected by using a bus.

The communications interface 303 may be used by the network device 300 to communicate with another communications device, for example, a terminal device or another network device. Specifically, the terminal device may be the terminal 200 shown in FIG. 7. Specifically, the communications interface 303 may be a long term evolution (LTE) (4G) communications interface, or may be a 5G communications interface or a future new radio communications interface. In addition to a wireless communications interface, the network device 300 may be further configured with a wired communications interface 303 to support wired communications. For example, a backhaul link between one network device 300 and another network device 300 may be a wireless communications connection.

The transmitter 305 may be configured to perform transmission processing, for example, signal modulation, on a signal output by the network device processor 301. The receiver 306 may be configured to perform reception processing, for example, signal demodulation, on a mobile communication signal received by the antenna 308. In some embodiments of this application, the transmitter 305 and the receiver 306 may be regarded as a wireless modem. In the network device 300, there may be one or more transmitters 305 and receivers 306. The antenna 308 may be configured to convert electromagnetic energy in a transmission line into an electromagnetic wave in free space, or convert an electromagnetic wave in free space into electromagnetic energy in a transmission line. The coupler 307 may be configured to divide a mobile communication signal into a plurality of signals, and distribute the signals to a plurality of receivers 306.

The memory 302 is coupled to the network device processor 301, and is configured to store various software programs and/or a plurality of instructions. Specifically, the memory 302 may include a high-speed random access memory, and may also include a nonvolatile memory, for example, one or more magnetic disk storage devices, a flash memory device, or another nonvolatile solid-state storage device. The memory 302 may store an operating system (hereinafter referred to as system), for example, an embedded operating system such as uCOS, VxWorks, or RTLinux. The memory 302 may further store a network communication program. The network communication program may be used to communicate with one or more auxiliary devices, one or more terminal devices, and one or more network devices.

The network device processor 301 may be configured to manage radio channels, implement calls, establish and remove communication links, provide cell handover control for users within a local control area, and the like. Specifically, the network device processor 301 may include: an administration module/communication module (AM/CM) (a center used for speech channel switching and information exchange), a basic module (BM) (configured to perform call processing, signaling processing, radio resource management, radio link management, and circuit maintenance functions), a transcoder and submultiplexer (TCSM) (configured to perform multiplexing, demultiplexing, and transcoding functions), and the like.

In this embodiment of this application, the network device processor 301 may be configured to read and execute a computer readable instruction. Specifically, the network device processor 301 may be configured to invoke a program stored in the memory 302, for example, an implementation program, on a side of the network device 300, of a resource mapping method provided in one or more embodiments of this application; and execute an instruction included in the program.

It can be understood that the network device 300 may be the base station 101 in the wireless communications system 100 shown in FIG. 5, and may be implemented as a base transceiver station, a wireless transceiver, a basic service set (BSS), an extended service set (ESS), a NodeB, an eNodeB, an access point, a TRP, or the like.

It should be noted that the network device 300 shown in FIG. 7 is merely an implementation of this embodiment of this application. In actual applications, the network device 300 may alternatively include more or fewer components. This is not limited herein.

Based on embodiments corresponding to the wireless communications system 100, the terminal 200, and the network device 300, for CSI estimation using a plurality of symbols (carrying a reference signal) in combination, embodiments of this application provide a resource mapping method, to improve accuracy of CSI estimation.

A main principle of this application may include the following: When a reference signal used for CSI estimation is transmitted on a plurality of symbols, a phase tracking reference signal (PT-RS) is inserted. In addition, the phase tracking reference signal is also mapped to the plurality of symbols, and a subcarrier to which the phase tracking reference signal is mapped on one of the plurality of symbols has a same frequency-domain location as a subcarrier to which the phase tracking reference signal is mapped on the rest of the plurality of symbols. In this way, on the subcarrier corresponding to this same frequency-domain location, the phase tracking reference signal may be used for phase tracking. This helps improve accuracy of CSI estimation.

Figure 8:
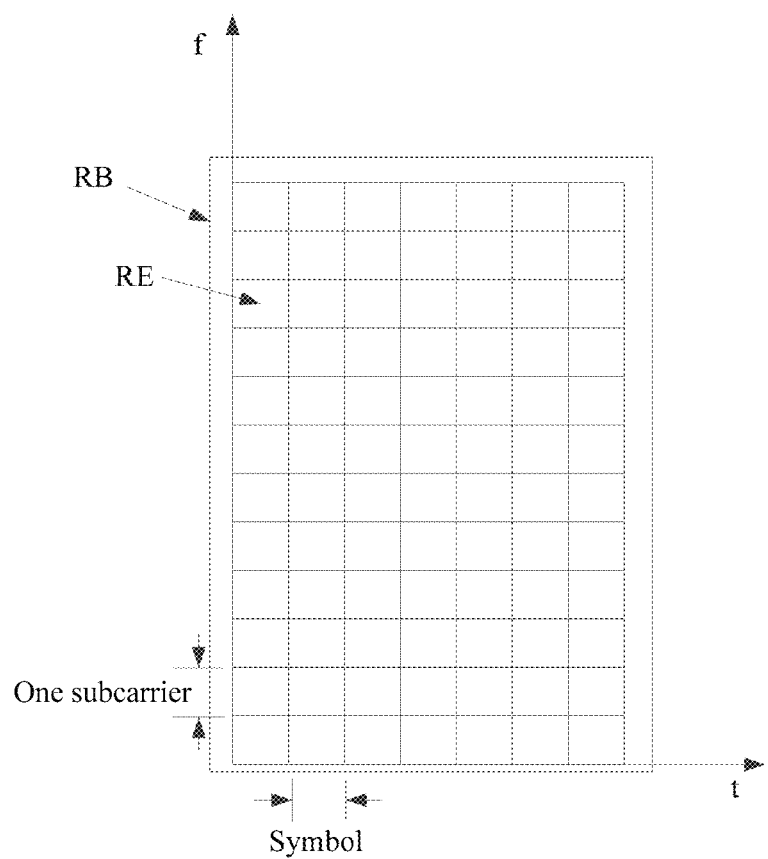
FIG. 8 is a schematic diagram of time-frequency resources according to this application.

A resource described in this application is a time-frequency resource, includes a time-domain resource and a frequency-domain resource, and is usually represented by using a resource element (RE), a resource block (RB), a symbol, a subcarrier, or a transmission time interval (TTI). As shown in FIG. 8, resources of an entire system include grids resulting from division in the frequency domain and time domain. One grid represents one RE, and one RE includes one subcarrier in the frequency domain and one symbol in the time domain. One RB includes T (T is a positive integer) consecutive symbols in the time domain and M (M is a positive integer) consecutive subcarriers in the frequency domain. For example, in LTE, T=7, and M=12.

It should be noted that the accompanying drawings provided in this application are merely intended to explain embodiments of the present application, and a size of a resource block, a quantity of symbols and subcarriers included in a resource block, and the like may be different in a future communication standard. The resource block described in this application is not limited to that shown in the accompanying drawings.

In this application, the reference signal used for CSI estimation may be referred to as a first reference signal, and the phase tracking reference signal may be referred to as a second reference signal. Specifically, the first reference signal may be a downlink reference signal used for CSI estimation, for example, a CSI-RS. The first reference signal may be alternatively an uplink reference signal used for CSI estimation, for example, an SRS. In addition to these two reference signals: the SRS and the CSI-RS, another reference signal that can be used for CSI estimation, for example, a cell-specific reference signal (CRS), is also a reference signal used for CSI estimation in this application.

It should be noted that embodiments of this application are also applicable to future and other scenarios in which a plurality of symbols need to be used in combination for channel measurement or data transmission at a high frequency band.

Figure 9:
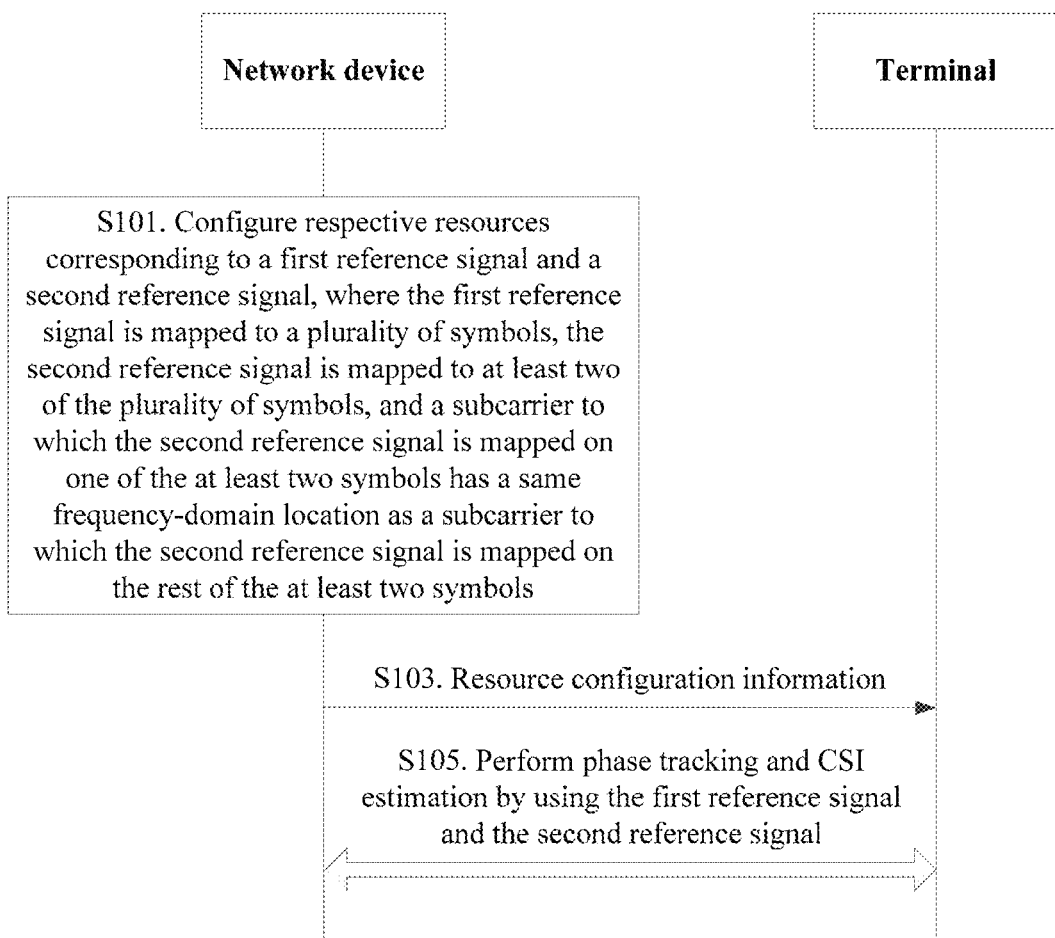
FIG. 9 is a schematic flowchart of a reference signal transmission method according to this application.

FIG. 9 shows a reference signal transmission method provided in this application. Details are described below.

S101. A network device configures respective resources corresponding to each of a first reference signal and a second reference signal, where the first reference signal is mapped to a plurality of symbols, the second reference signal is mapped to at least two of the plurality of symbols, and subcarriers to which the second reference signal is mapped have a same frequency-domain location.

S103. The network device sends resource location information to a terminal. Correspondingly, the terminal receives the resource configuration information. The resource configuration information is used to indicate time-frequency resources on which the terminal receives (or sends) the first reference signal and the second reference signal.

S105. The network device and the terminal perform phase tracking and CSI estimation by using the first reference signal and the second reference signal.

Figure 10:
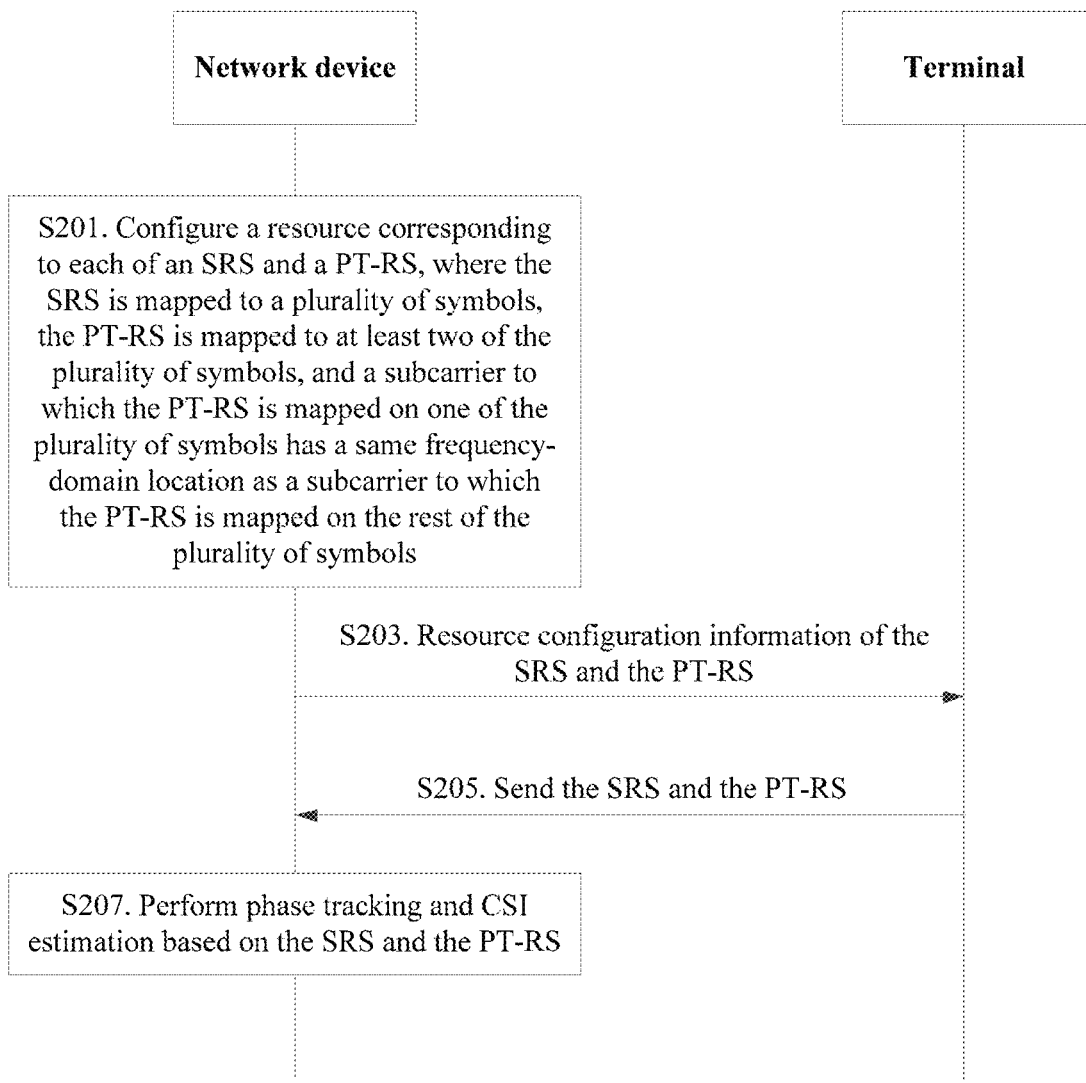
FIG. 10 is a schematic flowchart of another reference signal transmission method according to this application.

In an implementation of this application, the first reference signal may be an uplink reference signal used for CSI estimation, for example, an SRS, and the second reference signal may be an uplink reference signal used for phase tracking (PT-RS). Specifically, as shown in FIG. 10, step S105 may be implemented as follows:

Step 1. The terminal sends the first reference signal and the second reference signal based on the resource configuration information. In this case, the second reference signal may be the uplink PT-RS used for phase tracking.

Step 2. Correspondingly, the network device receives the first reference signal and the second reference signal that are sent by the terminal.

Step 3. The network device performs phase tracking and CSI estimation by using the first reference signal and the second reference signal. Specifically, the network device may estimate, on the subcarrier corresponding to this same frequency-domain location, a relative phase error value between the plurality of symbols by exploiting the second reference signal, thereby improving accuracy of CSI estimation.

Figure 11:
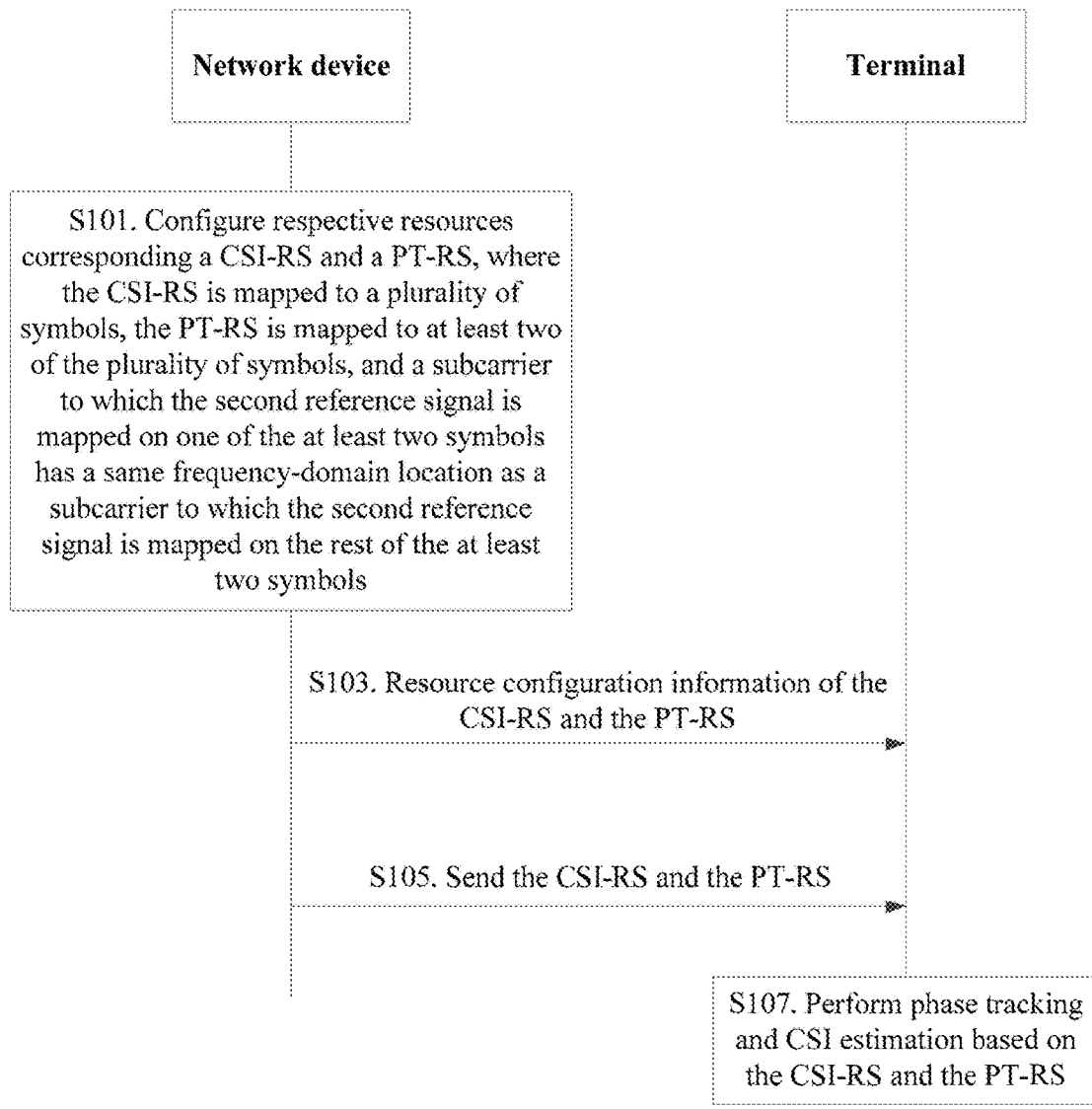
FIG. 11 is a schematic flowchart of still another reference signal transmission method according to this application.

In another implementation of this application, the first reference signal may be a downlink reference signal used for CSI estimation, for example, a CSI-RS, and the second reference signal may be a downlink reference signal for phase tracking (PT-RS). Specifically, as shown in FIG. 11, step S105 may be implemented as follows:

Step 1. The network device sends the first reference signal and the second reference signal to the terminal. In this case, the second reference signal may be the downlink PT-RS used for phase tracking.

Step 2. Correspondingly, the terminal receives the first reference signal and the second reference signal based on the resource configuration information.

Step 3. The terminal performs phase tracking and CSI estimation by using the first reference signal and the second reference signal. Specifically, the terminal may estimate, on the subcarrier corresponding to this same frequency-domain location, a relative phase error value between the plurality of symbols by exploiting the second reference signal, thereby improving accuracy of CSI estimation.

In some embodiments, when the first reference signal is the downlink reference signal used for CSI estimation, an antenna port sending the second reference signal may be one or more of antenna ports sending the first reference signal; or an antenna port sending the second reference signal and an antenna port sending the first reference signal may be quasi-co-located (QCL). Therefore, a correspondence between ports sending the first reference signal and the second reference signal may be indicated by using port numbers or quasi-collocation information, and a receive end can know, based on the correspondence, which specific antenna port sending the second reference signal can be used for estimation of a phase error of an antenna port sending the first reference signal.

In this application, the network device may send the resource configuration information to the terminal through a physical downlink control channel (PDCCH). The network device may alternatively send the resource configuration information to the terminal by using higher layer signaling, for example, radio resource control (RRC) signaling.

In some embodiments, respective resource locations corresponding to the first reference signal and the second reference signal may be predefined by a protocol. Therefore, the network device does not need to send the resource configuration information to the terminal.

In some embodiments, a resource location corresponding to the first reference signal may be predefined by a protocol. The resource configuration information may include a resource mapping rule between the second reference signal and the first reference signal. In this way, the terminal can determine a resource location of the second reference signal based on the resource mapping rule between the second reference signal and the first reference signal in this application. Specifically, the resource mapping rule between the second reference signal and the first reference signal may be predefined by a protocol, or may be configured by the network device by using higher layer signaling or a PDCCH. When the resource mapping rule is predefined by a protocol, the network device does not need to send the resource configuration information to the terminal.

In some embodiments, the resource configuration information may include resource configuration information of the first reference signal and a resource mapping rule between the second reference signal and the first reference signal. The resource configuration information of the first reference signal is used by the terminal to determine, based on the resource configuration information, a resource location to which the first reference signal is mapped. In this way, the terminal can determine a resource location of the second reference signal based on the resource location of the first reference signal and the resource mapping rule between the second reference signal and the first reference signal in this application. Specifically, the resource mapping rule between the second reference signal and the first reference signal may be predefined by a protocol, or may be configured by the network device by using higher layer signaling or a PDCCH. When the resource mapping rule is predefined by a protocol, the resource configuration information may include only resource location information of the first reference signal.

In some embodiments, the network device may further send a trigger instruction to the terminal, for example, send the trigger instruction by using a downlink control indicator (DCI), to trigger the terminal to send the second reference signal.

By using an example in which the first reference signal is an SRS, the following describes in detail a resource mapping method provided in this application for the second reference signal (referred to as a PT-RS below). The SRS undergoes frequency hopping on the plurality of symbols. The plurality of symbols may be consecutive or non-consecutive. On each symbol to which the SRS is mapped, an SRS subband corresponds to a different frequency-domain location. The PT-RS is mapped to at least two symbols within an SRS frequency hopping period, and subcarriers to which the PT-RS is mapped have a same frequency-domain location.

Figure 12:
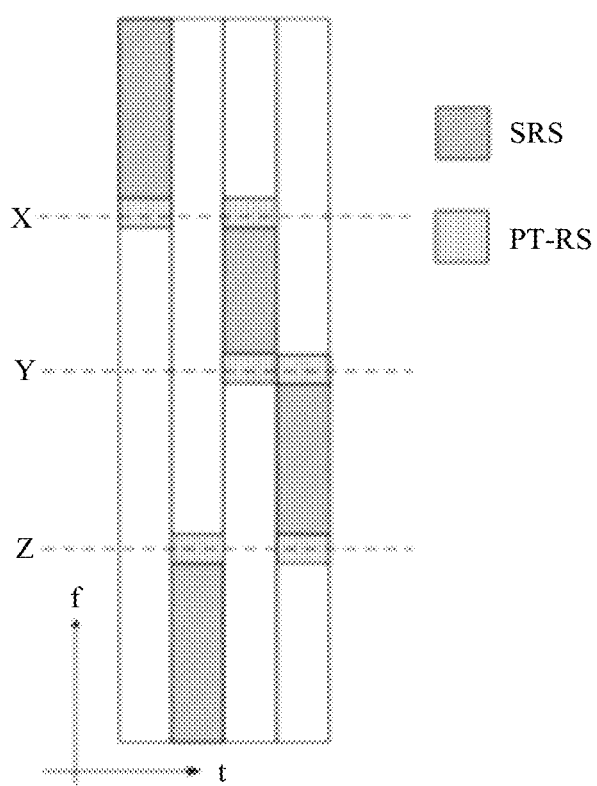
FIG. 12 is a schematic diagram of resource mapping of a phase tracking reference signal used for channel estimation according to this application.

FIG. 12 shows an example of a PT-RS resource mapping method. As shown in FIG. 12, on each symbol to which the SRS is mapped, one or more subcarriers to which the PT-RS is mapped are adjacent to an SRS subband in the frequency domain. To be specific, on each symbol to which the SRS is mapped, the PT-RS may be mapped to one end or two ends of the SRS subband.

As shown in FIG. 12, subcarriers to which the PT-RS is mapped have a plurality of same frequency-domain locations, for example, frequency-domain locations X, Y, and Z, and each frequency-domain location may correspond to one or more subcarriers.

As shown in FIG. 12, the PT-RS may be mapped to the first m (m is a positive integer) subcarriers of the SRS subband, or may be mapped to the last n (n is a positive integer) subcarriers of the SRS subband, or may be mapped to the first m subcarriers and the last n subcarriers of the SRS subband. Herein, m and n may be equal or not equal.

Specifically, a resource mapping rule for the PT-RS may be summarized into, but is not limited to, the following: If the SRS subband is in a lowest frequency-domain location in a processing bandwidth of the terminal, the PT-RS may be mapped to the last n subcarriers of the SRS subband; if the SRS subband is in a highest frequency-domain location in a processing bandwidth of the terminal, the PT-RS may be mapped to the first m subcarriers of the SRS subband; and if the SRS subband is in a middle frequency-domain location in a processing bandwidth of the terminal, the PT-RS may be mapped to the first m subcarriers of the SRS subband, or may be mapped to the last n subcarriers of the SRS subband. Herein, the processing bandwidth of the terminal is a total sounding reference signal frequency hopping bandwidth allocated by the network device to the terminal, that is, a total bandwidth of channels for which the network device requires that the terminal implement sounding.

To be specific, a resource location of the second reference signal may be determined by a resource location of the first reference signal. This determining policy may be predefined by a protocol, or may be configured by the network device by delivering higher layer signaling (for example, RRC signaling) or PDCCH signaling.

In this application, whether the PT-RS needs to be sent to perform phase tracking and CSI estimation may be determined in a manner of pre-definition by a protocol or configuration by using higher layer signaling. Specifically, a PT-RS configuration rule may be predefined based on an SRS frequency hopping bandwidth. For example, when the SRS frequency hopping bandwidth is higher than a preset bandwidth threshold, the PT-RS is configured. This avoids configuring the PT-RS when the SRS frequency hopping bandwidth is quite low. If the SRS frequency hopping bandwidth is quite low, a negative effect of overheads caused by configuring the PT-RS exerts greater impact than a benefit of performing phase deviation estimation by using the PT-RS. This example is merely an implementation provided in this application, and should not be construed as a limitation, and there may be a difference in actual applications.

In some optional embodiments, when the SRS undergoes frequency hopping on the plurality of symbols, an SRS sequence length on each symbol may be determined depending on whether the PT-RS needs to be sent and whether the PT-RS is mapped to one end or two ends of the SRS subband. Optionally, two SRS sequence lengths may be configured, including a first sequence length and a second sequence length. The PT-RS is mapped to two ends of an SRS subband of the first sequence length. For example, sequence lengths of SRS subbands on symbols 3 and 4 in FIG. 12 are equal to the first sequence length. The PT-RS is mapped only to one end of an SRS subband of the second sequence length. For example, sequence lengths of SRS subbands on symbols 1 and 2 in FIG. 12 are equal to the second sequence length.

To be specific, under a precondition that the PT-RS needs to be sent to perform phase tracking and CSI estimation, if the PT-RS needs to be mapped to two ends of an SRS subband on a symbol i, the first sequence length is used for the SRS subband on the symbol i; or if the PT-RS needs to be mapped only to one end of an SRS subband on a symbol i, the second sequence length is used for the SRS subband on the symbol i.

In this application, if a plurality of terminals need to simultaneously send SRSs, the plurality of terminals may use different cyclic shift values to ensure orthogonality of the SRSs transmitted by the terminals. Likewise, to ensure orthogonality of PT-RSs transmitted by the plurality of terminals, the same cyclic shift values may be used for the PT-RSs as for the SRSs. In addition, a same "comb" pattern may be used for the PT-RSs and the SRSs, that is, the PT-RSs and the SRSs correspond to a same comb spacing.

It can be understood that, with implementation of the embodiment shown in FIG. 12, because the SRS is mapped to every symbol within the SRS frequency hopping period, and a subcarrier to which the PT-RS is mapped on one of the symbols has a same frequency-domain location as a subcarrier to which the PT-RS is mapped on the rest of the symbols, in the plurality of same frequency-domain locations, the PT-RS can be exploited to calculate a relative phase error value between symbols within the SRS frequency hopping period, thereby improving accuracy of CSI estimation.

It should be noted that FIG. 12 shows an embodiment provided in this application for illustrative purposes only, which should not be construed as a limitation. In actual applications, the SRS frequency hopping period, an SRS frequency hopping manner, and the like may be different.

Figure 13A:
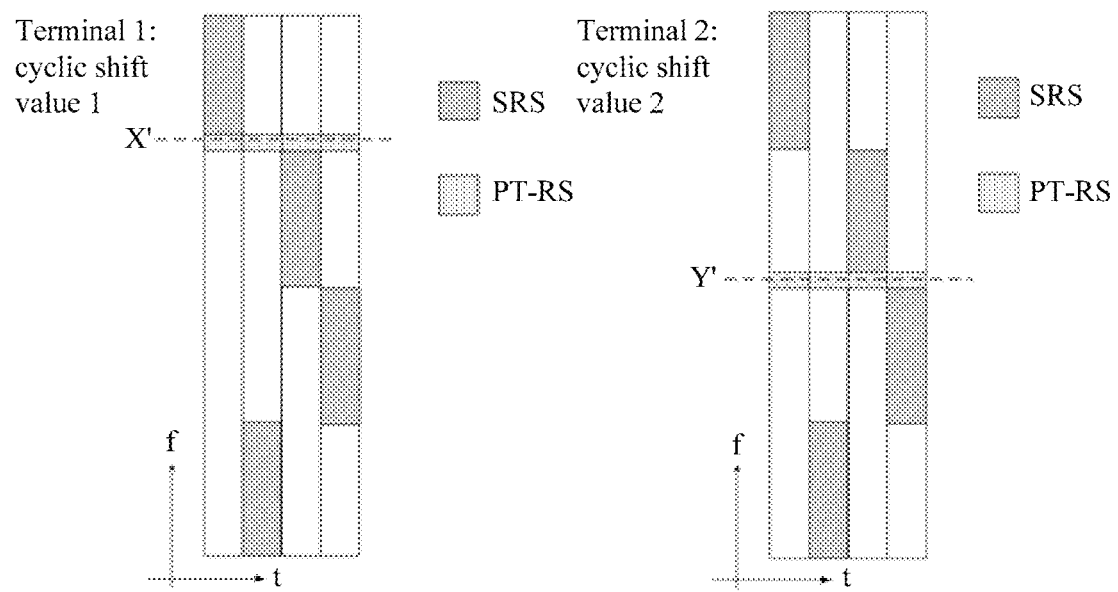
FIG. 13A is another schematic diagram of resource mapping of a phase tracking reference signal used for channel estimation according to this application.
Figure 13B:
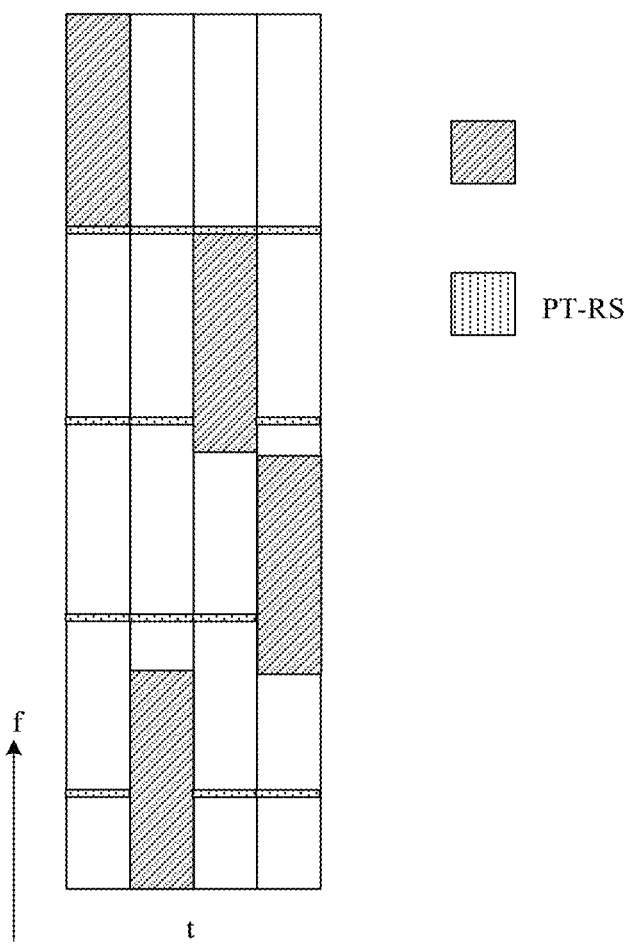
FIG. 13B is another schematic diagram of resource mapping of a phase tracking reference signal used for channel estimation according to this application.

FIG. 13A and FIG. 13B show another PT-RS resource mapping method. As shown in FIG. 13A and FIG. 13B, a subcarrier location to which the PT-RS is mapped is the same on every symbol to which the PT-RS is mapped. That is, on every symbol to which the PT-RS is mapped, the PT-RS is mapped to same one or more subcarriers.

As shown in FIG. 13A and FIG. 13B, a subcarrier location to which the PT-RS is mapped is the same on each symbol to which the PT-RS is mapped. For example, on each symbol, the subcarrier location of the PT-RS is a frequency-domain location X'. The frequency-domain location X' may correspond to one or more subcarriers. The one or more subcarriers may be concentrated in the frequency domain, as shown in FIG. 13A; or may be discretely distributed, as shown in FIG. 13B.

In this application, a cyclic shift value of the SRS may be further used to determine a frequency-domain location of the PT-RS. Specifically, a mapping rule between the cyclic shift value of the SRS and the subcarrier location to which the PT-RS is mapped may be predefined by a protocol, or may be configured by the network device by delivering higher layer signaling (for example, RRC signaling) or PDCCH signaling. Different cyclic shift values correspond to different subcarrier locations.

For example, as shown in FIG. 13A and FIG. 13B, according to the predefined mapping rule, a cyclic shift value 1 corresponds to a subcarrier location X1, and a cyclic shift value 2 corresponds to a subcarrier location X2. The cyclic shift value 1 is used for an SRS sent by a terminal 1, and the cyclic shift value 2 is used for an SRS sent by a terminal 2. Therefore, PT-RSs sent by the terminal 1 and the terminal 2 are respectively mapped to subcarriers indicated by the subcarrier location X1 and the subcarrier location X2. This example is merely used to explain this embodiment of the present application, and should not be construed as a limitation.

It can be understood that, with implementation of the embodiment shown in FIG. 13A and FIG. 13B, because the SRS is mapped to every symbol within the SRS frequency hopping period, and a subcarrier to which the PT-RS is mapped on one of the symbols has a same frequency-domain location as a subcarrier to which the PT-RS is mapped on the rest of the symbols, a relative phase error value between symbols within the SRS frequency hopping period can be calculated in this same frequency-domain location, thereby improving accuracy of CSI estimation.

It should be noted that FIG. 13A and FIG. 13B merely show an example of an embodiment provided in this application, and should not be construed as a limitation. In actual applications, the SRS frequency hopping period, an SRS frequency hopping manner, and the like may be alternatively different.

Figure 14:
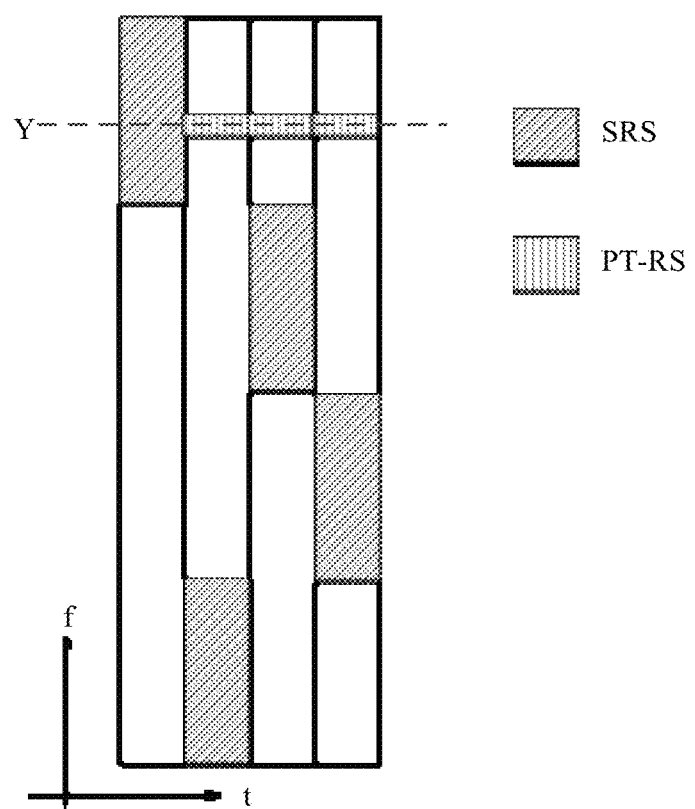
FIG. 14 is still another schematic diagram of resource mapping of a phase tracking reference signal used for channel estimation according to this application.

In some possible embodiments, if a subcarrier to which the PT-RS is mapped and a subcarrier to which the SRS is mapped on each symbol have different frequency-domain locations, the PT-RS is mapped to each symbol within the SRS frequency hopping period, as shown in FIG. 13A and FIG. 13B; or if a subcarrier to which the PT-RS is mapped and a subcarrier to which the SRS is mapped on one or more symbols have a same frequency-domain location, the PT-RS is not mapped to the one or more symbols. For example, as shown in FIG. 14, because the subcarrier to which the PT-RS is mapped and a subcarrier to which the SRS is mapped on the $1^{st}$ symbol have a same frequency-domain location Y, the PT-RS is not mapped to the $1^{st}$ symbol. It should be noted that FIG. 14 is merely used to explain this embodiment of the present application, and should not be construed as a limitation, and there may be a difference in actual implementations.

It can be understood that, for the case of resource mapping in FIG. 14, on a subcarrier corresponding to the frequency-domain location Y, relative phase error values between the $1^{st}$ symbol and other symbols may be estimated by using the SRS mapped to the $1^{st}$ symbol in combination with a PT-RS mapped to the other symbols, thereby improving accuracy of CSI estimation.

By using an example in which the first reference signal is a CSI-RS, the following describes in detail a resource mapping method for the second reference signal (PT-RS). CSI-RSs of a plurality of antenna ports are subject to code division in the time domain; or CSI-RSs of a plurality of antenna ports are subject to code division in the frequency domain, but a plurality of symbols need to be used together for CSI estimation.

Figure 15:
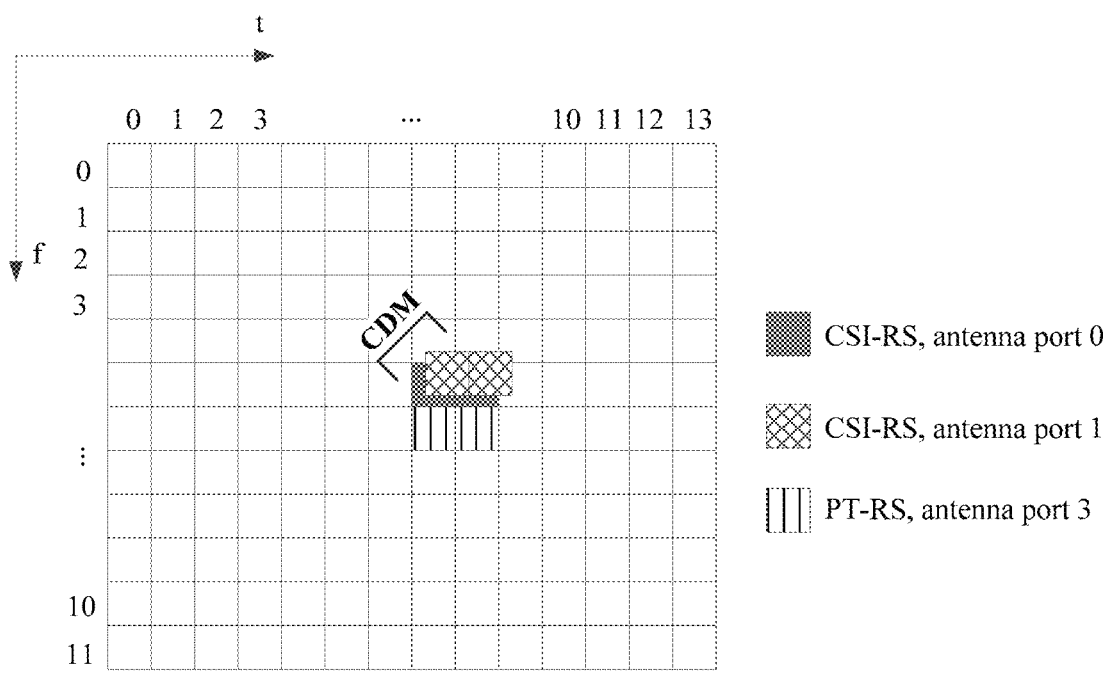
FIG. 15 is still another schematic diagram of resource mapping of a phase tracking reference signal used for channel estimation according to this application.
Figure 16:
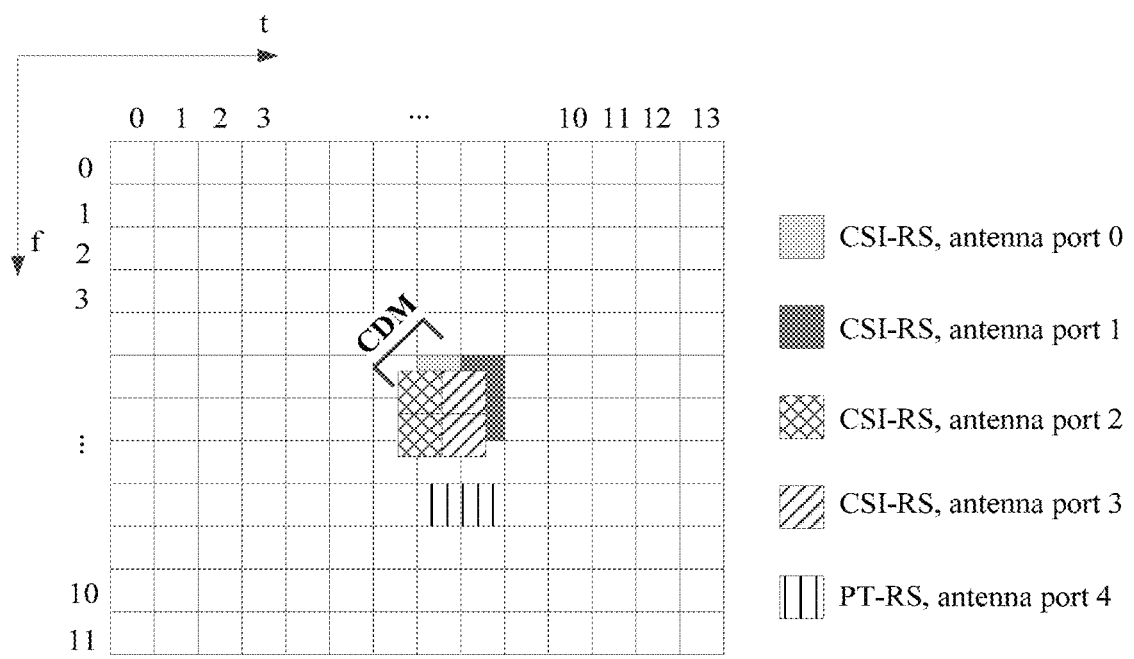
FIG. 16 is still another schematic diagram of resource mapping of a phase tracking reference signal used for channel estimation according to this application.

FIG. 15 and FIG. 16 show a reference signal transmission method provided in still another embodiment of this application. As shown in FIG. 15, CSI-RSs of a plurality of antenna ports are subject to code division in the time domain. As shown in FIG. 16, CSI-RSs of a plurality of antenna ports are subject to code division in the frequency domain, but a plurality of symbols need to be used together for CSI estimation. In an embodiment corresponding to FIG. 15 or FIG. 16, a CSI-RS is mapped to a plurality of symbols, and a PT-RS is mapped to the same symbols as the CSI-RS. A subcarrier to which the PT-RS is mapped on one of the symbols to which the CSI-RS is mapped corresponds to a same frequency-domain location as a subcarrier to which the PT-RS is mapped on the rest of these symbols.

Specifically, in the frequency domain, the subcarrier to which the PT-RS is mapped may be adjacent to (as shown in FIG. 15) or not adjacent to (not shown) a subcarrier to which the CSI-RS is mapped.

Specifically, a resource location of the PT-RS may be predefined by a protocol, or may be configured by the network device by delivering higher layer signaling (for example, RRC signaling) or PDCCH signaling.

It can be understood that, on the subcarrier to which the PT-RS is mapped, a relative phase error between the symbols to which the CSI-RS is mapped can be calculated by exploiting the PT-RS. This helps estimate a CPE corresponding to each symbol more accurately, thereby improving accuracy of CSI estimation.

It should be noted that FIG. 15 and FIG. 16 merely show examples of some embodiments provided in this application, and should not be construed as a limitation. In actual applications, an antenna port, resource multiplexing, a resource mapping pattern, and the like of a CSI-RS may be alternatively different.

In addition, this application further provides two reference signal design solutions. This can also improve accuracy of CSI estimation. In these two methods, no PT-RS needs to be inserted during transmission of a (uplink or downlink) reference signal used for CSI estimation. The following separately provides descriptions by using an uplink reference signal used for CSI estimation and a downlink reference signal used for CSI estimation.

Figure 17:
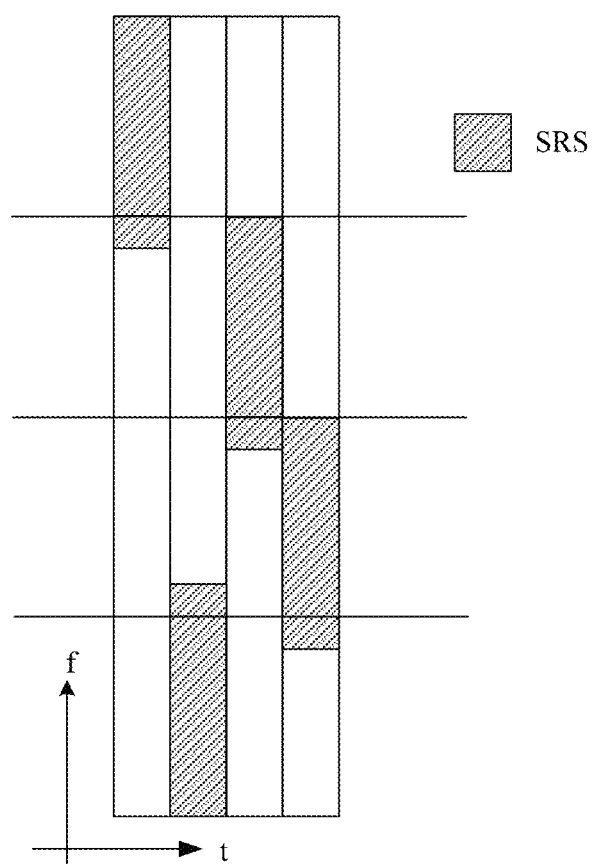
FIG. 17 is a schematic diagram of resource mapping of a sounding reference signal according to this application.

FIG. 17 shows an SRS design solution provided in this application. As shown in FIG. 17, within an SRS frequency hopping period, some subcarriers of SRS subbands on at least two symbols correspond to a same frequency-domain location. In other words, the SRS subbands on the at least two symbols overlap in the frequency domain.

Specifically, for any symbol i within the SRS frequency hopping period, there is at least one symbol j within the SRS frequency hopping period, where an SRS subband mapped to the symbol i and an SRS subband mapped to the symbol j have same one or more subcarriers.

In this application, on one symbol, an SRS frequency hopping bandwidth may be expressed as $$\left(\frac{W}{N}+M\right),$$

where W represents a total bandwidth that requires SRS sounding, N represents a quantity of symbols included in one frequency hopping period, and M is a positive integer. It can be understood that a larger value of M means a larger SRS frequency hopping bandwidth and a larger frequency-domain overlapping part between SRS subbands on different symbols.

Specifically, an SRS frequency hopping bandwidth W on each symbol may be configured by the network device by delivering higher layer signaling (for example, RRC signaling) or PDCCH signaling. Within one SRS frequency hopping period, SRS frequency hopping bandwidths on all symbols may be the same or different.

It can be understood that, with implementation of the embodiment shown in FIG. 17, because some subcarriers of the SRS subbands on different symbols within the SRS frequency hopping period correspond to the same frequency-domain location, a relative phase error value between symbols within the SRS frequency hopping period can be calculated on these some subcarriers, thereby improving accuracy of CSI estimation.

It should be noted that FIG. 17 merely shows an example of an embodiment provided in this application, and should not be construed as a limitation. In actual applications, the SRS frequency hopping period, an SRS frequency hopping manner, the SRS frequency hopping bandwidth, and the like may be alternatively different.

Figure 18:
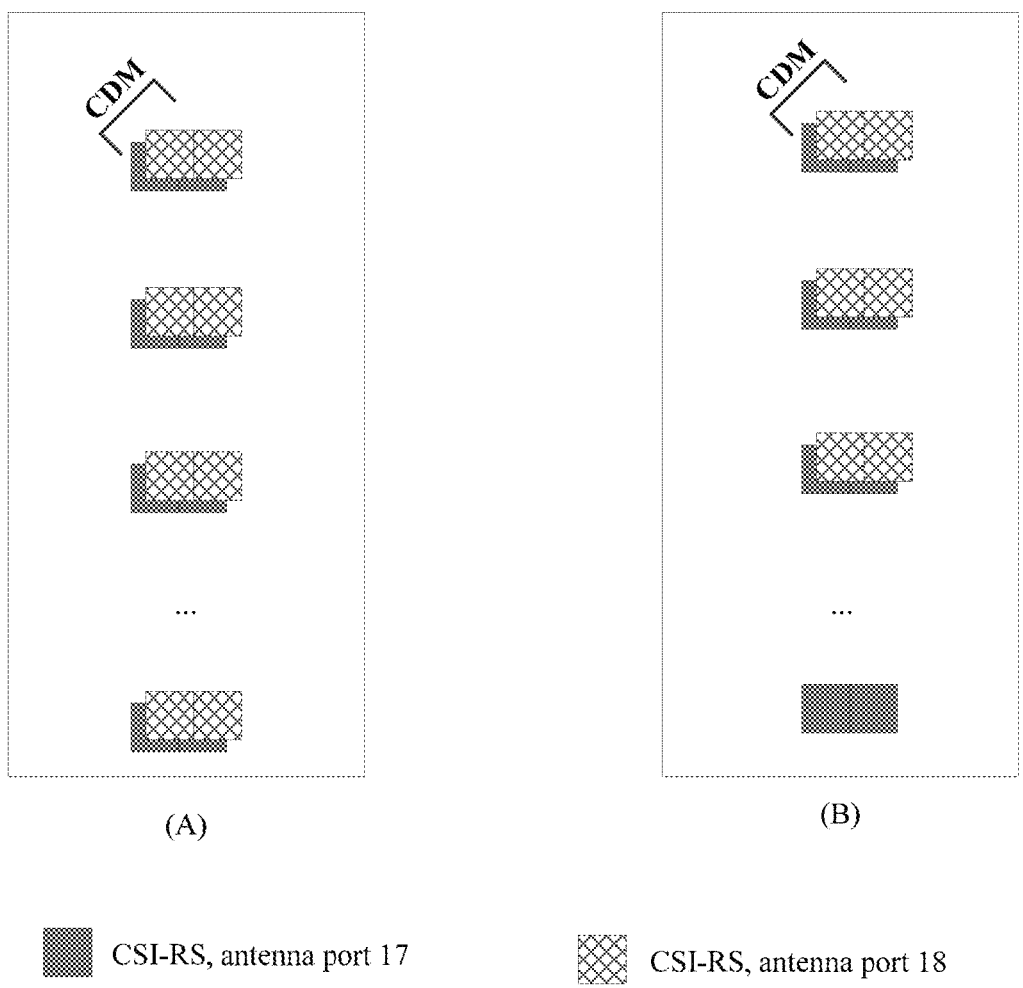
FIG. 18 is a schematic diagram of resource mapping of a channel state information reference signal according to this application.

FIG. 18 shows a CSI-RS design solution provided in this application. As shown in FIG. 18, CSI-RSs of at least two antenna ports are subject to code division in the time domain, and the CSI-RSs are mapped to a plurality of subcarriers. A diagram (A) in FIG. 18 is a resource mapping diagram of CSI-RSs of antenna ports in the prior art. A diagram (B) in FIG. 18 is a resource mapping diagram of CSI-RSs of antenna ports in this application. As shown in the diagram (B), on one or more subcarriers, a CSI-RS is not subject to code division in the time domain, a CSI-RS of only one antenna port is sent, and a CSI-RS of a remaining antenna port is not sent in location(s) of the one or more subcarriers.

Herein, an antenna port sending no CSI-RS on the one or more subcarriers may be referred to as a muted port. Optionally, the muted port may also be configured as a port on which CSI-RS transmit power is zero.

It can be understood that, in the location(s) of the one or more subcarriers, a CSI-RS of one antenna port can be exploited to calculate a relative phase error value between symbols to which the CSI-RS is mapped, thereby improving accuracy of CSI estimation.

Specifically, a subcarrier to which only a CSI-RS of a single antenna port is mapped, namely, a subcarrier location used for estimation of phase noise, may be predefined by a protocol, or may be configured by the network device by delivering higher layer signaling (for example, RRC signaling) or PDCCH signaling.

Specifically, in the location(s) of the one or more subcarriers, an antenna port that cannot be used to send a CSI-RS (namely, a muted port) may be predefined by a protocol, or may be configured by the network device by delivering an instruction (for example, RRC signaling) or PDCCH signaling.

It should be noted that FIG. 18 merely shows an example of an embodiment provided in this application, and should not be construed as a limitation. In actual applications, alternatively, an antenna port, resource multiplexing, a resource mapping pattern, and the like of a CSI-RS may be different.

This application further provides a method for configuring the second reference signal PT-RS in a case of data transmission, for use in phase tracking during the data transmission, thereby improving reliability of the data transmission.

Figure 19:
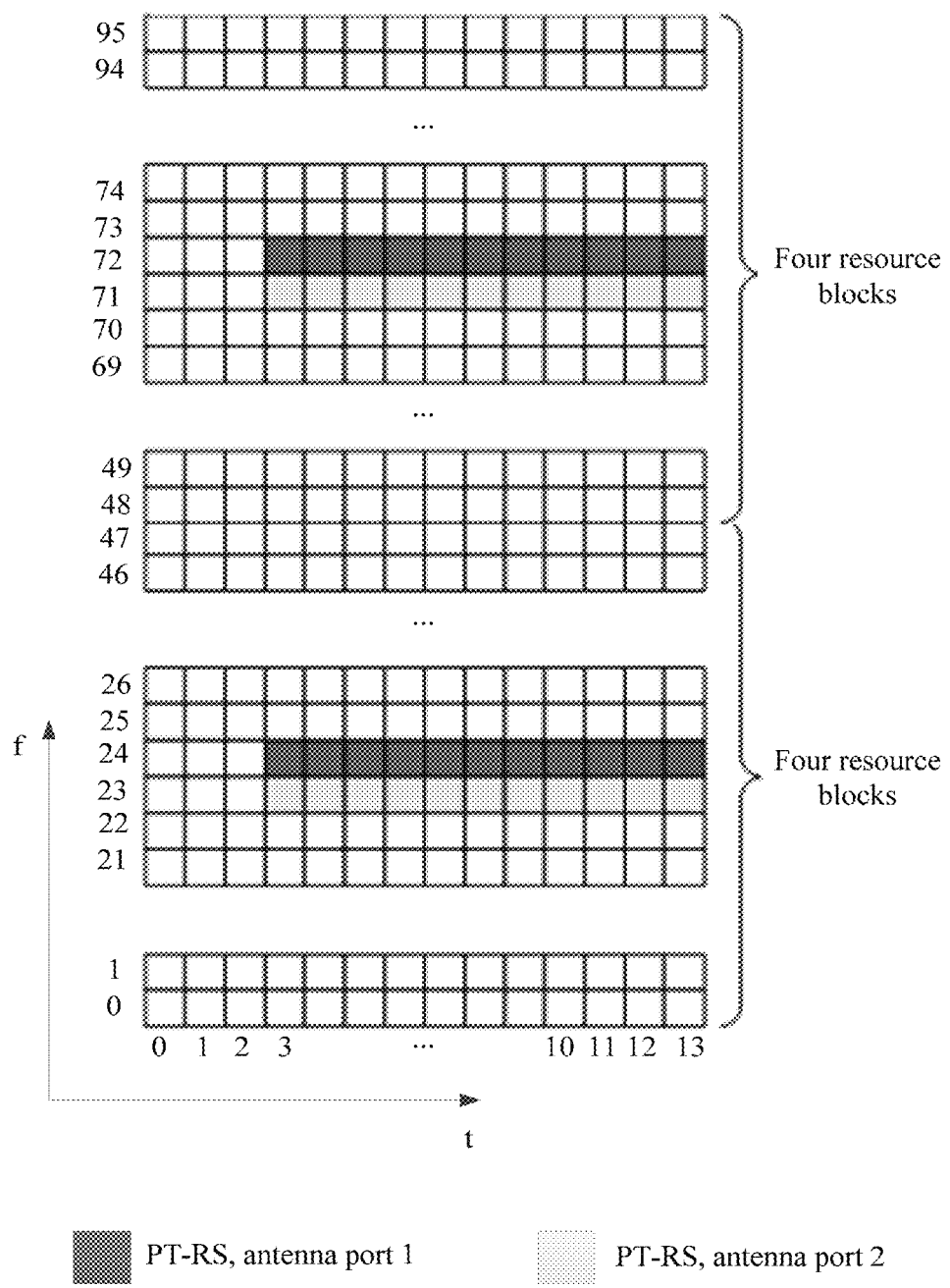
FIG. 19 is a schematic diagram of resource mapping of a phase tracking reference signal used for data transmission according to this application.

As shown in FIG. 19, in the frequency domain, the PT-RS may be evenly mapped to a user scheduled bandwidth. In the time domain, the PT-RS may be distributed on some or all symbols of a physical uplink shared channel (PUSCH) or a physical downlink shared channel (PDSCH) scheduled for a user. Herein, the user scheduled bandwidth may be a bandwidth that is scheduled for the user for transmission of data traffic and control signals of the user.

The following describes in detail the PT-RS configuration method from several aspects: a mapping rule in the frequency domain, a mapping rule in the time domain, resource collision avoidance, a time-domain density, and a frequency-domain density.

(1) PT-RS Mapping Rule in the Frequency Domain

Specifically, a subcarrier or subcarriers carrying the PT-RS may be evenly distributed within the user scheduled bandwidth at a granularity of a resource block. For example, as shown in FIG. 19, in the frequency domain, the PT-RS occupies one subcarrier in every four resource blocks. This example is merely used to explain this embodiment of the present application, and should not be construed as a limitation.

Specifically, a frequency division multiplexing (FDM) manner is used for PT-RSs of different users. As shown in FIG. 19, a PT-RS of a user 1 and a PT-RS of a user 2 occupy different subcarriers. In actual applications, another multiplexing manner, for example, time division multiplexing (TDM) or code division multiplexing (CDM), may be alternatively used for PT-RSs of different users. This is not limited herein.

In this application, a subcarrier location to which the PT-RS is mapped may be represented by using the following two types of indexes: an index of a resource block to which the PT-RS is mapped, and a subcarrier index of the PT-RS in the resource block to which the PT-RS is mapped. The following separately describes manners of determining the two types of indexes.

1. First, the index of the resource block to which the PT-RS is mapped is determined.

Within the user scheduled bandwidth, a total quantity of subcarriers to which the PT-RS is mapped is expressed as $L_{PT\text{-}RS}$, where $L_{PT\text{-}RS}$ is a positive integer. The $L_{PT\text{-}RS}$ subcarriers may be evenly distributed within the user scheduled bandwidth at a granularity of a resource block.

For example, the user scheduled bandwidth is $N_{PRB}^{PUSCH}$ resource blocks and $N_{PRB}^{PDSCH}$ resource blocks during uplink data transmission and downlink data transmission respectively, numbers of start resource blocks within the user scheduled bandwidth are $n_{PRB}^{PUSCH}$ and $n_{PRB}^{PDSCH}$ during the uplink data transmission and downlink data transmission respectively.

Therefore, during the downlink data transmission, the index of the resource block to which the PT-RS is mapped may be expressed as follows:

$$n_{PRB}^{PDSCH} + i \cdot \left\lfloor \frac{N_{PRB}^{PDSCH}}{L_{PT-RS}} \right\rfloor, \quad i = 0, 1, \ldots, L_{PT-RS} - 1;$$

during the uplink data transmission, the index of the resource block to which the PT-RS is mapped may be expressed as follows:

$$n_{PRB}^{PUSCH} + i \cdot \left\lfloor \frac{N_{PRB}^{PUSCH}}{L_{PT-Rs}} \right\rfloor, \quad i = 0, 1, \ldots, L_{PT-RS} - 1$$

where i≥0, and is an integer.

It can be understood that a value of $L_{PT\text{-}RS}$ is related to a frequency-domain density of the PT-RS within the user scheduled bandwidth. A mathematical relationship between $L_{PT\text{-}RS}$ and the frequency-domain density of the PT-RS may be expressed as follows: $L_{PT\text{-}RS}$=the frequency-domain density of the PT-RS×a total quantity of resource blocks corresponding to the user scheduled bandwidth. Within the user scheduled bandwidth, a greater frequency-domain density of the PT-RS indicates a larger value of $L_{PT\text{-}RS}$. A manner of determining the frequency-domain density of the PT-RS is described further below in the present application. The total quantity of resource blocks corresponding to the user scheduled bandwidth is $N_{PRB}^{PUSCH}$ or $N_{PRB}^{PDSCH}$ in the foregoing expression.

2. Next, the subcarrier index of the PT-RS in the resource block to which the PT-RS is mapped is determined.

Figure 20A:
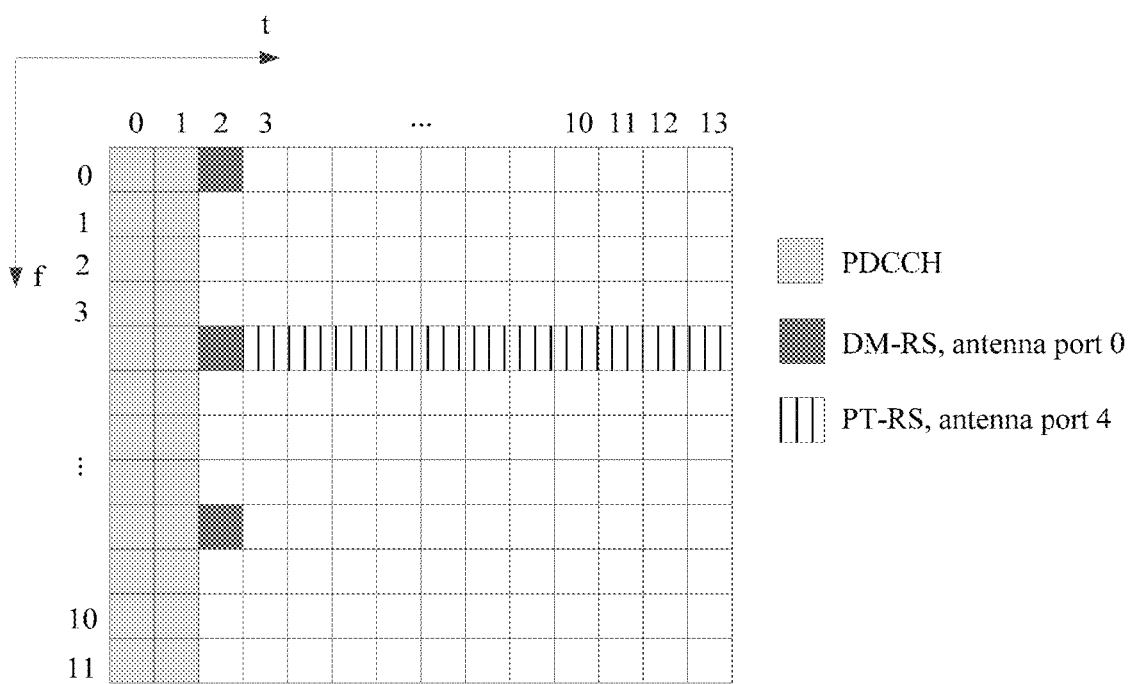
FIG. 20A is a schematic diagram of determining a resource location of a phase tracking reference signal based on a resource location of a demodulation reference signal according to this application.

In a first implementation, the subcarrier index of the PT-RS in the resource block to which the PT-RS is mapped may be determined based on a subcarrier location to which a demodulation reference signal (DMRS) is mapped. Specifically, as shown in FIG. 20A, the PT-RS may be mapped to one or more subcarriers to which the DMRS is mapped.

Figure 20B:
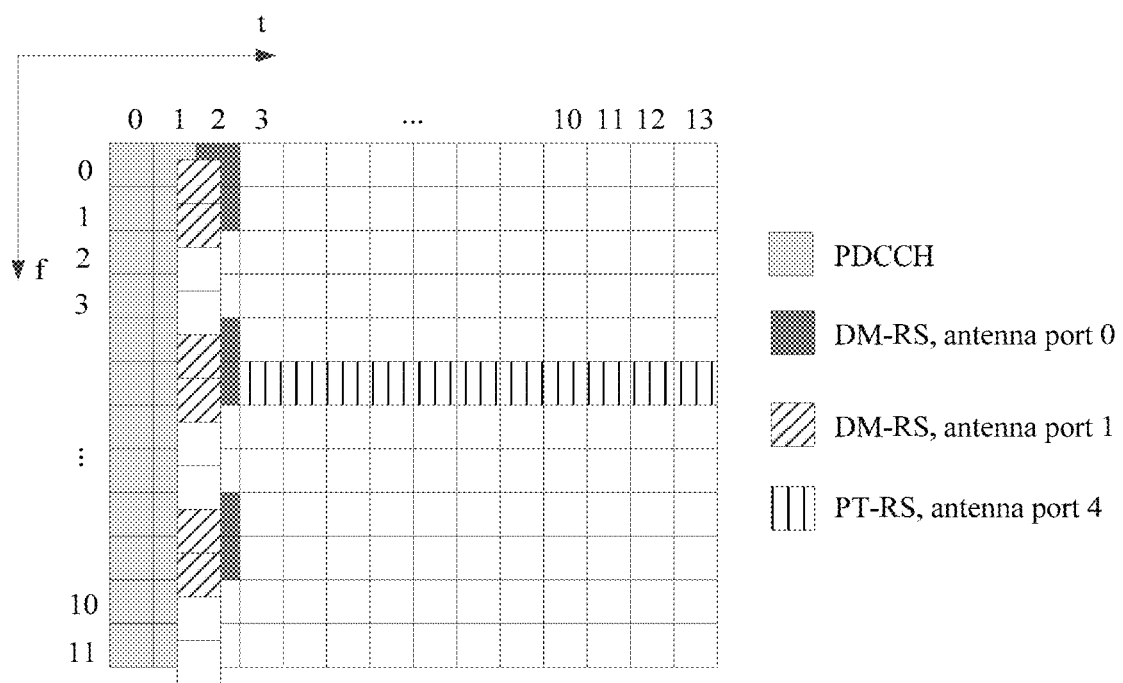
FIG. 20B is a schematic diagram of determining a resource location of a phase tracking reference signal based on a resource location of a demodulation reference signal according to this application.

If DMRSs transmitted by antenna ports of a plurality of users are subject to code division in the frequency domain, as shown in FIG. 20B, the PT-RS is mapped to one or more subcarriers to which a DMRS transmitted by a DMRS antenna port corresponding to a PT-RS antenna port is mapped. For example, as shown in FIG. 20B, if the PT-RS antenna port corresponds to a DMRS antenna port 0 or 1, the PT-RS is mapped to one or more subcarriers to which a DMRS transmitted by the antenna port 0 or 1 is mapped. This example is merely used to explain this embodiment of the present application, and should not be construed as a limitation.

Herein, the PT-RS and the DRMS respectively sent by the PT-RS antenna port and the DMRS antenna port that correspond to each other have a same subcarrier location.

The PT-RS antenna port and the DMRS antenna port that correspond to each other satisfy the following relationship: The DMRS antenna port is the same as the PT-RS antenna port; or the DMRS antenna port and the PT-RS antenna port are quasi-co-located (QCL); or the DMRS antenna port and the PT-RS antenna port have same precoding. In this way, a receive end can determine, based on a relationship between DMRS antenna ports and PT-RS antenna ports, which PT-RS antenna port is used by a DMRS antenna port for phase tracking and by which DMRS antenna port channel estimation required by a PT-RS antenna port for phase estimation is obtained.

In a second implementation, the subcarrier index of the PT-RS in the resource block to which the PT-RS is mapped may be determined based on a cell ID. The cell ID may be expressed as $N_{ID}^{cell}$.

Optionally, there may be a mapping relationship between the $N_{ID}^{cell}$ and the subcarrier index of the PT-RS in the resource block to which the PT-RS is mapped, that is, different $N_{ID}^{cell}$-s correspond to different subcarrier indexes. This mapping relationship may be predefined by a protocol, or may be configured by the network device by using higher layer signaling (for example, RRC signaling) or a PDCCH.

Figure 21:
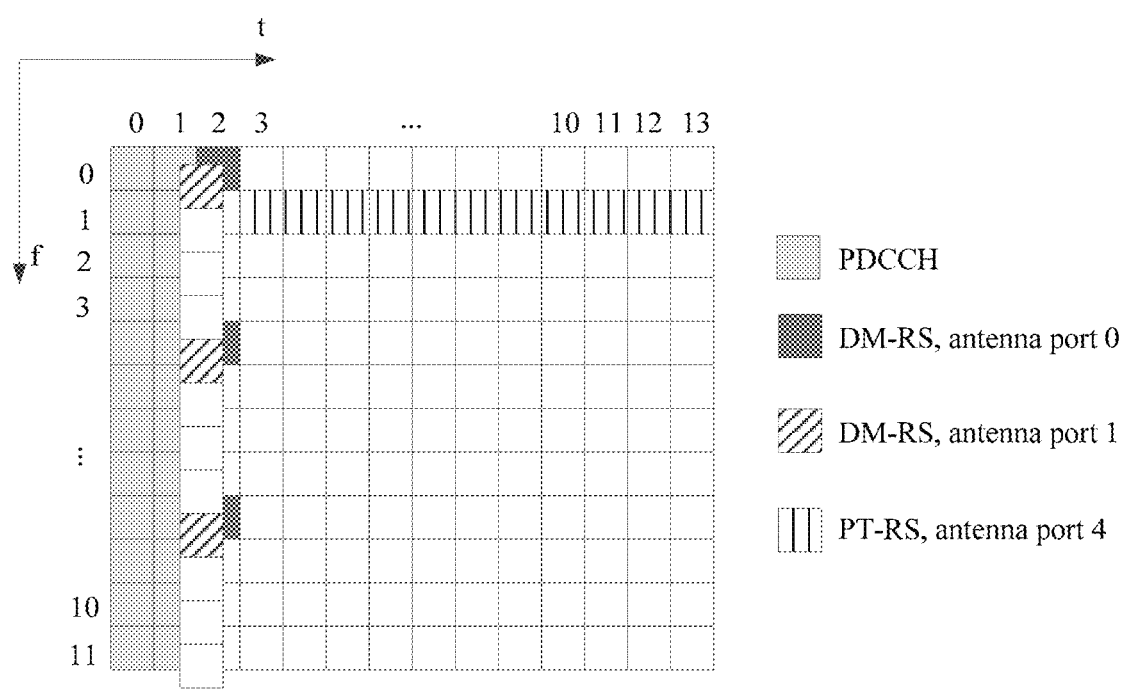
FIG. 21 is a schematic diagram of determining a resource location of a phase tracking reference signal based on a cell identity according to this application.

Optionally, the subcarrier index of the PT-RS in the resource block to which the PT-RS is mapped may be expressed as $N_{ID}^{cell}$ mod a, where a is a positive integer greater than 1, and a may be predefined by a protocol, for example, a=6 is stipulated in LTE. For example, assuming that $N_{ID}^{cell}=1$, it is calculated that $N_{ID}^{cell}$ mod a=1. Therefore, as shown in FIG. 21, when the cell ID is 1, the subcarrier index of the PT-RS in the resource block to which the PT-RS is mapped is 1, that is, the PT-RS is mapped to a subcarrier 1 in the resource block.

(2) PT-RS Mapping Rule in the Time Domain

Figure 22:
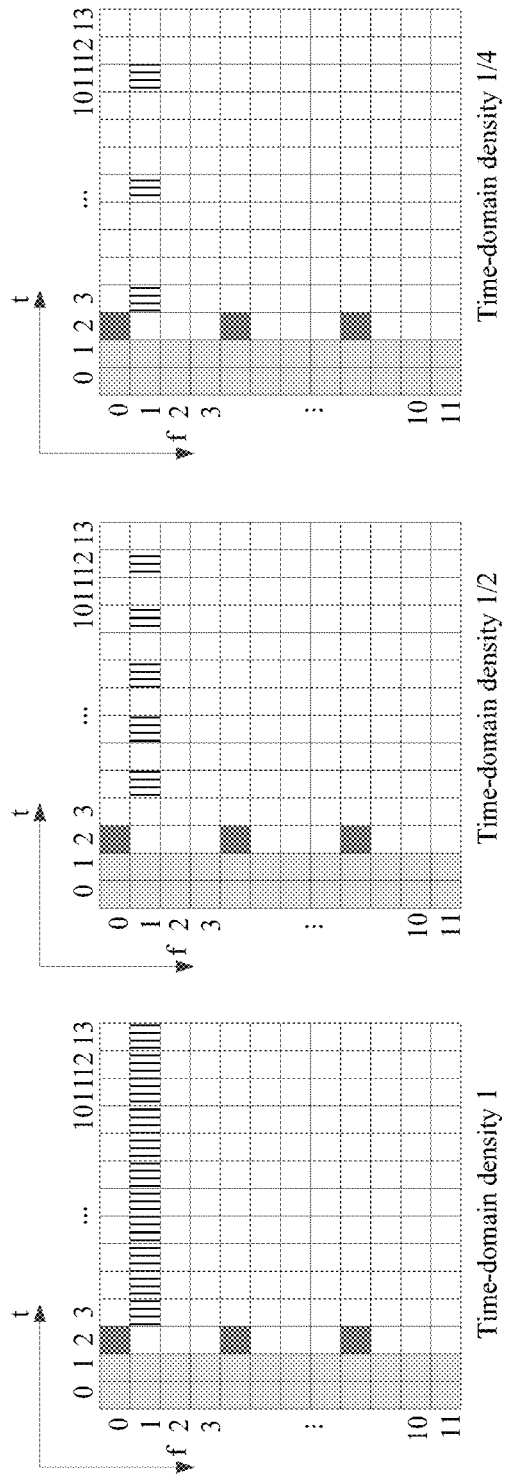
FIG. 22 is a schematic diagram of resource mapping of a phase tracking reference signal under several different time-domain densities according to this application.

Specifically, in the time domain, the PT-RS may be distributed on some or all symbols of a physical uplink shared channel (PUSCH) or a physical downlink shared channel (PDSCH) scheduled for a user. FIG. 22 shows an example of several time-domain densities of the PT-RS. As shown in FIG. 22, in the time domain, the PT-RS may be continuously mapped to every symbol of the PUSCH (or the PDSCH) (namely, a "time-domain density 1" shown in the figure), or may be mapped to every $2^{nd}$ symbol of the PUSCH (or the PDSCH) (namely, a "time-domain density ½" shown in the figure), or may be mapped to every $4^{th}$ symbol of the PUSCH (or the PDSCH) (namely, a "time-domain density ¼" shown in the figure).

Further, an index of a start symbol to which the PT-RS is mapped may be determined based on the time-domain density of the PT-RS.

For uplink data transmission, if the time-domain density of the PT-RS is the "time-domain density 1", the start symbol to which the PT-RS is mapped is the 1st symbol of the PUSCH, namely, a symbol "3" in the resource block; if the time-domain density of the PT-RS is the "time-domain density ½", the start symbol to which the PT-RS is mapped is the $2^{nd}$ symbol of the PUSCH, namely, a symbol "4" in the resource block; or if the time-domain density of the PT-RS is the "time-domain density ¼", the start symbol to which the PT-RS is mapped is the $1^{st}$ symbol of the PUSCH, namely, a symbol "3" in the resource block.

Likewise, for downlink data transmission, if the time-domain density of the PT-RS is the "time-domain density 1", the start symbol to which the PT-RS is mapped is the $1^{st}$ symbol of the PDSCH, namely, a symbol "3" in the resource block; if the time-domain density of the PT-RS is the "time-domain density ½", the start symbol to which the PT-RS is mapped is the $2^{nd}$ symbol of the PDSCH, namely, a symbol "4" in the resource block; or if the time-domain density of the PT-RS is the "time-domain density ¼", the start symbol to which the PT-RS is mapped is the $1^{st}$ symbol of the PDSCH, namely, a symbol "3" in the resource block.

Herein, the time-domain density of the PT-RS may be related to at least one of a CP type, a subcarrier spacing, and a modulation order, as described further below in the present application.

It should be noted that in addition to the foregoing several cases, the time-domain density of the PT-RS and the index of the start symbol to which the PT-RS is mapped may be alternatively different. This is not limited in this application.

Specifically, the time-domain density of the PT-RS and a mapping relationship between the time-domain density of the PT-RS and the index of the start symbol to which the PT-RS is mapped may be predefined by a protocol, or may be configured by the network device by using higher layer signaling (for example, RRC signaling) or a PDCCH.

(3) Resource Collision Avoidance

Figure 23A:
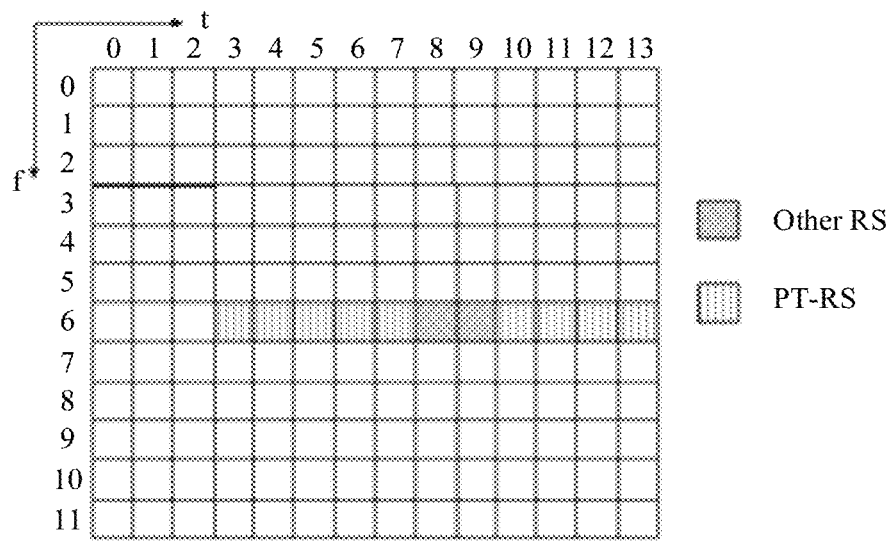
FIG. 23A to FIG. 23L are several schematic diagrams of resource mapping of a phase tracking reference signal for avoiding resource collision according to this application.

In addition to the PT-RS, another reference signal, for example, a CSI-RS, an SRS, or a DMRS, may also be mapped to the user scheduled bandwidth. Resource collision may occur between the PT-RS and the other reference signal. On a resource in collision, the other reference signal may be muted, that is, may have zero power. To avoid resource collision, mapping rules for the PT-RS may further include the following several types:

In a first type, the PT-RS is not mapped to a resource element to which the other reference signal is mapped, or the PT-RS has zero power on the resource element, or the PT-RS is punctured by the other reference signal. This may be specifically shown in FIG. 23A.

Figure 23B:
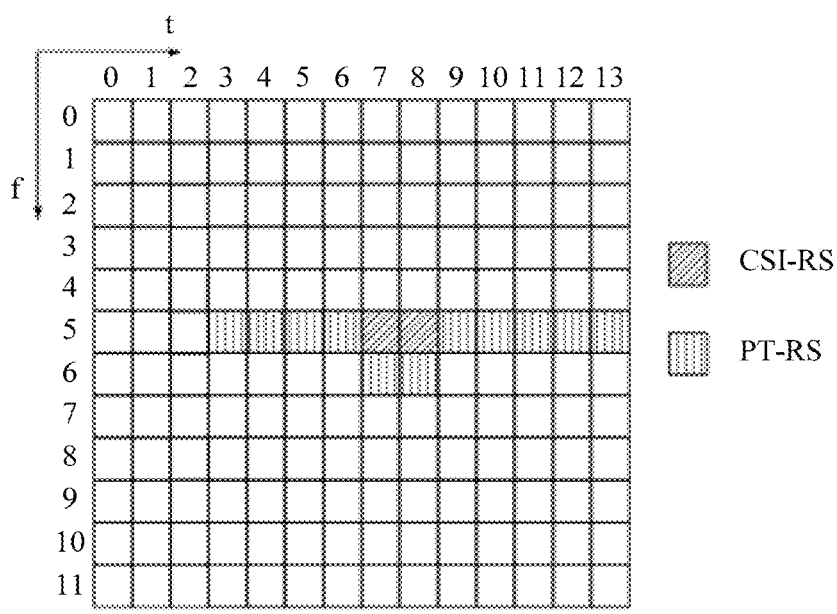

In a second type, on a symbol to which the other reference signal is mapped, the PT-RS is not mapped to a subcarrier to which the other reference signal is mapped. Specifically, on the symbol to which the other reference signal is mapped, a subcarrier of the PT-RS is mapped to a subcarrier other than the subcarrier to which the other reference signal is mapped. This may be specifically shown in FIG. 23B.

Figure 23C:
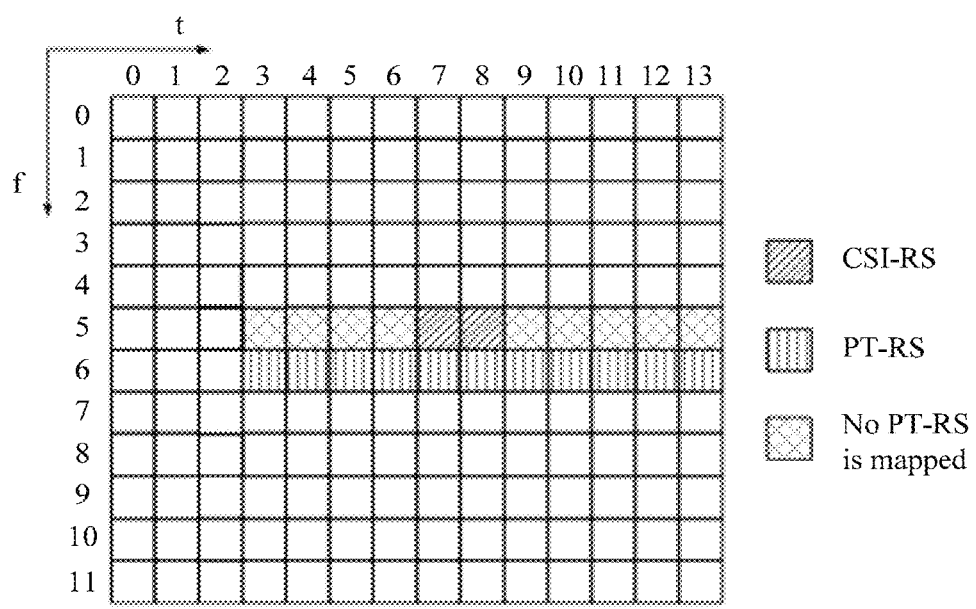

In a third type, on a subcarrier to which the other reference signal is mapped, the PT-RS is mapped to none of the symbols of a PUSCH (or a PDSCH) scheduled for a user. Specifically, on each symbol in a resource block (RB) to which the other reference signal is mapped, a subcarrier of the PT-RS is mapped to a subcarrier other than the subcarrier to which the other reference signal is mapped. This may be specifically shown in FIG. 23C.

In a fourth type, the PT-RS is mapped to an adjacent symbol of a symbol to which the other reference signal is mapped. To be specific, the PT-RS is also mapped to one symbol preceding and/or one symbol following the symbol to which the other reference signal is mapped. Optionally, the mapping of the second reference signal to the adjacent symbol of the symbol to which the other reference signal is mapped is determined based on a location of the symbol to which the other reference signal is mapped. Optionally, mapping of the second reference signal to a slot is determined based on the symbol to which the other reference signal is mapped.

Figure 23D:
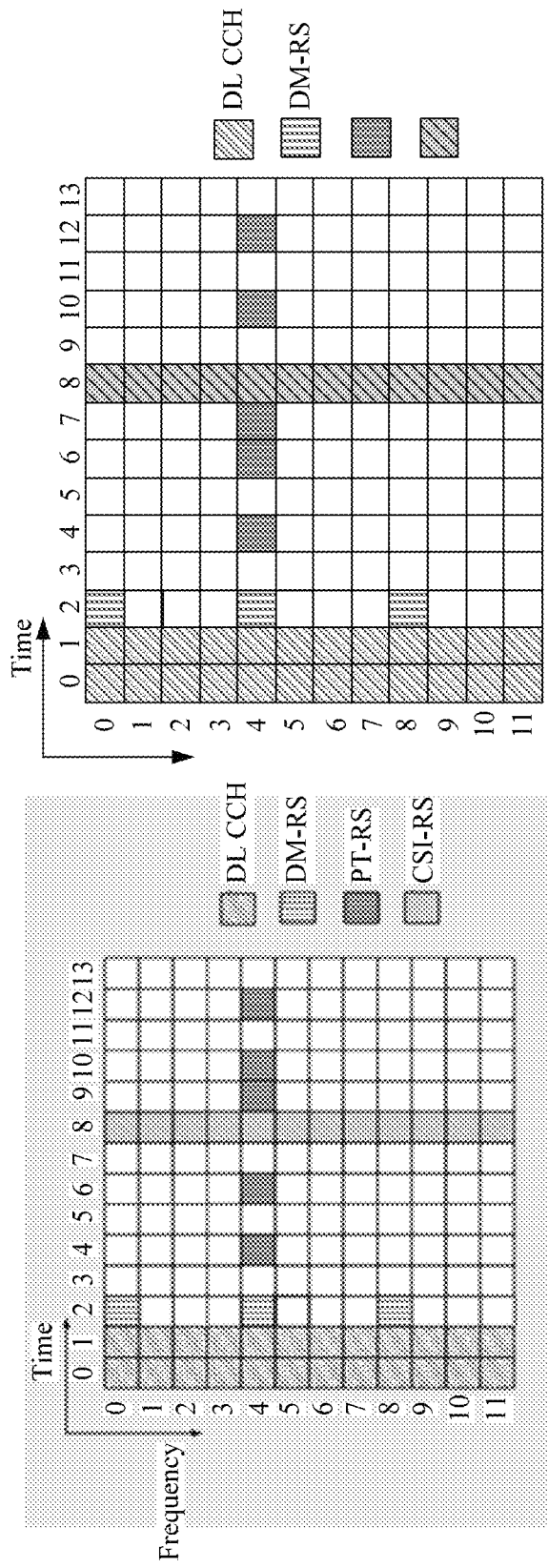

Optionally, the other reference signal is mapped to one OFDM symbol, and the time-domain density of the second reference signal, namely, the PT-RS, is ½. If the symbol to which the other reference signal is mapped and a symbol to which the PT-RS is mapped collide on a resource (as shown in FIG. 23D, the resource is in a time-frequency location of a symbol 8 and an RE 4), the PT-RS is also mapped to one symbol preceding and/or one symbol following the symbol to which the other reference signal is mapped (as shown in FIG. 23D, the PT-RS is mapped to a symbol 7 or a symbol 9).

It can be understood that the resource in collision means: If the PT-RS is evenly mapped in a time-domain range at a uniform spacing based on the time-domain density, to be specific, the PT-RS is mapped to one symbol at a spacing of n symbols (a value of n may be 1, 2, or 4), and a symbol location to which the other reference signal is mapped and symbol locations to which the PT-RS is evenly mapped in the time domain at the uniform spacing have a same symbol and a same subcarrier, the same subcarrier on the same symbol is understood as the resource in collision.

Figure 23E:
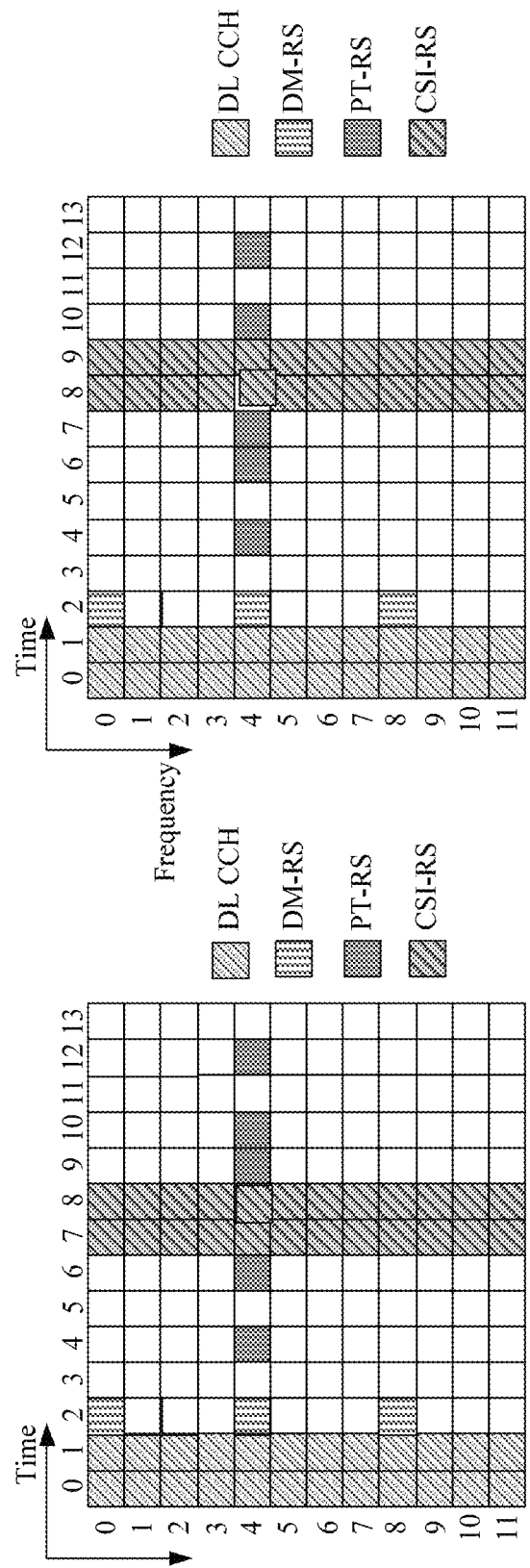

Optionally, provided that the other reference signal is mapped to two consecutive OFDM symbols, and the time-domain density of the PT-RS is ½, if the symbols to which the other reference signal is mapped and a symbol to which the PT-RS is mapped collide on a resource that is located on the $1^{st}$ symbol of the two consecutive OFDM symbols to which the other reference signal is mapped, the PT-RS is also mapped to one symbol preceding the symbols to which the other reference signal is mapped (as shown in a right diagram in FIG. 23E, the resource in collision is in a time-frequency location of a symbol 8 and an RE 4, and the PT-RS is also mapped to a symbol 7); or if the symbols to which the other reference signal is mapped and a symbol to which the PT-RS is mapped collide on a resource that is located on the $2^{nd}$ symbol of the two consecutive OFDM symbols to which the other reference signal is mapped, the PT-RS is also mapped to one adjacent symbol following the symbols to which the other reference signal is mapped (as shown in a left diagram in FIG. 23E, the resource in collision is in a time-frequency location of a symbol 8 and an RE 4, and the PT-RS is also mapped to a symbol 9).

Figure 23F:
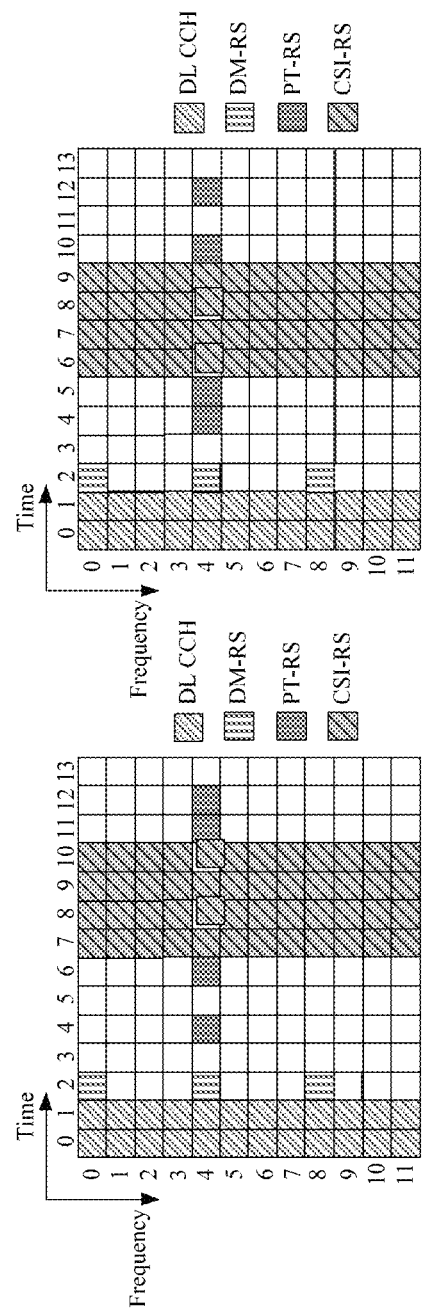

Optionally, provided that the other reference signal is mapped to four consecutive OFDM symbols, and the time-domain density of the PT-RS is ½, if the symbols to which the other reference signal is mapped and a symbol to which the PT-RS is mapped collide on a resource that is located on the $1^{st}$ symbol and the $3^{rd}$ symbol of the four consecutive OFDM symbols to which the other reference signal is mapped, the PT-RS is also mapped to one symbol preceding the symbols to which the other reference signal is mapped (as shown in a right diagram in FIG. 23F, the resource in collision is in time-frequency locations of REs 4 of a symbol 6 and a symbol 8, and the PT-RS is also mapped to a symbol 5); or if the symbols to which the other reference signal is mapped and a symbol to which the PT-RS is mapped collide on a resource that is located on the $2^{nd}$ symbol and the $4^{th}$ symbol of the four consecutive OFDM symbols to which the other reference signal is mapped, the PT-RS is also mapped to one adjacent symbol following the symbols to which the other reference signal is mapped (as shown in a left diagram in FIG. 23F, the resource in collision is in time-frequency locations of REs 4 of a symbol 8 and a symbol 10, and the PT-RS is also mapped to a symbol 11).

Figure 23G:
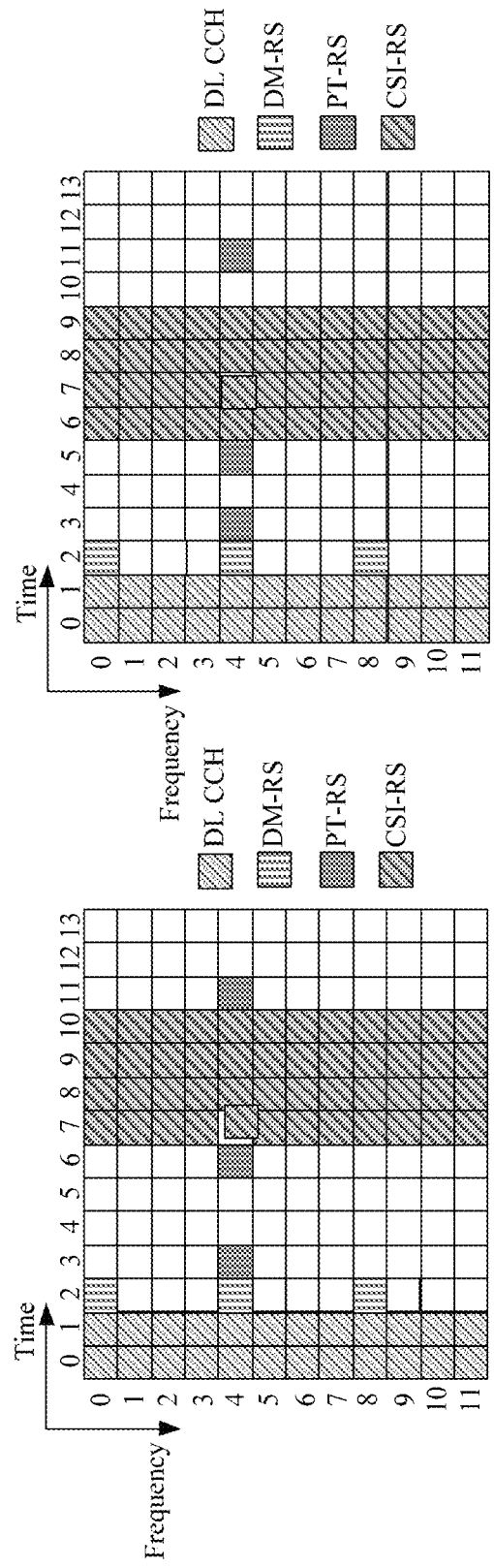
Figure 23H:
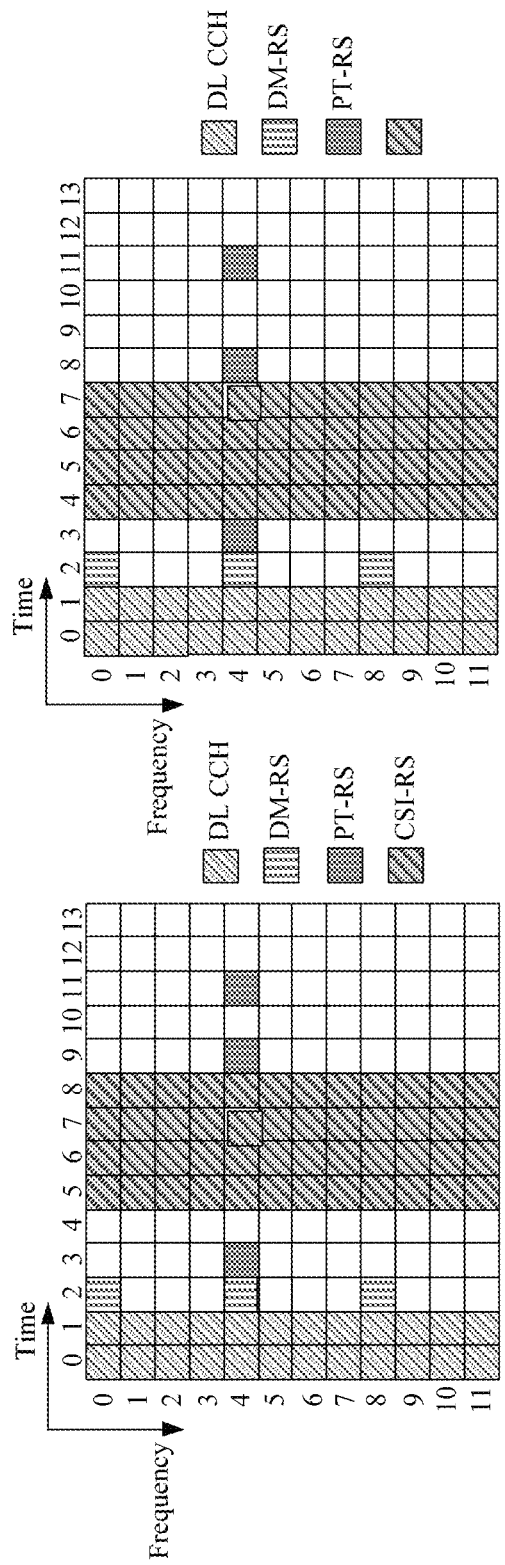

Optionally, provided that the other reference signal is mapped to four consecutive OFDM symbols, and the time-domain density of the PT-RS is ¼, if the symbols to which the other reference signal is mapped and a symbol to which the PT-RS is mapped collide on a resource that is located on the 1St symbol or the $2^{nd}$ symbol of the four consecutive OFDM symbols to which the other reference signal is mapped (as shown in FIG. 23G, the resource in collision is in a time-frequency location of a symbol 7 and an RE 4), the PT-RS is also mapped to one symbol preceding the symbols to which the other reference signal is mapped; or if the symbols to which the other reference signal is mapped and a symbol to which the PT-RS is mapped collide on a resource that is located on the $3^{rd}$ symbol or the $4^{th}$ symbol of the four consecutive OFDM symbols to which the other reference signal is mapped (as shown in FIG. 23H, the resource in collision is in a time-frequency location of a symbol 7 and an RE 4), the PT-RS is also mapped to one adjacent symbol following the symbols to which the other reference signal is mapped.

Figure 23I:
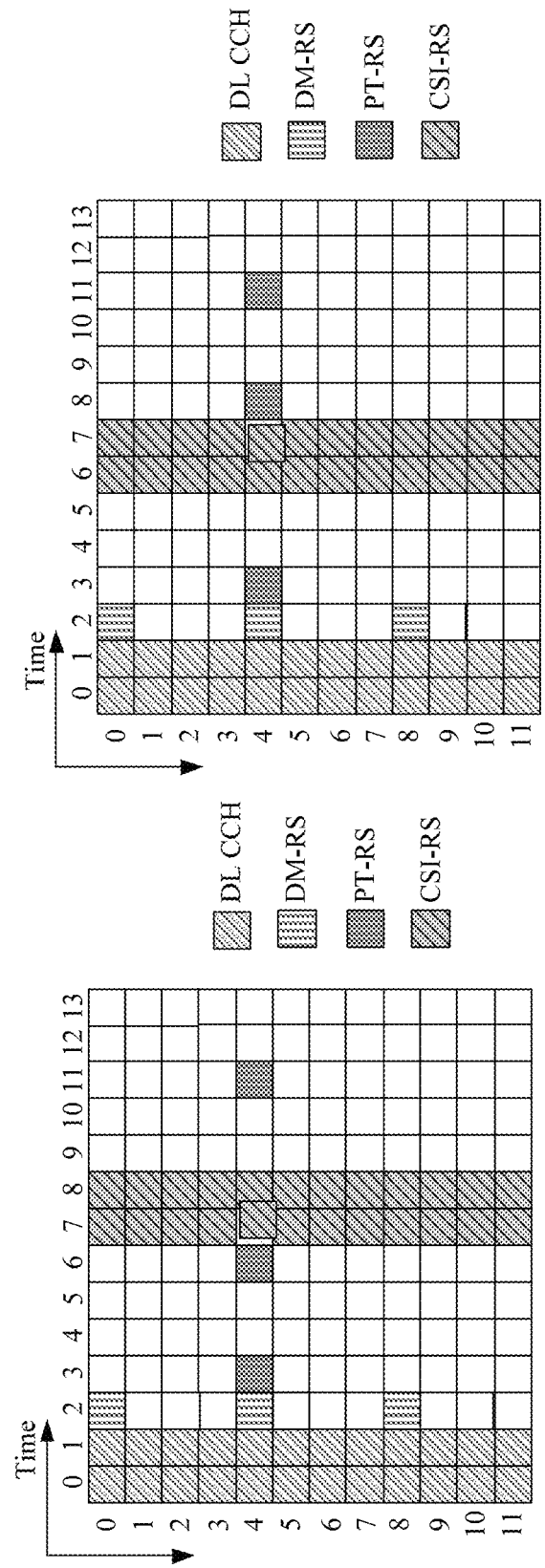

Optionally, provided that the other reference signal is mapped to two consecutive OFDM symbols, and the time-domain density of the PT-RS is ¼, if the symbols to which the other reference signal is mapped and a symbol to which the PT-RS is mapped collide on a resource that is located on the $1^{st}$ symbol of the two consecutive OFDM symbols to which the other reference signal is mapped, the PT-RS is also mapped to one symbol preceding the symbols to which the other reference signal is mapped (as shown in a left diagram in FIG. 23I, the resource in collision is in a time-frequency location of a symbol 7 and an RE 4, and the PT-RS is also mapped to a symbol 6); or if the symbols to which the other reference signal is mapped and a symbol to which the PT-RS is mapped collide on a resource that is located on the $2^{nd}$ symbol of the two consecutive OFDM symbols to which the other reference signal is mapped, the PT-RS is also mapped to one adjacent symbol following the symbols to which the other reference signal is mapped (as shown in a right diagram in FIG. 23I, the resource in collision is in a time-frequency location of a symbol 7 and an RE 4, and the PT-RS is also mapped to a symbol 8).

Figure 23J:
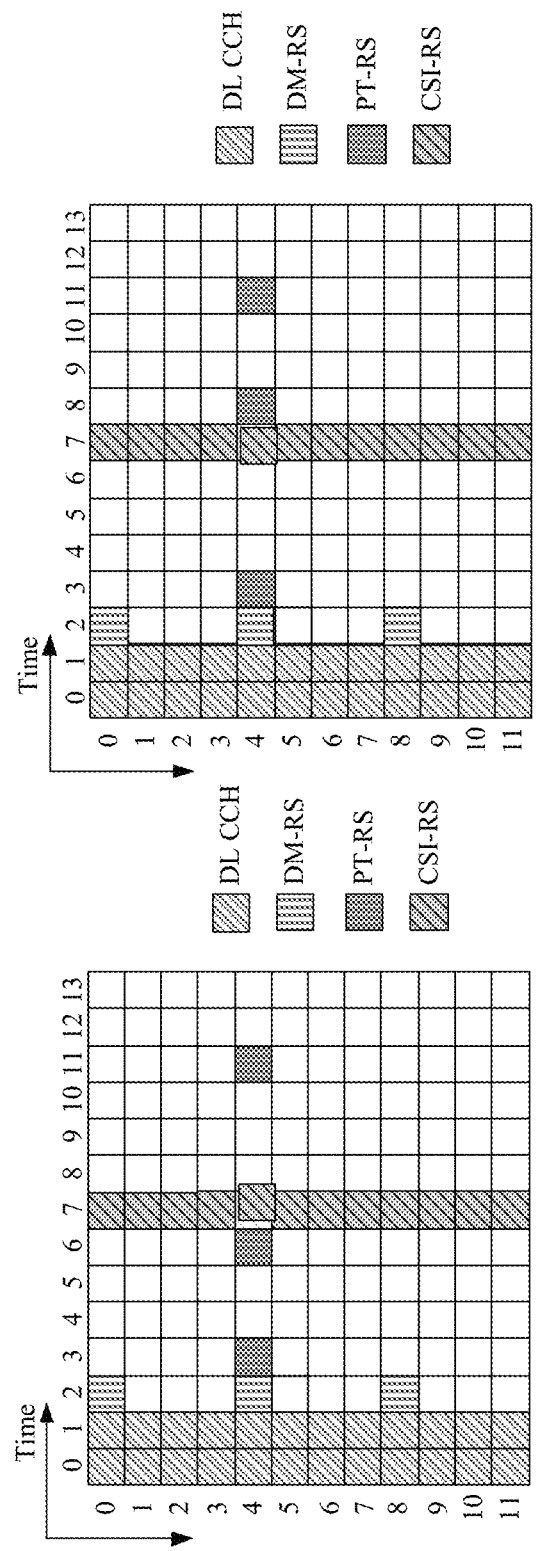

Optionally, the other reference signal is mapped to one OFDM symbol, and the time-domain density of the second reference signal, namely, the PT-RS, is ¼. If the symbol to which the other reference signal is mapped and a symbol to which the PT-RS is mapped collide on a resource (as shown in FIG. 23J, the resource in collision is in a time-frequency location of a symbol 7 and an RE 4), the PT-RS is also mapped to one symbol preceding and/or one symbol following the symbol to which the other reference signal is mapped, as shown in FIG. 23J.

In a fifth type, the PT-RS is mapped to an adjacent symbol of a symbol to which the other reference signal is mapped, the adjacent symbol of the symbol to which the other reference signal is mapped is used as a time-domain reference or an anchor symbol of the PT-RS, and the second reference signal is mapped based on the time-domain density of the second reference signal. Optionally, the mapping of the second reference signal to the adjacent symbol of the symbol to which the other reference signal is mapped is determined based on a location of the symbol to which the other reference signal is mapped, that is, the time-domain reference is determined based on the symbol to which the other reference signal is mapped. Optionally, mapping of the second reference signal to a slot is determined based on the symbol to which the other reference signal is mapped.

Figure 23K:
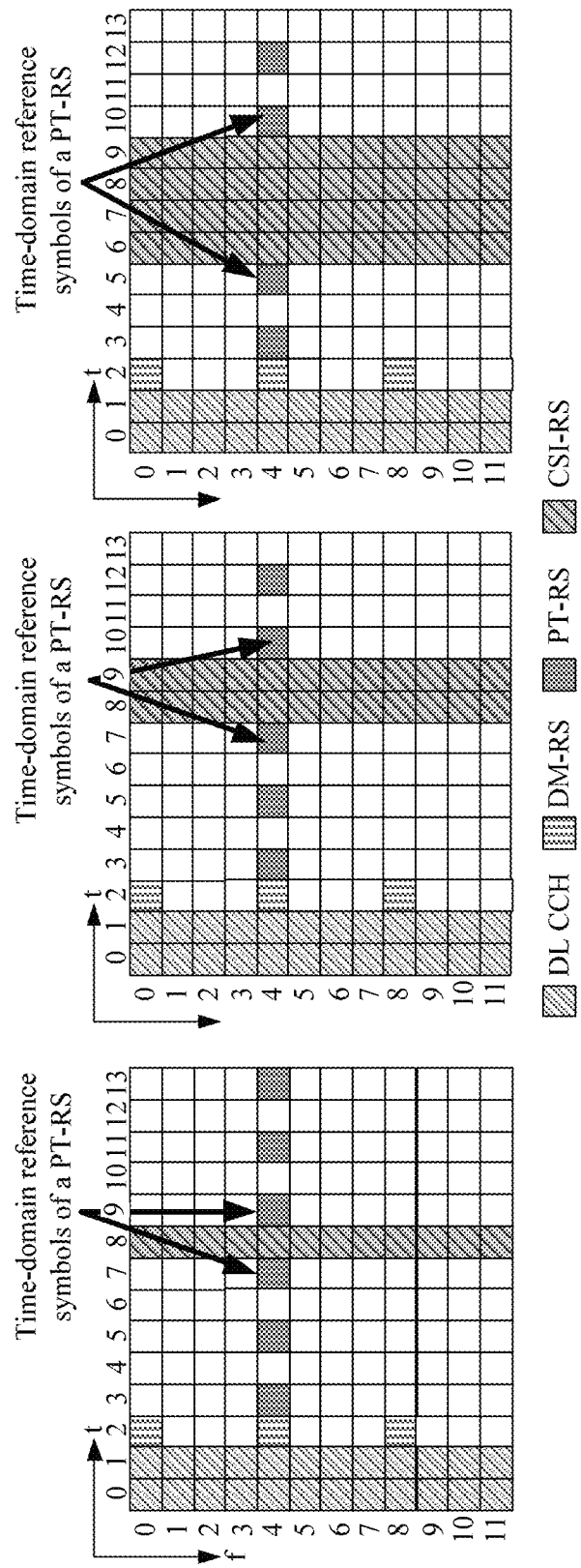

Optionally, if the other reference signal is mapped to one OFDM symbol or two or four consecutive OFDM symbols, and the time-domain density of the PT-RS is ½, the PT-RS is mapped by using one adjacent symbol preceding and one adjacent symbol following the symbol/symbols to which the other reference signal is mapped as time-domain references or anchor symbols of the PT-RS. Specifically, based on the time-domain density ½, the PT-RS mapped to one or more symbols preceding the symbol/symbols to which the other reference signal is mapped is certainly mapped to the one adjacent symbol preceding the symbol/symbols to which the other reference signal is mapped; and based on the time-domain density ½, the PT-RS mapped to one or more symbols following the symbol/symbols to which the other reference signal is mapped is certainly mapped to the one adjacent symbol following the symbol/symbols to which the other reference signal is mapped, as shown in FIG. 23K.

Figure 23L:
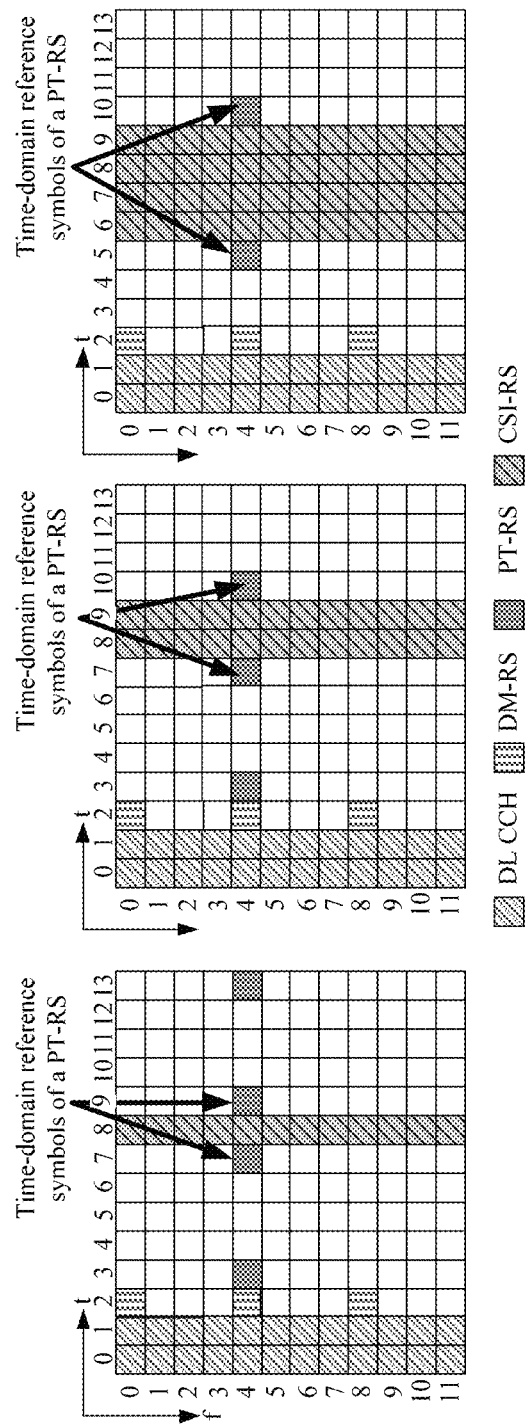

Optionally, if the other reference signal is mapped to one OFDM symbol or two or four consecutive OFDM symbols, and the time-domain density of the PT-RS is ¼, the PT-RS is mapped by using one adjacent symbol preceding and one adjacent symbol following the symbol/symbols to which the other reference signal is mapped as time-domain references or anchor symbols of the PT-RS. Specifically, based on the time-domain density ¼, the PT-RS mapped to one or more symbols preceding the symbol/symbols to which the other reference signal is mapped is certainly mapped to the one adjacent symbol preceding the symbol/symbols to which the other reference signal is mapped; and based on the time-domain density ¼, the PT-RS mapped to one or more symbols following the symbol/symbols to which the other reference signal is mapped is certainly mapped to the one adjacent symbol following the symbol/symbols to which the other reference signal is mapped, as shown in FIG. 23L.

In a sixth type, a mapping rule for the second reference signal is determined depending on whether a physical downlink/uplink shared channel is mapped to a symbol to which the other reference signal is mapped. Specifically, if a physical downlink/uplink shared channel is also mapped to the symbol to which the other reference signal is mapped, the second or third type of mapping rule is used for the second reference signal; or if no physical downlink/uplink shared channel is mapped to the symbol to which the other reference signal is mapped, the first, fourth, or fifth type of mapping rule is used.

In this application, within the user scheduled bandwidth, on one or more symbols to which the other reference signal is mapped, a quantity of subcarriers to which the PT-RS is mapped on the one or more symbols may be calculated based on the frequency-domain density of the PT-RS and a bandwidth, on the one or more symbols, that can be used for PUSCH (or PDSCH) transmission. The calculated quantity of subcarriers is a required quantity of subcarriers to which the PT-RS is mapped within the bandwidth, on the one or more symbols, that can be used for PUSCH (or PDSCH) transmission. A manner of determining the frequency-domain density of the PT-RS is described further below in the present application.

It can be understood that because a part of a bandwidth on the one or more symbols is occupied by the other reference signal, the bandwidth, on the one or more symbols, that can be used for PUSCH (or PDSCH) transmission is less than a PUSCH (or PDSCH) bandwidth scheduled for the user, and the quantity of subcarriers to which the PT-RS is mapped on the one or more symbols is also less than $L_{PT-RS}$ mentioned in the foregoing content.

On the symbol to which the other reference signal is mapped, a quantity of subcarriers to which the PT-RS is actually mapped may be less than or equal to the calculated quantity of subcarriers. The following specifically describes several manners of mapping the PT-RS to the symbol to which the other reference signal is mapped.

Figure 24A:
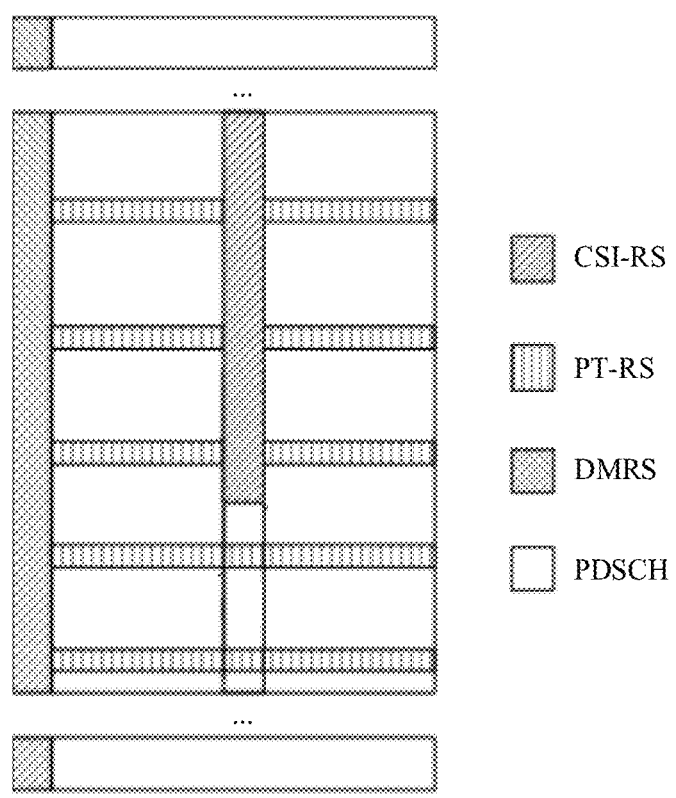
FIG. 24A to FIG. 24C are several schematic diagrams of resource mapping for mapping a phase tracking reference signal to a single symbol to which another reference signal is mapped according to this application.

In a first manner, as shown in FIG. 24A, on the symbol to which the other reference signal is mapped, a subcarrier location to which the PT-RS is mapped within the bandwidth that can be used for PUSCH (or PDSCH) transmission may be the same as a subcarrier location to which the PT-RS is mapped on a symbol to which the other reference signal is not mapped.

Figure 24B:
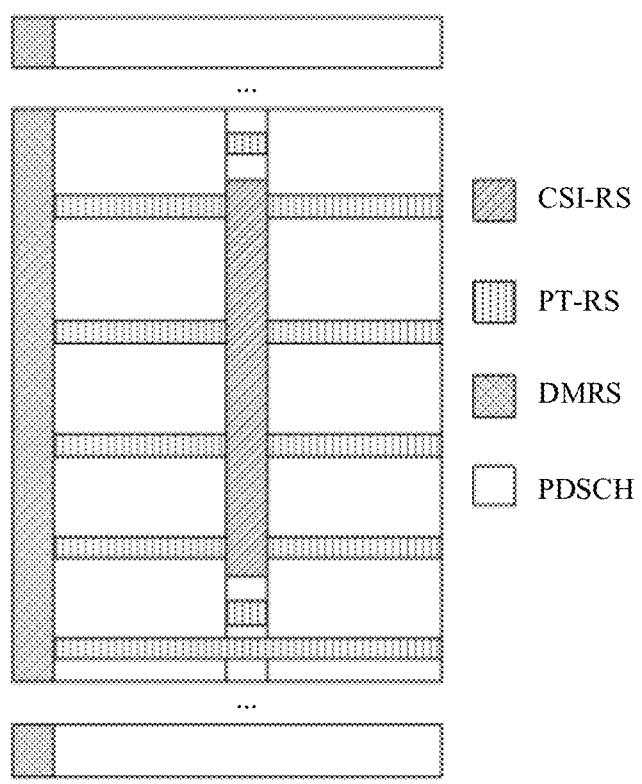

In a second manner, as shown in FIG. 24B, on the symbol to which the other reference signal is mapped, if the PT-RS is mapped in the foregoing first mapping manner, and a quantity of subcarriers to which the PT-RS is actually mapped within the bandwidth that can be used for PUSCH (or PDSCH) transmission is less than a required quantity of subcarriers to which the PT-RS is mapped within the bandwidth that can be used for PUSCH (or PDSCH) transmission, the PT-RS may be additionally mapped to another subcarrier within the bandwidth that can be used for PUSCH (or PDSCH) transmission.

Figure 24C:
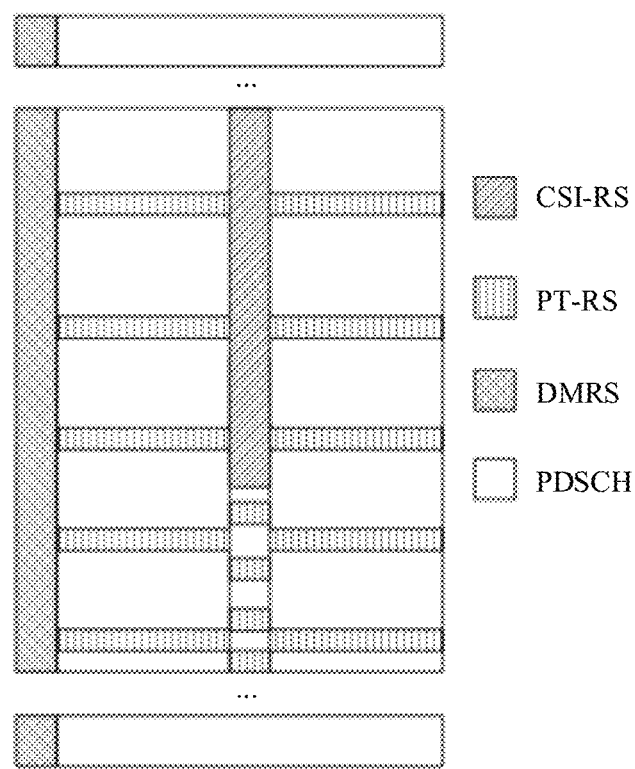

In a third manner, as shown in FIG. 24C, on the symbol to which the other reference signal is mapped, the PT-RS is evenly distributed within the bandwidth that can be used for PUSCH (or PDSCH) transmission. A subcarrier location to which the PT-RS is mapped on the symbol does not need to be the same as a subcarrier location to which the PT-RS is mapped on a symbol to which the other reference signal is not mapped.

(4) Time-Domain Density of the PT-RS

In this application, the time-domain density of the PT-RS may be related to at least one of a bandwidth part (BP), a cyclic prefix (CP) type, a subcarrier spacing, and a modulation order.

Specifically, there is a correspondence between the time-domain density of the PT-RS and the at least one of the BP, the CP type, the subcarrier spacing, and the modulation order. Different BPs, CP types, subcarrier spacings, or modulation orders may correspond to different time-domain densities. Specifically, the correspondence may be predefined by a protocol, or may be configured by the network device by using higher layer signaling (for example, RRC signaling).

It can be learned from the foregoing content that the time-domain density of the PT-RS defines a quantity of symbols to which the PT-RS is mapped once. For example, the PT-RS may be continuously mapped to every symbol of a PUSCH (or a PDSCH), or may be mapped to every $2^{nd}$ symbol of a PUSCH (or a PDSCH), or may be mapped to every $4^{th}$ symbol of a PUSCH (or a PDSCH).

In this application, the time-domain density of the PT-RS may be determined based on the subcarrier spacing and the modulation order. Specifically, for a determined subcarrier spacing value, one or more modulation order thresholds may be predefined, or may be configured by using higher layer signaling. All modulation orders between two adjacent modulation order thresholds correspond to a same time-domain density of the PT-RS, as shown in Table 1.

TABLE 1

| Modulation order | Time-domain density |
| --- | --- |
| 0 <= MCS < MCS_1 | 0 |
| MCS_1 <= MCS < MCS_2 | 1/4 |
| MCS_2 <= MCS < MCS_3 | 1/2 |
| MCS_3 <= MCS | 1 |

MCS_1, MCS_2, and MCS_3 are modulation order thresholds. The time-domain densities "1", "½", and "¼" are the three time-domain densities shown in FIG. 22.

Specifically, at a determined subcarrier spacing, the time-domain density of the PT-RS may be determined based on a modulation order threshold interval into which an actual modulation order MCS falls. For example, assuming that Table 2 shows modulation order thresholds at a default subcarrier spacing SCS_1=15 kHz, if the actual modulation order MCS falls into an interval [MCS_2, MCS_3], the time-domain density of the PT-RS is ½. This example is merely used to explain this embodiment of the present application, and should not be construed as a limitation.

In this application, different subcarrier spacings may correspond to different modulation order thresholds. To be specific, different correspondence tables of a modulation order threshold and a time-domain density may be configured for different subcarrier spacings.

Specifically, modulation order thresholds corresponding to different subcarrier spacings may be predefined by a protocol, or may be configured by the network device by using higher layer signaling (for example, RRC signaling).

In some optional embodiments, a default subcarrier spacing (expressed as SCS_1), for example, 15 kHz, and one or more default thresholds (expressed as MCS') corresponding to the default subcarrier spacing may be predefined by a protocol, or may be configured by using higher layer signaling. In addition, for another non-default subcarrier spacing, a corresponding modulation order offset (expressed as MCS_offset, which is an integer) may be predefined by a protocol, or may be configured by using higher layer signaling. MCS_offset+MCS=MCS', where MCS represents an actual modulation order at the other non-default subcarrier spacing. At the other non-default subcarrier spacing, the time-domain density of the PT-RS may be determined by adding the actual modulation order MCS up to the modulation order offset MCS_offset.

For example, if Table 2 shows modulation order thresholds at the default subcarrier spacing SCS_1=15 kHz, at a non-default subcarrier spacing 60 Hz, if a sum of the actual modulation order MCS and MCS_offset falls into an interval [0, MCS_1], the time-domain density of the PT-RS is 0; or if a sum of the actual modulation order MCS and MCS_offset falls into an interval [MCS_1, MCS_2], the time-domain density of the PT-RS is ¼. This example is merely used to explain this embodiment of the present application, and should not be construed as a limitation.

TABLE 2

| Modulation order | Time-domain density |
| --- | --- |
| 0 <= MCS' < MCS_1 | 0 |
| MCS_1 <= MCS' < MCS_2 | 1/4 |
| MCS_2 <= MCS' < MCS_3 | 1/2 |
| MCS_3 <= MCS' | 1 |

In some optional embodiments, a default subcarrier spacing (expressed as SCS_1) and one or more default modulation order thresholds (expressed as MCS') corresponding to the default subcarrier spacing may be predefined by a protocol, or may be configured by using higher layer signaling. In addition, for another non-default subcarrier spacing (expressed as SCS_n), a corresponding scale factor β (0<β<1) may be predefined by a protocol, or may be configured by using higher layer signaling. It may be defined that β=SCS_1/SCS_n. At the other non-default subcarrier spacing, a default modulation order threshold interval into which an MCS falls may be determined by using an actual modulation order MCS and the default modulation order threshold MCS'. Then an actual time-domain density of the PT-RS is determined by multiplying the scale factor R by a time-domain density corresponding to the default modulation order threshold interval.

For example, if Table 2 shows modulation order thresholds at a default subcarrier spacing SCS_1=60 kHz, at a non-default subcarrier spacing 120 Hz, if the actual modulation order MCS falls into [MCS_2, MCS_3], the actual time-domain density of the PT-RS is a time-domain density closest to a product of the time-domain density "½" and the scale factor R. Because β=60/120=½, the actual time-domain density of the PT-RS is ¼. This example is merely used to explain this embodiment of the present application, and should not be construed as a limitation.

In this application, for different CP types or lengths, a correspondence between the time-domain density of the PT-RS and at least one of the subcarrier spacing and the modulation order may be predefined by a protocol, or may be configured by using higher layer signaling (for example, RRC signaling).

Optionally, for an extended cyclic prefix (ECP), the time-domain density of the PT-RS may be predefined by a protocol, or may be configured by using higher layer signaling as follows: The PT-RS is continuously mapped to every symbol of a PUSCH (or a PDSCH). In this way, the PT-RS can be used to help with Doppler shift estimation in a high-speed large-delay extension scenario.

In this application, the time-domain density of the PT-RS may be alternatively determined based on the bandwidth part (BP) and the modulation order MCS. Optionally, one or more BPs may correspond to one group of MCS thresholds, or a correspondence between MCS thresholds and time-domain densities. The group of MCS thresholds or the correspondence between MCS thresholds and time-domain densities may be predefined according to a protocol, or may be configured by a base station by using higher layer signaling, for example, RRC signaling, a MAC CE, a broadcast message, a system message, or a combination of at least two thereof messages. Optionally, the correspondence between MCS thresholds and time-domain densities may be represented by using a correspondence table of an MCS threshold and a time-domain density, as shown in Table A.

Specifically, the correspondence between MCS thresholds and time-domain densities may be determined by using a group of MCS thresholds. For example, when candidate values of time-domain densities are fixed, that is, values of "No PT-RS, TD1, TD2, and TD3" in a time-domain density column in Table A are predefined by a protocol, after the candidate values of time-domain densities are prestored according to the predefinition and a group of thresholds $\{MCS_1^{BPx}, MCS_2^{BPx}, MCS_3^{BPx}, MCS_4^{BPx}\}$ is determined, a correspondence between the group of MCS thresholds and a time-domain density may be determined.

Optionally, groups of MCS thresholds corresponding to one or more BPs, or correspondences, corresponding to one or more BPs, between MCS thresholds and time-domain densities may be the same. In other words, one or more BPs may correspond to a same group of MCS thresholds or a same correspondence between MCS thresholds and time-domain densities. The BP may be a consecutive segment of resource in the frequency domain. For example, one BP includes K consecutive subcarriers, where K is an integer greater than 0. For another example, one BP is a frequency-domain resource in which N non-overlapping consecutive physical resource blocks (PRB) are located, where N is an integer greater than 0, and a subcarrier spacing of the PRB may be 15 k, 30 k, 60 k, or other subcarrier spacing values. For another example, one BP is a frequency-domain resource in which N non-overlapping consecutive physical resource block (PRB) groups are located, and one PRB group includes M consecutive PRBs, where both M and N are integers greater than 0, and a subcarrier spacing of the PRB may be 15 k, 30 k, 60 k, or other subcarrier spacing values. For another example, for a terminal, a BP length is less than or equal to a maximum bandwidth supported by the terminal. For another example, one BP corresponds to one subcarrier spacing. For another example, subcarrier spacings or CPs corresponding to different BPs may be different.

Optionally, groups of MCS thresholds corresponding to one or more BPs, or correspondences, corresponding to one or more BPs, between MCS thresholds and time-domain densities may be different. For example, one BP corresponds to a separate group of MCS thresholds or a separate correspondence between MCS thresholds and time-domain densities.

For example, for a first BP, the base station configures a group of MCS thresholds $\{MCS_1^{BP0}, MCS_2^{BP0}, MCS_3^{BP0}, MCS_4^{BP0}\}$ or a correspondence between MCS thresholds and time-domain densities by using signaling, or predefines a group of MCS thresholds $\{MCS_1^{BP0}, MCS_2^{BP0}, MCS_3^{BP0}, MCS_4^{BP0}\}$ or a correspondence between MCS thresholds and time-domain densities according to a protocol. The correspondence may be shown in Table A. The signaling may be higher layer signaling, for example, RRC signaling, a MAC CE, a broadcast message, a system message, or a combination of at least two thereof messages.

TABLE A

| Modulation order | Time-domain density |
|---|---|
| $0 <= MCS < MCS_1^{BP0}$ | No PT-RS |
| $MCS_1^{BP0} <= MCS < MCS_2^{BP0}$ | $TD_1$ |
| $MCS_2^{BP0} <= MCS < MCS_3^{BP0}$ | $TD_2$ |
| $MCS_3^{BP0} <= MCS < MCS_4^{BP0}$ | $TD_3$ |

Values of $TD_1$, $TD_2$, and $TD_3$ may be numbers from 0 to 1 (including 0 and 1), for example, 0, ½, ¼, and 1; or may be other values. This is merely an example. Specifically, specific meanings of time-domain density values 0, ½, ¼, and 1 are respectively as follows: No PT-RS is mapped, a PT-RS is mapped to one of every two OFDM symbols, a PT-RS is mapped to one of every four OFDM symbols, and a PT-RS is mapped to every OFDM symbol.

For a second BP, the base station configures a group of MCS thresholds $\{MCS_1^{BP1}, MCS_2^{BP1}, MCS_3^{BP1}, MCS_4^{BP1}\}$ or a correspondence between MCS thresholds and time-domain densities by using signaling, or predefines a group of MCS thresholds $\{MCS_1^{BP1}, MCS_2^{BP1}, MCS_3^{BP1}, MCS_5^{BP1}\}$ or a correspondence between MCS thresholds and time-domain densities according to a protocol, as shown in Table B. The signaling may be higher layer signaling, for example, RRC signaling, a MAC CE, a broadcast message, a system message, or a combination of at least two thereof messages.

TABLE B

| Modulation order | Time-domain density |
|---|---|
| $0 <= MCS < MCS_1^{BP1}$ | No PT-RS |
| $MCS_1^{BP1} <= MCS < MCS_2^{BP1}$ | $TD_1$ |
| $MCS_2^{BP1} <= MCS < MCS_3^{BP1}$ | $TD_2$ |
| $MCS_3^{BP1} <= MCS < MCS_4^{BP1}$ | $TD_3$ |

Values of $TD_1$, $TD_2$, and $TD_3$ may be numbers from 0 to 1 (including 0 and 1), for example, 0, ½, ¼, and 1; or may be other values. This is merely an example.

By analogy, for an $n^{th}$ BP, the base station configures a group of MCS thresholds $\{MCS_1^{BPn}, MCS_2^{BPn}, MCS_3^{BPn}, MCS_4^{BPn}\}$ or a correspondence between MCS thresholds and time-domain densities by using signaling, or predefines a group of MCS thresholds $\{MCS_1^{BPn}, MCS_2^{BPn}, MCS_3^{BPn}, MCS_4^{BPn}\}$ or a correspondence between MCS thresholds and time-domain densities according to a protocol, as shown in Table C. The signaling may be higher layer signaling, for example, RRC signaling, a MAC CE, a broadcast message, a system message, or a combination of at least two thereof messages.

TABLE C

| Modulation order | Time-domain density |
|---|---|
| $0 <= MCS < MCS_1^{BPn}$ | No PT-RS |
| $MCS_1^{BPn} <= MCS < MCS_2^{BPn}$ | $TD_1$ |
| $MCS_2^{BPn} <= MCS < MCS_3^{BPn}$ | $TD_2$ |
| $MCS_3^{BPn} <= MCS < MCS_4^{BPn}$ | $TD_3$ |

Values of $TD_1$, $TD_2$, and $TD_3$ may be numbers from 0 to 1 (including 0 and 1), for example, 0, ½, ¼, and 1; or may be other values. This is merely an example.

Optionally, the base station may send, to the terminal by using signaling, a correspondence between one or more BPs and one or more groups of MCS thresholds. Optionally, the correspondence between one or more BPs and one or more groups of MCS thresholds may be shown in Table D. Alternatively, the base station may send, to the terminal by using signaling, a correspondence between one or more BPs and one or more correspondences between MCS thresholds and time-domain densities. The signaling may be higher layer signaling, for example, RRC signaling, a MAC CE, a broadcast message, a system message, or a combination of at least two thereof messages. The terminal receives the signaling, and determines a specific group of MCS thresholds based on a currently active BP.

TABLE D

| Candidate BP | MCS threshold group |
|---|---|
| BP0, . . . , BPm | $\{MCS_1^0, MCS_2^0, MCS_3^0, MCS_4^0\}$ |
| BP1, . . . , BPx | $\{MCS_1^1, MCS_2^1, MCS_3^1, MCS_4^1\}$ |
| . . . | |
| BPn | $\{MCS_1^n, MCS_2^n, MCS_3^n, MCS_4^n\}$ |

The base station may determine, based on Table D and the BP currently active for a terminal side, the group of MCS thresholds or the correspondence between MCS thresholds and time-domain densities, as shown in Table A, Table B, and Table C. The base station determines the time-domain density of the PT-RS based on an MCS value scheduled for the terminal side and the determined group of MCS thresholds or the determined correspondence between MCS thresholds and time-domain densities. In downlink sending, the base station maps the PT-RS to one or more symbols based on the determined time-domain density of the PT-RS, and sends the PT-RS to the terminal side. In uplink receiving, the base station receives the PT-RS on one or more symbols based on the determined time-domain density of the PT-RS.

The terminal may obtain Table A, Table B, and Table C (there may be actually a plurality of tables, and Table A, Table B, and Table C are merely examples, and do not constitute any limitation on the present application) by prestoring a group(s) of MCS thresholds corresponding to one or more BPs, or a correspondence(s), corresponding to one or more BPs, between MCS thresholds and time-domain densities, as shown in Table A, Table B, and Table C, or by receiving signaling from the base station. The signaling is used to indicate one or more groups of MCS thresholds corresponding to the one or more BPs, or one or more correspondences, corresponding to the one or more BPs, between MCS thresholds and time-domain densities. The terminal determines, based on the currently active BP, a group of MCS thresholds, a correspondence between MCS thresholds and time-domain densities, or a specific table that is to be used. After the table, the group of MCS thresholds, or the correspondence between MCS thresholds and time-domain densities is determined, a corresponding time-domain density of the PT-RS is then determined based on an interval into which an actually scheduled MCS falls. In downlink receiving, the terminal side receives the PT-RS on one or more symbols based on the determined time-domain density of the PT-RS. In uplink sending, the terminal sends the PT-RS on one or more symbols based on the determined time-domain density of the PT-RS.

Optionally, the base station may determine, based on the BP currently active for the terminal side, a specific group of MCS thresholds or a specific correspondence between a group of MCS thresholds and time-domain densities. The base station sends signaling. The signaling is used to indicate the determined group of MCS thresholds or the determined correspondence between MCS thresholds and time-domain densities. The signaling may be higher layer signaling or downlink control information. The higher layer signaling may be RRC signaling, a MAC CE, a broadcast message, a system message, or a combination of at least two thereof messages. The terminal receives the signaling from the base station. The signaling is used to indicate the determined group of MCS thresholds or the determined correspondence between MCS thresholds and time-domain densities. The terminal determines, based on the signaling, a group of MCS thresholds that needs to be used or a correspondence between MCS thresholds and time-domain densities that needs to be used, and determines a corresponding time-domain density of the PT-RS based on a threshold interval into which an MCS actually scheduled by the terminal falls.

Optionally, the base station may configure one or more candidate BPs for the terminal by using first signaling, and then notify the terminal of a currently active BP by using second signaling. The currently active BP is one of the one or more candidate BPs. The first signaling may be RRC signaling, and the second signaling may be a DCI or a MAC CE.

Optionally, the base station may configure an actual MCS for the terminal by using signaling. For example, the signaling is a DCI, and the MCS occupies five bits or six bits. The terminal obtains the current MCS by reading an MCS indication field in the DCI signaling.

Optionally, one group of BPs corresponds to a same group of MCS thresholds or a same correspondence between MCS thresholds and time-domain densities. The group of MCS thresholds or the correspondence between MCS thresholds and time-domain densities is predefined according to a protocol, or is configured by the base station by using signaling. The signaling is higher layer signaling, for example, RRC signaling, a MAC CE, a broadcast message, a system message, or a combination of at least two of these messages. The BP group includes one or more BPs. BP group information may be configured by the base station and sent to the terminal by using signaling, or the BP group is predefined by a protocol, or a BP grouping rule is predefined by a protocol. Optionally, the base station groups one or more BPs with a same subcarrier spacing into one BP group, or the base station groups one or more BPs with a same numerology into one BP group, and sends BP group information to the terminal by using signaling. The signaling may be higher layer signaling, for example, RRC signaling, a MAC CE, a broadcast message, a system message, or a combination of at least two of these messages. The BP group information includes the one or more BPs in the BP group, a number of the BP group, a subcarrier spacing of the BP group, numerology of the BP group, or a number or an index value of the one or more BPs in the BP group. The terminal receives the group information sent by the base station, and determines, based on the group information, a BP group to which the BP currently active for the terminal belongs.

Alternatively, the BP grouping rule is predefined by the protocol. Optionally, the BP grouping rule predefined by the protocol is that BPs with a same subcarrier spacing form one group. The terminal determines, according to the grouping rule predefined by the protocol, a BP group to which the BP currently active for the terminal belongs. For example, subcarrier spacings of a BP 0, a BP 3, and a BP6 are all 15 kHz, and these three BPs form one group. The three BPs in the BP group correspond to a same group of MCS thresholds or a same correspondence between MCS thresholds and time-domain densities, for example, as shown in Table A. Subcarrier spacings of a BP 1 and a BP 4 are both 60 kHz, and these two BPs form one group. This group of BPs corresponds to a same group of MCS thresholds or a same correspondence between MCS thresholds and time-domain densities, for example, as shown in Table B. Optionally, the grouping rule predefined by the protocol is that BPs with a same numerology form one group. The terminal determines, according to the grouping rule predefined by the protocol, a BP group to which the BP currently active for the terminal belongs.

Optionally, the base station may alternatively indicate a BP grouping rule to the terminal by sending signaling. For example, a plurality of BP grouping rules are predefined in a protocol. For example, BPs with a same subcarrier form one group, BPs with a same numerology form one group, and BPs with a same CP type form one group. The base station may indicate, by using signaling, a specific one of the foregoing rules that is to be used by the terminal. The terminal determines the to-be-used BP grouping rule based on the indication signaling of the base station. Optionally, the base station may notify the terminal of one or more candidate BPs by using first signaling, and then notify the terminal of a currently active BP by using second signaling. The currently active BP is one of the one or more candidate BPs. The first signaling may be RRC signaling, and the second signaling may be a DCI or a MAC CE.

The terminal determines, based on the BP group to which the currently active BP belongs, a corresponding group of MCS thresholds or a corresponding correspondence between MCS thresholds and time-domain densities, and determines the time-domain density of the PT-RS based on an MCS threshold interval into which an actually scheduled modulation order MCS falls.

It should be noted that Table 1, Table 2, Table A, Table B, Table C, and Table D are merely used to explain this embodiment of the present application, and should not be construed as a limitation.

(5) Frequency-Domain Density of the PT-RS

In this application, the frequency-domain density of the PT-RS may be related to at least one of a CP type, the user scheduled bandwidth, a subcarrier spacing, and a modulation order. To be specific, a total quantity $L_{PT\text{-}RS}$ of subcarriers to which the PT-RS is mapped within the user scheduled bandwidth may be related to at least one of the CP type, the user scheduled bandwidth, the subcarrier spacing, and the modulation order.

Specifically, there is a correspondence between the frequency-domain density of the PT-RS and the at least one of the CP type, the user scheduled bandwidth, the subcarrier spacing, and the modulation order. Different CP types, user scheduled bandwidths, subcarrier spacings, or modulation orders correspond to different frequency-domain densities. Specifically, the correspondence may be predefined by a protocol, or may be configured by the network device by using higher layer signaling (for example, RRC signaling).

Specifically, for a determined subcarrier spacing, one or more scheduled bandwidth thresholds may be predefined, or may be configured by using higher layer signaling. All scheduled bandwidths between two adjacent scheduled bandwidth thresholds correspond to a same frequency-domain density of the PT-RS, as shown in Table 3.

TABLE 3

| Scheduled bandwidth threshold | Frequency-domain density (a quantity of subcarriers in each resource block) |
|---|---|
| 0 <= BW < BW_1 | 0 |
| BW_1 <= BW < BW_2 | 1 |
| BW_2 <= BW < BW_3 | 1/2 |
| BW_3 <= BW < BW_4 | 1/4 |
| BW_4 <= BW < BW_5 | 1/8 |
| BW_5 <= BW | 1/16 |

BW_1, BW_2, BW_3, BW_4, and BW_5 are scheduled bandwidth thresholds. A scheduled bandwidth threshold may be represented by a quantity of resource blocks included in a scheduled bandwidth, or may be represented by a frequency-domain range corresponding to a scheduled bandwidth. This is not limited herein. The frequency-domain density "½" indicates that the PT-RS occupies one subcarrier in every two resource blocks. Meanings of the frequency-domain densities "¼", "⅛", and "1/16" may be obtained by analogy. Details are not described again.

Specifically, at a determined subcarrier spacing, the frequency-domain density of the PT-RS may be determined based on a scheduled bandwidth threshold interval into which an actual scheduled bandwidth BW falls. For example, assuming that Table 3 shows scheduled bandwidth thresholds at a default subcarrier spacing SCS_1=15 kHz, if the actual scheduled bandwidth BW falls into an interval [BW_2, BW_3], the frequency-domain density of the PT-RS is ½. This example is merely used to explain this embodiment of the present application, and should not be construed as a limitation.

In this application, different subcarrier spacings may correspond to different scheduled bandwidth thresholds. To be specific, different correspondence tables of a scheduled bandwidth threshold and a time-domain density may be configured for different subcarrier spacings.

Specifically, scheduled bandwidth thresholds corresponding to different subcarrier spacings may be predefined by a protocol, or may be configured by the network device by using higher layer signaling (for example, RRC signaling).

In some optional embodiments, a default subcarrier spacing (expressed as SCS_1), for example, 15 kHz, and one or more default scheduled bandwidth thresholds (expressed as BW') corresponding to the default subcarrier spacing may be predefined by a protocol, or may be configured by using higher layer signaling. In addition, for another non-default subcarrier spacing, a corresponding scheduled bandwidth offset (expressed as BW_offset, which is an integer) may be predefined by a protocol, or may be configured by using higher layer signaling. BW_offset+BW=BW', where BW represents an actual scheduled bandwidth at the other non-default subcarrier spacing. At the other non-default subcarrier spacing, the frequency-domain density of the PT-RS may be determined by adding the actual scheduled bandwidth BW up to the scheduled bandwidth offset BW_offset.

For example, if Table 4 shows scheduled bandwidth thresholds at the default subcarrier spacing SCS_1=15 kHz, at a non-default subcarrier spacing 60 Hz, if a sum of the actual scheduled bandwidth BW and BW_offset falls into an interval [BW_1, BW_2], the frequency-domain density of the PT-RS is 1; or if a sum of the actual scheduled bandwidth BW and BW_offset falls into an interval [BW_2, BW_3], the frequency-domain density of the PT-RS is ½. This example is merely used to explain this embodiment of the present application, and should not be construed as a limitation.

TABLE 4

| Scheduled bandwidth threshold | Frequency-domain density (a quantity of subcarriers in each resource block) |
|---|---|
| 0 <= BW' < BW_1 | 0 |
| BW_1 <= BW' < BW_2 | 1 |
| BW_2 <= BW' < BW_3 | 1/2 |
| BW_3 <= BW' < BW_4 | 1/4 |
| BW_4 <= BW' < BW_5 | 1/8 |
| BW_5 <= BW' | 1/16 |

In some optional embodiments, a default subcarrier spacing (expressed as SCS_1) and one or more default scheduled bandwidth thresholds (expressed as BW') corresponding to the default subcarrier spacing may be predefined by a protocol, or may be configured by using higher layer signaling. In addition, for another non-default subcarrier spacing (expressed as SCS_n), a corresponding scale factor R ($0<\beta<1$) may be predefined by a protocol, or may be configured by using higher layer signaling. It may be defined that $\beta=SCS\_n/SCS\_1$. At the other non-default subcarrier spacing, a default scheduled bandwidth threshold interval into which a BW falls may be determined by using an actual scheduled bandwidth BW and the default scheduled bandwidth threshold BW'. Then an actual frequency-domain density of the PT-RS is determined by multiplying the scale factor R by a frequency-domain density corresponding to the default scheduled bandwidth threshold interval.

For example, if Table 4 shows scheduled bandwidth thresholds at a default subcarrier spacing SCS_1=60 kHz, at a non-default subcarrier spacing 120 Hz, if the actual scheduled bandwidth BW falls into [BW_3, BW_4], the actual frequency-domain density of the PT-RS is a frequency-domain density closest to a product of the frequency-domain density "¼" and the scale factor R. Because β=120/60=2, the actual frequency-domain density of the PT-RS is ½. This example is merely used to explain this embodiment of the present application, and should not be construed as a limitation.

In this application, the frequency-domain density of the PT-RS may be alternatively determined based on the bandwidth part (BP) and the scheduled bandwidth BW. One or more BPs correspond to one group of BW thresholds or a correspondence between BW thresholds and frequency-domain densities. The group of BW thresholds or the correspondence between BW thresholds and frequency-domain densities may be predefined according to a protocol, or may be configured by a base station by using higher layer signaling, for example, RRC signaling, a MAC CE, a broadcast message, a system message, or a combination of at least two of these messages. Optionally, the correspondence between BW thresholds and frequency-domain densities may be represented by using a table of correspondence between BW thresholds and frequency-domain densities, as shown in Table E.

Specifically, the correspondence between BW thresholds and frequency-domain densities may be determined by using one group of BW thresholds. For example, when candidate values of frequency-domain densities are fixed, that is, values of "No PT-RS, FD1, FD2, FD3, FD4, and FD5" in a frequency-domain density column in Table E are predefined by a protocol, after the candidate values of frequency-domain densities are prestored according to the predefinition and a group of thresholds $\{BW_1^{BPx}, BW_2^{BPx}, BW_3^{BPx}, BW_4^{BPx}, BW_5^{BPx}\}$ is determined, a correspondence between the group of BW thresholds and the frequency-domain densities may be determined.

Optionally, groups of BW thresholds corresponding to one or more BPs, or correspondences, corresponding to one or more BPs, between BW thresholds and frequency-domain densities may be the same. In other words, one or more BPs may correspond to a same group of BW thresholds or a same correspondence between BW thresholds and frequency-domain densities.

Optionally, groups of BW thresholds corresponding to one or more BPs, or correspondences, corresponding to one or more BPs, between BW thresholds and frequency-domain densities may be different. For example, one BP corresponds to a separate group of MCS thresholds or a separate correspondence between MCS thresholds and time-domain densities. Optionally, a BW threshold represents a quantity of resource blocks that can be scheduled.

For example, for a first BP, the base station configures a group of BW thresholds $\{BW_1^{BP0}, BW_2^{BP0}, BW_3^{BP0}, BW_4^{BP0}, BW_5^{BP0}\}$ or a correspondence between BW thresholds and frequency-domain densities by using signaling, or predefines a group of BW thresholds $\{BW_1^{BP0}, BW_2^{BP0}, BW_3^{BP0}, BW_4^{BP0}, BW_5^{BP0}\}$ or a correspondence between BW thresholds and frequency-domain densities according to a protocol. The correspondence may be shown in Table E. The signaling may be higher layer signaling, for example, RRC signaling, a MAC CE, a broadcast message, a system message, or a combination of at least two of these messages.

TABLE E

| Scheduled bandwidth | Frequency-domain density |
|---|---|
| $0 <= BW < BW_1^{BP0}$ | No PT-RS |
| $BW_1^{BP0} <= BW < BW_2^{BP0}$ | $FD_1$ |
| $BW_2^{BP0} <= BW < BW_3^{BP0}$ | $FD_2$ |
| $BW_3^{BP0} <= BW < BW_4^{BP0}$ | $FD_3$ |
| $BW_4^{BP0} <= BW < BW_5^{BP0}$ | $FD_4$ |
| $BW_5^{BP0} <= BW$ | $FD_5$ |

A value range of FD1, FD2, FD3, FD4, and FD5 includes values ranging from 0 to 1 (including 1 and 0), for example, 0, 1/16, 1/8, 1/4, 1/2, and 1. This is merely an example and does not constitute any limitation. Specifically, specific meanings of frequency-domain density values 0, 1/16, 1/8, 1/4, 1/2, and 1 are respectively as follows: No PT-RS is mapped, a PT-RS is mapped to one subcarrier in every 16 RBs, a PT-RS is mapped to one subcarrier in every eight RBs, a PT-RS is mapped to one subcarrier in every four RBs, a PT-RS is mapped to one subcarrier in every two RBs, and a PT-RS is mapped to one subcarrier in every RB (for a subcarrier to which a PT-RS is mapped, the PT-RS does not need to be mapped to the subcarrier on every symbol, and on which symbols the PT-RS is mapped to this subcarrier needs to be determined based on the time-domain density).

For a second BP, the base station configures a group of BW thresholds $\{BW_1^{BP1}, BW_2^{BP1}, BW_3^{BP1}, BW_4^{BP1}, BW_5^{BP1}\}$ or a correspondence between BW thresholds and frequency-domain densities by using signaling, or predefines a group of BW thresholds $\{BW_1^{BP0}, BW_2^{BP0}, BW_3^{BP0}, BW_4^{BP0}, BW_5^{BP0}\}$ or a correspondence between BW thresholds and frequency-domain densities according to a protocol, as shown in Table F. The signaling may be higher layer signaling, for example, RRC signaling, a MAC CE, a broadcast message, a system message, or a combination of at least two of these messages.

TABLE F

| Scheduled bandwidth | Frequency-domain density |
|---|---|
| $0 <= BW < BW_1^{BP1}$ | No PT-RS |
| $BW_1^{BP1} <= BW < BW_2^{BP1}$ | $FD_1$ |
| $BW_2^{BP1} <= BW < BW_3^{BP1}$ | $FD_2$ |
| $BW_3^{BP1} <= BW < BW_4^{BP1}$ | $FD_3$ |
| $BW_4^{BP1} <= BW < BW_5^{BP1}$ | $FD_4$ |
| $BW_5^{BP1} <= BW$ | $FD_5$ |

A value range of FD1, FD2, FD3, FD4, and FD5 includes values ranging from 0 to 1 (including 1 and 0), for example, 0, 1/16, 1/8, 1/4, 1/2, and 1. This is merely an example and does not constitute any limitation.

By analogy, for an $n^{th}$ BP, the base station configures a group of BW thresholds $\{BW_1^{BPn}, BW_2^{BPn}, BW_3^{BPn}, BW_4^{BPn}, BW_5^{BPn}\}$ or a correspondence between BW thresholds and frequency-domain densities by using signaling, or predefines a group of BW thresholds $\{BW_1^{BPn}, BW_2^{BPn}, BW_3^{BPn}, BW_4^{BPn}, BW_5^{BPn}\}$ or a correspondence between BW thresholds and frequency-domain densities according to a protocol, as shown in Table G. The signaling may be higher layer signaling, for example, RRC signaling, a MAC CE, a broadcast message, a system message, or a combination of at least two of these messages.

TABLE G

| Scheduled bandwidth | Frequency-domain density |
|---|---|
| $0 <= BW < BW_1^{BPn}$ | No PT-RS |
| $BW_1^{BPn} <= BW < BW_2^{BPn}$ | $FD_1$ |
| $BW_2^{BPn} <= BW < BW_3^{BPn}$ | $FD_2$ |
| $BW_3^{BPn} <= BW < BW_4^{BPn}$ | $FD_3$ |
| $BW_4^{BPn} <= BW < BW_5^{BPn}$ | $FD_4$ |
| $BW_5^{BPn} <= BW$ | $FD_5$ |

A value range of FD1, FD2, FD3, FD4, and FD5 includes values ranging from 0 to 1 (including 1 and 0), for example, 0, 1/16, 1/8, 1/4, 1/2, and 1. This is merely an example and does not constitute any limitation.

Optionally, the base station may send, to the terminal by using signaling, a correspondence between one or more BPs and one or more groups of BW thresholds. Optionally, the correspondence between one or more BPs and one or more groups of BW thresholds may be shown in Table H. Alternatively, the base station may send, to the terminal by using signaling, a correspondence between one or more BPs and one or more correspondences between BW thresholds and frequency-domain densities. The signaling may be higher layer signaling, for example, RRC signaling, a MAC CE, a broadcast message, a system message, or a combination of at least two of these messages. The terminal receives the signaling, and determines a specific group of BW thresholds based on a currently active BP.

TABLE H

| Candidate BP | BW threshold group |
|---|---|
| BP0, . . . , BPm | $\{BW_1^{BP0}, BW_2^{BP0}, BW_3^{BP0}, BW_4^{BP0}, BW_5^{BP0}\}$ |
| BP1, . . . , BPx | $\{BW_1^{BP1}, BW_2^{BP1}, BW_3^{BP1}, BW_4^{BP1}, BW_5^{BP1}\}$ |
| . . . | . . . |
| BPn | $\{BW_1^{BPn}, BW_2^{BPn}, BW_3^{BPn}, BW_4^{BPn}, BW_5^{BPn}\}$ |

The base station may determine, based on the BP currently active for a terminal side, the group of BW thresholds or the correspondence between BW thresholds and frequency-domain densities, as shown in Table E, Table F, and Table G. The base station determines the frequency-domain density of the PT-RS based on a scheduled bandwidth scheduled for the terminal side and the determined group of BW thresholds or the determined correspondence between BW thresholds and frequency-domain densities. In downlink sending, the base station maps the PT-RS to one or more subcarriers based on the determined frequency-domain density of the PT-RS, and sends the PT-RS to the terminal side. In uplink receiving, the base station receives the PT-RS on one or more subcarriers based on the determined frequency-domain density of the PT-RS.

The terminal may obtain Table E, Table F, and Table G (there may be actually a plurality of tables, and Table E, Table F, and Table G are merely examples, and do not constitute any limitation on the present application) by prestoring a group(s) of BW thresholds corresponding to one or more BPs, or a correspondence(s), corresponding to one or more BPs, between BW thresholds and frequency-domain densities, as shown in Table E, Table F, and Table G, or by receiving signaling from the base station. The signaling is used to indicate one or more groups of BW thresholds corresponding to the one or more BPs, or one or more correspondences, corresponding to the one or more BPs, between BW thresholds and frequency-domain densities, as shown in Table E, Table F, and Table G. The terminal determines, based on the currently active BP, a group of BW thresholds, a correspondence between BW thresholds and frequency-domain densities, or a specific table that is to be used. After the table, the group of BW thresholds, or the correspondence between BW thresholds and frequency-domain densities is determined, a corresponding frequency-domain density of the PT-RS is then determined based on an interval into which an actually scheduled scheduled bandwidth falls. In downlink receiving, the terminal side receives the PT-RS on one or more subcarriers based on the determined frequency-domain density of the PT-RS. In uplink sending, the terminal sends the PT-RS on one or more subcarriers based on the determined frequency-domain density of the PT-RS.

Optionally, the base station may determine, based on the BP currently active for the terminal side, a specific group of BW thresholds or a specific correspondence between a group of BW thresholds and frequency-domain densities. The base station sends signaling. The signaling is used to indicate the determined group of BW thresholds or the determined correspondence between BW thresholds and frequency-domain densities. The signaling may be higher layer signaling or downlink control information. The higher layer signaling may be RRC signaling, a MAC CE, a broadcast message, a system message, or a combination of at least two of these messages. The terminal receives the signaling from the base station. The signaling is used to indicate the determined group of BW thresholds or the determined correspondence between BW thresholds and frequency-domain densities. The terminal determines, based on the signaling, a group of BW thresholds that needs to be used or a correspondence between BW thresholds and frequency-domain densities that needs to be used, and determines a corresponding frequency-domain density of the PT-RS based on a threshold interval into which a scheduled bandwidth actually scheduled by the terminal falls.

Optionally, the base station may configure one or more candidate BPs for the terminal by using first signaling, and then notify the terminal of a currently active BP by using second signaling. The first signaling may be RRC signaling, and the second signaling may be a DCI or a MAC CE.

Optionally, one group of BPs corresponds to a same group of BW thresholds or a same correspondence between BW thresholds and frequency-domain densities. The group of BW thresholds or the correspondence between BW thresholds and frequency-domain densities is predefined according to a protocol, or is configured by the base station by using signaling. The signaling is higher layer signaling, for example, RRC signaling, a MAC CE, a broadcast message, a system message, or a combination of at least two of these messages. The BP group includes one or more BPs. BP group information may be configured by the base station and sent to the terminal by using signaling, or the BP group is predefined by a protocol, or a BP grouping rule is predefined by a protocol. Optionally, the base station groups one or more BPs with a same subcarrier spacing into one BP group, or the base station groups one or more BPs with a same numerology into one BP group, and sends BP group information to the terminal by using signaling. The signaling may be higher layer signaling, for example, RRC signaling, a MAC CE, a broadcast message, a system message, or a combination of at least two of these messages. The BP group information includes the one or more BPs in the BP group, a number of the BP group, a subcarrier spacing of the BP group, numerology of the BP group, or a number or an index value of the one or more BPs in the BP group. The terminal receives the group information sent by the base station, and determines, based on the group information, a BP group to which the BP currently active for the terminal belongs.

Alternatively, the BP grouping rule is predefined by the protocol. Optionally, the BP grouping rule predefined by the protocol is that BPs with a same subcarrier spacing form one group. The terminal determines, according to the grouping rule predefined by the protocol, a BP group to which the BP currently active for the terminal belongs. For example, subcarrier spacings of a BP 0, a BP 3, and a BP6 are all 15 kHz, and these three BPs form one group. The three BPs in the BP group correspond to a same group of MCS thresholds or a same correspondence between MCS thresholds and time-domain densities, for example, as shown in Table A. Subcarrier spacings of a BP 1 and a BP 4 are both 60 kHz, and these two BPs form one group. This group of BPs corresponds to a same group of MCS thresholds or a same correspondence between MCS thresholds and time-domain densities, for example, as shown in Table B. Optionally, the grouping rule predefined by the protocol is that BPs with a same numerology form one group. The terminal determines, according to the grouping rule predefined by the protocol, a BP group to which the BP currently active for the terminal belongs.

Optionally, the base station may alternatively indicate a BP grouping rule to the terminal by sending signaling. For example, a plurality of BP grouping rules are predefined in a protocol. For example, BPs with a same subcarrier form one group, BPs with a same numerology form one group, and BPs with a same CP type form one group. The base station may indicate, by using signaling, a specific one of the foregoing rules that is to be used by the terminal. The terminal determines the to-be-used BP grouping rule based on the indication signaling of the base station.

Optionally, the base station may notify the terminal of one or more candidate BPs by using first signaling, and then notify the terminal of a currently active BP by using second signaling. The currently active BP is one of the one or more candidate BPs. The first signaling may be RRC signaling, and the second signaling may be a DCI or a MAC CE.

The terminal determines, based on the BP group to which the currently active BP belongs, a corresponding group of BW thresholds or a corresponding correspondence between BW thresholds and frequency-domain densities, and determines the frequency-domain density of the PT-RS based on a BW threshold interval into which an actual scheduled bandwidth BW falls.

It should be noted that Table 3, Table 4, and Table E to Table H are merely used to explain this embodiment of the present application, and should not be construed as a limitation.

In this application, the network device may configure a time-frequency resource of the PT-RS within the user scheduled bandwidth based on the time-domain density and the frequency-domain density of the PT-RS, and then send resource location information of the PT-RS to the terminal. Correspondingly, the terminal may receive the resource location information of the PT-RS, and send or receive the second reference signal based on the resource location information of the PT-RS, to perform phase tracking. This facilitates channel quality feedback.

In addition, the user scheduled bandwidth to which the PT-RS is mapped may be further used to transmit a hybrid automatic repeat request-acknowledgement (HARQ-ACK), a rank indication (RI), or a channel quality indication (CQI) in uplink.

In this application, for uplink HARQ-ACK, RI, or CQI transmission, the terminal may perform rate matching on a coded HARQ-ACK, RI, or CQI based on the time-domain density and the frequency-domain density of the PT-RS, and send coded data resulting from the matching to an eNB. Correspondingly, the network device may receive the coded data resulting from the matching. A quantity of resources occupied by the PT-RS within the user scheduled bandwidth may be determined based on the time-domain density and the frequency-domain density of the PT-RS. For manners of determining the time-domain density and the frequency-domain density of the PT-RS, refer to the foregoing content. Details are not repeated here.

Specifically, for calculation of a quantity of coded modulation symbols used to transmit the HARQ-ACK, the RI, or the CQI, a time-frequency resource occupied by the PT-RS needs to be excluded, and the quantity Q' of coded modulation symbols may be expressed as follows:

$$Q' = \min\left(\left\lceil \frac{O \cdot \left(M_{sc}^{PUSCH-initial} \cdot N_{symb}^{PUSCH-initial} - N_{RE}^{PT-RS}\right) \cdot \beta_{offset}^{PUSCH}}{\sum_{r=0}^{C-1} K_r} \right\rceil, 4 \cdot M_{sc}^{PUSCH}\right)$$

where $N_{RE}^{PT-RS}$ represents a quantity of resource elements used to transmit a PT-RS that are within an uplink scheduled bandwidth of the user, O represents a quantity of coded bits used to transmit the HARQ-ACK, the RI, or the CQI, $M_{sc}^{PUSCH}$ represents a quantity of subcarriers within the uplink scheduled bandwidth of the user, $N_{symb}^{PUSCH-initial}$ represents a quantity of symbols used for initial uplink shared channel transmission, $M_{sc}^{PUSCH-initial}$ represents a quantity of subcarriers used for initial uplink shared channel transmission within the scheduled bandwidth, $\beta_{offset}^{PUSCH}$ represents an offset of a physical uplink shared channel, and $\sum_{r=0}^{C-1} K_r$ represents a total quantity of coded bits of C code blocks.

It can be understood that, with impact of a resource occupied by an uplink PT-RS considered during rate matching, increase in an actual transmission code rate resulting from the PT-RS occupying a time-frequency resource of a useful signal can be avoided, thereby improving transmission reliability.

Figure 25:
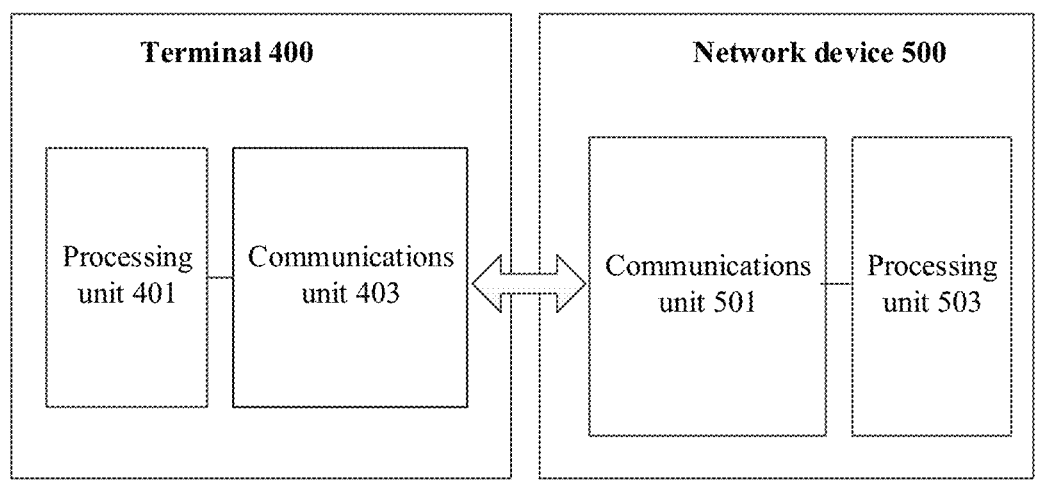
FIG. 25 is a schematic structural diagram of a wireless communications system, a terminal, and a network device according to this application.

FIG. 25 shows a wireless communications system, a terminal, and a network device provided in this application. The wireless communications system 10 includes the terminal 400 and the network device 500. The terminal 400 may be the terminal 200 in the embodiment of FIG. 6. The network device 500 may be the network device 300 in the embodiment of FIG. 7. The wireless communications system 10 may be the wireless communications system 100 shown in FIG. 5. The following separately provides descriptions.

As shown in FIG. 25, the terminal 400 may include a processing unit 401 and a communications unit 403.

The communications unit 403 may be configured to receive a first reference signal and a second reference signal, or send the first reference signal and the second reference signal.

The processing unit 401 may be configured to perform phase tracking and channel state information estimation by using the first reference signal and the second reference signal.

In this application, the first reference signal is mapped to a plurality of symbols, the second reference signal may be mapped to at least two of the plurality of symbols, and a subcarrier to which the second reference signal is mapped corresponds to one or more same frequency-domain locations.

In an implementation of this application, the first reference signal may be an uplink reference signal used for CSI estimation, for example, an SRS, and the second reference signal may be an uplink reference signal used for phase tracking (PT-RS). In this case, the communications unit 403 may be specifically configured to send the first reference signal and the second reference signal.

In another implementation of this application, the first reference signal may be a downlink reference signal used for CSI estimation, for example, a CSI-RS, and the second reference signal may be a downlink reference signal for phase tracking (PT-RS). In this case, the communications unit 403 may be specifically configured to receive the first reference signal and the second reference signal.

In some embodiments, the communications unit 403 may be further configured to receive resource location information corresponding to each of the first reference signal and the second reference signal, and configured to receive (or send) the first reference signal and the second reference signal based on the resource location information.

In some embodiments, respective resource locations corresponding to the first reference signal and the second reference signal may be predefined by a protocol. In some embodiments, the communications unit 403 may be configured to receive resource location information, sent by the network device, only of the first reference signal. The processing unit 401 may be further configured to determine a resource location of the second reference signal based on a resource location of the first reference signal and a mapping policy, provided in this application, about the second reference signal. The mapping policy of the second reference signal may be predefined by a protocol, or may be configured by the network device by using higher layer signaling or a PDCCH.

For the mapping policy of the second reference signal, refer to the embodiments corresponding to FIG. 12 to FIG. 16. Details are not repeated here.

In this application, an antenna port used by the communications unit 403 to send the second reference signal may be one or more of antenna ports sending the first reference signal; or an antenna port used by the communications unit 403 to send the second reference signal and an antenna port sending the first reference signal may be quasi-co-located.

In addition, the communications unit 403 may also be configured to: when transmitting data on a physical uplink or downlink shared channel, send or receive the second reference signal, and perform phase tracking by using the second reference signal. Specifically, the second reference signal may be mapped to a user scheduled bandwidth. For a resource mapping manner of the second reference signal within the user scheduled bandwidth, refer to the embodiments corresponding to FIG. 19 to FIG. 24. Details are not repeated here.

In addition, the communications unit 403 may also be configured to transmit a hybrid automatic repeat request-acknowledgement (HARQ-ACK), a rank indication (RI), or a channel quality indication (CQI) in uplink within the user scheduled bandwidth to which a PT-RS is mapped. In addition, the processing unit 401 may also be configured to perform rate matching on a coded HARQ-ACK, RI, or CQI based on a time-domain density and a frequency-domain density of the PT-RS, and send coded data resulting from the matching to the network device.

It can be understood that for specific implementations of the function units included in the terminal 400, reference may be made to the foregoing embodiments. Details are not repeated here.

As shown in FIG. 25, the network device 500 may include a communications unit 501 and a processing unit 503.

The communications unit 501 may be configured to receive a first reference signal and a second reference signal, or send the first reference signal and the second reference signal.

The processing unit 503 may be configured to perform phase tracking and channel state information estimation by using the first reference signal and the second reference signal.

In this application, the first reference signal is mapped to a plurality of symbols, the second reference signal may be mapped to at least two of the plurality of symbols, and a subcarrier to which the second reference signal is mapped corresponds to one or more same frequency-domain locations.

Specifically, the processing unit 503 may be further configured to configure a resource corresponding to each of the first reference signal and the second reference signal. The first reference signal is mapped to a plurality of symbols. The second reference signal is mapped to at least two of the plurality of symbols. A subcarrier to which the second reference signal is mapped corresponds to one or more same frequency-domain locations. The communications unit 501 may be further configured to send resource location information corresponding to each of the first reference signal and the second reference signal. The resource location information is used by the terminal to receive (or send) the first reference signal and the second reference signal.

In an implementation of this application, the first reference signal may be an uplink reference signal used for CSI estimation, for example, an SRS, and the second reference signal may be an uplink reference signal used for phase tracking (PT-RS). In this case, the communications unit 501 may be specifically configured to receive the first reference signal and the second reference signal.

In another implementation of this application, the first reference signal may be a downlink reference signal used for CSI estimation, for example, a CSI-RS, and the second reference signal may be a downlink reference signal for phase tracking (PT-RS). In this case, the communications unit 501 may be specifically configured to send the first reference signal and the second reference signal.

In some embodiments, respective resource locations corresponding to the first reference signal and the second reference signal may be predefined by a protocol. In some embodiments, the communications unit 501 may be configured to send resource location information only of the first reference signal. In this way, the terminal 400 may determine a resource location of the second reference signal based on a resource location of the first reference signal and a mapping policy, provided in this application, about the second reference signal. The mapping policy of the second reference signal may be predefined by a protocol, or may be configured by the communications unit 501 by using higher layer signaling or a PDCCH.

For the mapping policy of the second reference signal, refer to the embodiments corresponding to FIG. 12 to FIG. 16. Details are not repeated here.

In this application, an antenna port used by the communications unit 501 to send the second reference signal may be one or more of antenna ports sending the first reference signal; or an antenna port used by the communications unit

501 to send the second reference signal and an antenna port sending the first reference signal may be quasi-co-located.

In addition, the communications unit 501 may also be configured to: when transmitting data on a physical uplink or downlink shared channel, send or receive the second reference signal, and perform phase tracking by using the second reference signal. Specifically, the second reference signal may be mapped to a user scheduled bandwidth. For a resource mapping manner of the second reference signal within the user scheduled bandwidth, refer to the embodiments corresponding to FIG. 19 to FIG. 24. Details are not repeated here.

In addition, the communications unit 501 may also be configured to receive coded data that is obtained through rate matching and that is sent by the terminal 400. The coded data includes a hybrid automatic repeat request-acknowledgement (HARQ-ACK), a rank indication (RI), or a channel quality indication (CQI) that is transmitted within the user scheduled bandwidth to which a PT-RS is mapped.

It can be understood that for specific implementations of the function units included in the network device 500, reference may be made to the foregoing embodiments. Details are not repeated here.

To sum up, according to this application, a phase tracking reference signal is inserted when a reference signal used for CSI estimation is transmitted on a plurality of symbols. In addition, the phase tracking reference signal is also mapped to the plurality of symbols, and a subcarrier to which the phase tracking reference signal is mapped on one of the plurality of symbols has a same frequency-domain location as a subcarrier to which the phase tracking reference signal is mapped on the rest of the plurality of symbols. In this way, on the subcarrier corresponding to this same frequency-domain location, the phase tracking reference signal may be used for phase tracking. This helps improve accuracy of CSI estimation.

A person of ordinary skill in the art may understand that all or some of the processes of the methods in embodiments of this application may be implemented by a computer program instructing relevant hardware. The program may be stored in a computer readable storage medium. When being executed, the program may include the procedures of the foregoing method embodiments. The foregoing storage medium includes any medium that can store program code, such as a read-only memory (ROM), a random access memory (RAM), a magnetic disk, or an optical disc.

What is claimed is:

1. A communication method, comprising:
   determining, by a communication device, a time-domain density of a phase tracking reference signal and a frequency-domain density of the phase tracking reference signal; and
   sending or receiving, by the communication device, the phase tracking reference signal based on the time-domain density of the phase tracking reference signal and the frequency-domain density of the phase tracking reference signal;
   wherein the time-domain density of the phase tracking reference signal corresponds to a bandwidth part and a modulation and coding scheme (MCS);
   wherein the frequency-domain density of the phase tracking reference signal corresponds to the bandwidth part and a scheduled bandwidth;
   wherein the bandwidth part comprises multiple consecutive physical resource blocks in the frequency domain; and
   wherein the bandwidth part corresponds to one or more subcarrier spacings.

2. The method according to claim 1, wherein the communication device is a terminal, and the method further comprises:
   receiving, by the terminal, a signaling which indicates one or more values of bandwidth parts from a network device.

3. The method according to claim 1, wherein the communication device is a terminal, and the method further comprises:
   receiving, by the terminal, a signaling which indicates one or more groups of MCS thresholds from a network device, wherein the bandwidth part corresponds to one group of MCS thresholds.

4. The method according to claim 1, wherein the communication device is a terminal, and the method further comprises:
   receiving, by the terminal, a signaling which indicates one or more groups of scheduled bandwidth thresholds from a network device, wherein the bandwidth part corresponds to one group of scheduled bandwidth thresholds.

5. The method according to claim 1, wherein the communication device is a terminal, and the method further comprises:
   receiving, by the terminal, a signaling which indicates an active value of the bandwidth part from a network device.

6. The method according to claim 1, wherein the communication device is a network device, and the method further comprises:
   sending, by the network device, a signaling which indicates one or more values of bandwidth parts to a terminal.

7. The method according to claim 1, wherein the communication device is a network device, and the method further comprises:
   sending, by the network device, a signaling which indicates one or more groups of MCS thresholds to a terminal, wherein the bandwidth part corresponds to one group of MCS thresholds.

8. The method according to claim 1, wherein the communication device is a network device, and the method further comprises:
   sending, by the network device, a signaling which indicates one or more groups of scheduled bandwidth thresholds to a terminal, wherein the bandwidth part corresponds to one group of scheduled bandwidth thresholds.

9. The method according to claim 1, wherein the communication device is a network device, and the method further comprises:
   sending, by the network device, a signaling which indicates an active value of the bandwidth part to a terminal.

10. A non-transitory computer-readable storage medium having processor-executable instructions stored thereon, wherein the processor-executable instructions, when executed, facilitate:
    determining a time-domain density of a phase tracking reference signal and a frequency-domain density of the phase tracking reference signal; and
    sending or receiving the phase tracking reference signal based on the time-domain density of the phase tracking reference signal and the frequency-domain density of the phase tracking reference signal;

wherein the time-domain density of the phase tracking reference signal corresponds to a bandwidth part and a modulation and coding scheme (MCS);

wherein the frequency-domain density of the phase tracking reference signal corresponds to the bandwidth part and a scheduled bandwidth;

wherein the bandwidth part comprises multiple consecutive physical resource blocks in the frequency domain; and wherein the bandwidth part corresponds to one or more subcarrier spacings.

11. A communication device, comprising:

one or more processors configured to determine a time-domain density of a phase tracking reference signal and a frequency-domain density of the phase tracking reference signal; and a communications interface configured to send or receive the phase tracking reference signal based on the time-domain density of the phase tracking reference signal and the frequency-domain density of the phase tracking reference signal;

wherein the time-domain density of the phase tracking reference signal corresponds to a bandwidth part and a modulation and coding scheme (MCS);

wherein the frequency-domain density of the phase tracking reference signal corresponds to the bandwidth part and a scheduled bandwidth;

wherein the bandwidth part comprises multiple consecutive physical resource blocks in the frequency domain; and wherein the bandwidth part corresponds to one or more subcarrier spacings.

12. The communication device according to claim 11, wherein the communication device is a terminal or a network device.

13. The communication device according to claim 11, wherein the communication device is a terminal, and the communications interface is further configured to receive a signaling which indicates one or more values of bandwidth parts from a network device.

14. The communication device according to claim 11, wherein the communication device is a terminal, and the communications interface is further configured to receive a signaling which indicates one or more groups of MCS thresholds from a network device, wherein the bandwidth part corresponds to one group of MCS thresholds.

15. The communication device according to claim 11, wherein the communication device is a terminal, and the communications interface is further configured to receive a signaling which indicates one or more groups of scheduled bandwidth thresholds from a network device, wherein the bandwidth part corresponds to one group of scheduled bandwidth thresholds.

16. The communication device according to claim 11, wherein the communication device is a terminal, and the communications interface is further configured to receive a signaling which indicates an active value of the bandwidth part from a network device.

17. The communication device according to claim 11, wherein the communication device is a network device, and the communications interface is further configured to send a signaling which indicates one or more values of bandwidth parts to a terminal.

18. The communication device according to claim 11, wherein the communication device is a network device, and the communications interface is further configured to send a signaling which indicates one or more groups of MCS thresholds to a terminal, wherein the bandwidth part corresponds to one group of MCS thresholds.

19. The communication device according to claim 11, wherein the communication device is a network device, and the communications interface is further configured to send a signaling which indicates one or more groups of scheduled bandwidth thresholds to a terminal, wherein the bandwidth part corresponds to one group of scheduled bandwidth thresholds.

20. The communication device according to claim 11, wherein the communication device is a network device, and the communications interface is further configured to send a signaling which indicates an active value of the bandwidth part to a terminal.

* * * * *

UNITED STATES PATENT AND TRADEMARK OFFICE
CERTIFICATE OF CORRECTION

PATENT NO. : 11,916,705 B2
APPLICATION NO. : 17/408009
DATED : February 27, 2024
INVENTOR(S) : Sun et al.

It is certified that error appears in the above-identified patent and that said Letters Patent is hereby corrected as shown below:

In the Claims

Claim 10: Column 70, Line 57: "Anon-transitory computer-readable storage medium" should read -- A non-transitory computer-readable storage medium --.

Signed and Sealed this
Twenty-eighth Day of May, 2024

*Katherine Kelly Vidal*

Katherine Kelly Vidal
*Director of the United States Patent and Trademark Office*